(12) United States Patent
De Luca et al.

(10) Patent No.: US 8,486,507 B2
(45) Date of Patent: Jul. 16, 2013

(54) EXPANDABLE FOAM SHEET THAT LOCKS IN EXPANDED CONFIGURATION

(75) Inventors: Nicholas De Luca, Washington, DC (US); Andrew B. Perkins, Berkeley, CA (US); Shane L. Washburn, Oakland, CA (US); Joseph D. Gangel, Livermore, CA (US)

(73) Assignee: Cryovac, Inc., Duncan, SC (US)

( * ) Notice: Subject to any disclaimer, the term of this patent is extended or adjusted under 35 U.S.C. 154(b) by 781 days.

(21) Appl. No.: 12/459,055

(22) Filed: Jun. 26, 2009

(65) Prior Publication Data
US 2010/0330330 A1 Dec. 30, 2010

(51) Int. Cl.
*B32B 3/24* (2006.01)
*B32B 5/04* (2006.01)
*B32B 5/18* (2006.01)

(52) U.S. Cl.
USPC ........... 428/136; 428/131; 428/134; 428/137; 428/138; 428/220; 428/304.4

(58) Field of Classification Search
None
See application file for complete search history.

(56) References Cited

U.S. PATENT DOCUMENTS

| | | |
|---|---|---|
| 3,642,550 A | 2/1972 | Doll |
| 3,642,967 A | 2/1972 | Doll |
| 3,655,501 A * | 4/1972 | Tesch .......................... 428/136 |
| 3,763,616 A | 10/1973 | Pastorelli et al. |
| 3,826,165 A | 7/1974 | Currie et al. |
| 3,914,503 A * | 10/1975 | Brown et al. .............. 428/305.5 |
| 4,121,005 A | 10/1978 | Roberts |
| 4,136,222 A * | 1/1979 | Jonnes ......................... 428/116 |
| 4,149,919 A * | 4/1979 | Lea et al. ..................... 156/213 |
| 4,294,240 A | 10/1981 | Thill |
| 4,306,675 A | 12/1981 | Swanson |
| T102302 I4 | 10/1982 | Commisso |
| 4,385,091 A | 5/1983 | Roellchen |
| 4,465,725 A | 8/1984 | Riel |
| 4,752,352 A | 6/1988 | Feygin |

(Continued)

FOREIGN PATENT DOCUMENTS

| | | |
|---|---|---|
| GB | 2017485 | 2/1979 |
| GB | 2375077 A | 11/2002 |
| WO | 02092470 A1 | 11/2002 |
| WO | 2004/041659 A2 | 5/2004 |

OTHER PUBLICATIONS

Cellu-Cushion® Pro°Tectors, Sealed Air Corporation, 2 pgs. (2005).

(Continued)

*Primary Examiner* — David Sample
*Assistant Examiner* — Jeff Vonch
(74) *Attorney, Agent, or Firm* — Rupert B. Hurley, Jr.

(57) ABSTRACT

A mechanically expandable foam sheet has comprising a plurality of discrete slits therein that allow the foam sheet to be expanded from an unexpanded foam sheet configuration to an expanded foam sheet configuration. The expandable foam sheet has a density of from 14 g/liter to 48 g/liter in the unexpanded configuration and a thickness of from 6 mm to 50 mm. The slits are of a kind and of a size and arrangement that the expanded foam sheet locks into the expanded configuration by exhibiting a pressure-to-close of at least 5 gm/cm$^2$. Each of the slits provides only a single free volume in the expanded foam sheet. An expandable foam sheet having serpentine-shaped expansion and locking arms is also disclosed, as are various cushioning articles comprising expanded foam sheet.

33 Claims, 47 Drawing Sheets

U.S. PATENT DOCUMENTS

| | | | |
|---|---|---|---|
| 4,840,277 | A | 6/1989 | Waldner |
| 5,037,688 | A | 8/1991 | Uchida |
| 5,041,323 | A | 8/1991 | Rose et al. |
| 5,106,668 | A | 4/1992 | Turner et al. |
| 5,146,732 | A | 9/1992 | Grey et al. |
| 5,207,327 | A | 5/1993 | Brondos |
| 5,339,958 | A | 8/1994 | Taravella et al. |
| 5,348,984 | A | 9/1994 | Lee |
| 5,462,974 | A | 10/1995 | Lee |
| 5,469,691 | A | 11/1995 | Grey et al. |
| 5,667,728 | A | 9/1997 | Lee |
| 5,667,871 | A | 9/1997 | Goodrich et al. |
| 5,688,578 | A | 11/1997 | Goodrich |
| 5,705,252 | A * | 1/1998 | Lea et al. ..................... 428/133 |
| 5,794,414 | A | 8/1998 | Grey et al. |
| 5,801,208 | A * | 9/1998 | Lee ................................ 521/98 |
| 5,985,457 | A | 11/1999 | Clifford |
| 6,092,651 | A | 7/2000 | Miller |
| 6,131,376 | A | 10/2000 | Grey et al. |
| 6,167,790 | B1 | 1/2001 | Bambara et al. |
| 6,171,705 | B1 | 1/2001 | Clifford |
| 6,186,330 | B1 | 2/2001 | Yoshimura |
| 6,462,101 | B1 | 10/2002 | Ramesh et al. |
| 6,499,599 | B1 | 12/2002 | Hopkins et al. |
| 6,644,476 | B2 | 11/2003 | Wu |
| 6,739,104 | B2 | 5/2004 | Tokonabe et al. |
| 6,770,683 | B2 | 8/2004 | Ramesh et al. |
| 6,868,965 | B2 | 3/2005 | Miller et al. |
| 6,938,773 | B1 | 9/2005 | Sotto |
| 6,981,589 | B2 | 1/2006 | Sanders, Jr. |
| 6,989,075 | B1 | 1/2006 | Kao et al. |
| 7,114,618 | B2 | 10/2006 | Arnold |
| 7,160,621 | B2 | 1/2007 | Chaudhari et al. |
| 7,306,102 | B2 | 12/2007 | Chang |
| 7,350,851 | B2 | 4/2008 | Barvosa-Carter et al. |
| 7,398,884 | B2 | 7/2008 | Stegner et al. |
| 7,455,567 | B2 | 11/2008 | Bentham et al. |
| 2002/0107562 | A1 | 8/2002 | Hart et al. |
| 2006/0008614 | A1 | 1/2006 | Rockwell et al. |
| 2006/0037745 | A1 | 2/2006 | Hart et al. |
| 2006/0127648 | A1 | 6/2006 | De Luca |
| 2007/0068353 | A1 | 3/2007 | Piucci et al. |
| 2007/0122590 | A1 | 5/2007 | Lalvani |
| 2009/0061153 | A1 | 3/2009 | De Luca et al. |
| 2012/0284928 | A1 * | 11/2012 | Henderson et al. ............... 5/717 |

OTHER PUBLICATIONS

Paneltec Corp web site, 8 pages, undated (obtained from www on Feb. 11, 2009).

Poisson's Ratio—Wikipedia, 1 page, undated (obtained from www on Feb. 4, 2009).

"Expandable Grids—Made of Ethafoam Brand Polyethylene Foam", 7 pp, Dow, (Dec. 1997).

Ethafoam® 600 polyethylene foam, Sealed Air Corporation, 2 pp. (Jan. 2008).

Ethafoam® 400 polyethylene foam, Sealed Air Corporation, 2 pp. (Jan. 2008).

Ethafoam® 220 polyethylene foam, Sealed Air Corporation, 2 pp. (Jan. 2008).

Cellu-Cushion® polyethylene foams, Sealed Air Corporation, 1 pg. (1997).

Cell-Aire® polyethylene foams, Sealed Air Corporation, 1 pg. (1997).

"Stratocell® E,S,H Plus—Special Density Foam and Film Laminates", Sealed Air Corp, 2 pp (Oct. 2005).

"Polyethylene Foam", Sealed Air Corp, 3 pp (1997-2009).

* cited by examiner

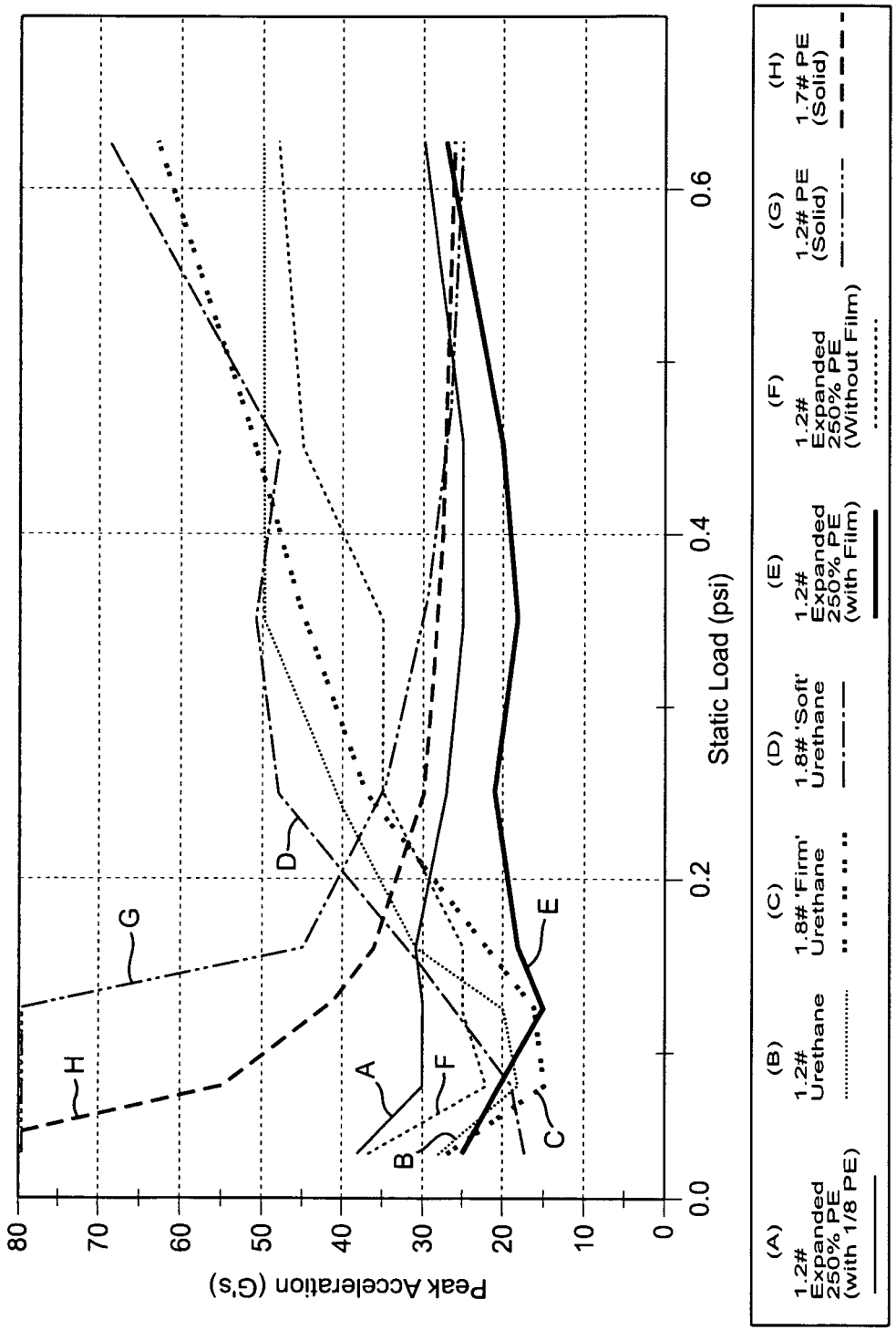

US 8,486,507 B2

EXPANDABLE FOAM SHEET THAT LOCKS IN EXPANDED CONFIGURATION

FIELD AND BACKGROUND OF THE INVENTION

The present invention generally relates to expandable sheet articles, and in particular to a foam sheet that is expandable.

Expandable foam sheet is made by providing solid foam sheet with a plurality of slits so that mechanical force can be applied to the foam sheet to expand it in one or more directions. Expansion in one direction can form a honeycomb-type structure. Expandable foam sheet has been designed to be expanded along its length, or along its width, or even in both length and width. Expandable foam sheet has been taught for a variety of uses, such as in flooring systems, as carpet underlayment, thermal insulation sheet for garments, pipes and conduits, self-inflating mattresses, concrete blanket, and concrete underlayment.

Expandable foam sheet made from thermoplastic foam such as polyethylene foam exhibits elastic character during expansion. That is, as force is applied to expand the foam sheet in one or more dimensions, the foam sheet exhibits an elastic restorative force that, unless opposed, results in the foam sheet returning to its unexpanded configuration. Typically, means external to the foam itself, such as adherence of the expanded foam sheet to a rigid member with an adhesive, retains the foam sheet in its expanded configuration.

SUMMARY OF THE INVENTION

It has been discovered that an expandable foam sheet of low density can be made so that upon expansion, the expanded sheet "locks" in its expanded configuration, with each slit opening up to form a single free volume (i.e., hole through the foam sheet), with the expanded foam sheet exhibiting a high locking pressure, i.e., a high pressure-to-close. This is advantageous in that an expanded low density foam sheet that locks securely into its expanded configuration is useful in packaging and other applications without using a separate means to retain the foam sheet in its expanded configuration, and with little risk that the foam will collapse back into its unexpanded configuration. The low density expanded foam sheet also offers enhanced cushioning properties due to the enhanced softness from the slitting and expansion of the low density foam.

It has been discovered that obtaining a high pressure-to-close in a low density foam sheet, i.e., a strong lock in the expanded configuration, is dependent upon the kind of slit shape cut into the foam. The strong locking feature is also dependent upon the arrangement of the slits relative to one another, the density of the foam sheet, the thickness of the foam sheet, and the size of the slits. That is, unless the slit arrangement, foam density, sheet thickness, and slit size are utilized in the proper combination, and in combination with a slit shape of a kind capable of providing a strong lock in the expanded configuration, the expanded low density foam sheet will exhibit little or no pressure-to-close.

By utilizing an operable combination of foam density, sheet thickness, slit shape, slit size, and the proximity of the slits to one another, the expandable foam sheet of the invention can be expanded from an initial zero energy state (i.e., relaxed in unexpanded configuration) through an activation energy state to a final expanded energy state, which final expanded energy state is substantially lower than the activation energy state. In this manner, the expanded foam sheet retains its expanded configuration, with each slit producing only a single free volume in the expanded sheet. In order to return the expanded foam sheet to its initial unexpanded foam sheet configuration, the minimum energy requirement may be the difference between the activation energy state and the final expanded energy state.

A first aspect of the invention is directed to an expandable foam sheet comprising a plurality of discrete slits therein, the foam sheet being mechanically expandable from an unexpanded foam sheet configuration to an expanded foam sheet configuration. The expandable foam sheet has a density of from 14 g/liter to 48 g/liter in the unexpanded configuration and a thickness of from 6 mm to 50 mm. The slits are of a size and shape and arrangement so that the expanded foam sheet locks into the expanded configuration by exhibiting a pressure-to-close of at least 5 gm/cm$^2$. Each of the slits provides only a single free volume in the expanded foam sheet.

A second aspect of the invention is directed to an expandable foam sheet comprising a plurality of discrete slits therein, the foam sheet being mechanically expandable from an unexpanded foam sheet configuration to an expanded foam sheet configuration. The unexpanded foam sheet configuration comprises a plurality of stabilization walls X, with each stabilization wall comprising a plurality of cavity wells along a first side thereof, and a plurality of cavity wells along a second side thereof. The cavity wells are bounded on a first side by a first finger extending from and integral with the stabilization wall, and bounded on a second side by a second finger extending from and integral with the stabilization wall. The fingers extend between adjacent cavity wells on the same side of the stabilization wall. Moreover, the cavity wells contain at least a portion of a finger from an adjacent stabilization wall extending thereinto, with the finger within the cavity well being hingedly attached to an associated pair of expansion-and-locking arms, including being hingedly attached to a first end of a first expansion-and-locking arm within said cavity well and hingedly attached to a first end of a second expansion-and-locking arm also within said cavity well. The first expansion-and-locking arm has a second end that is hingedly attached to the first finger bounding the first side of the cavity well. The second expansion-and-locking arm has a second end that is hingedly attached to the second finger bounding the second side of the cavity well. The first expansion-and-locking arm has at least one serpentine edge and the second expansion-and-locking arm also has at least one serpentine edge. The expanded foam sheet configuration comprises the plurality of stabilization walls X and a plurality of locking arm walls Y, with the plurality of stabilization walls X and the plurality of locking arm walls Y alternating in X-Y-X-Y arrangement, with a single stabilization wall being connected to a single locking arm wall by a plurality of the fingers extending from and integral with the stabilization wall. The locking arm walls comprise a plurality of pairs of first and second expansion-and-locking arms in inverted position, with the first and second expansion-and-locking arms in inverted position having emerged from the cavity well of the unexpanded foam sheet during expansion of the foam sheet so that said first and second expansion-and-locking arms are locked in the inverted position. The plurality of cavity wells together with the plurality of associated pairs of expansion-and-locking arms locked in inverted position surround a corresponding number of discrete free volumes within the expanded foam sheet. The expandable foam sheet has a density of from 14 g/liter to 100 g/liter in the unexpanded configuration and a thickness of from 6 mm to 160 mm. The slits are of a size and shape and arrangement so that the expanded foam sheet locks into the expanded configuration by exhibiting a pressure-to-close of at least 5 gm/cm². Each of the slits provides only a single free volume in the expanded foam sheet.

A third aspect of the invention is directed to a cushioning article, comprising an expandable foam sheet in expanded configuration, with the foam sheet having a non-expandable foam sheet or film adhered thereto. The expandable foam sheet has a density of from 14 to 100 grams per liter in its unexpanded configuration and a thickness of from 3 mm to 100 mm. The expanded foam sheet has been made from an expandable foam sheet comprising a plurality of discrete slits therein, the foam sheet being mechanically expandable from an unexpanded foam sheet configuration to an expanded foam sheet configuration, with the slits being of a size and shape and arrangement so that the expanded foam sheet locks into the expanded configuration by exhibiting a pressure-to-close of at least 5 gm/cm². Each of the slits provides only a single free volume in the expanded foam sheet.

A fourth aspect of the invention is directed to a cushioning article comprising: (A) a support plate having first and second face surfaces, the support plate comprising a first expanded foam sheet, (B) a first cushioning block comprising a second expanded foam sheet having first and second face surfaces, the first cushioning block having an edge surface adhered to a first expanded face surface of the support plate, and (C) a second cushioning block comprising a third expanded foam sheet having first and second face surfaces, the third cushioning block having an edge surface also adhered to the first expanded face surface of the support plate. The first and second cushioning blocks are adhered to the first expanded face surface of the support plate in an arrangement providing a location to provide cushioning for an article to be packaged above the support plate and between the first and second cushioning blocks.

A fifth aspect of the invention is directed to a cushioning article comprising a plurality of expanded foam sheets adhered to one another, including a first expanded foam sheet having a face surface adhered to a face surface of a second expanded foam sheet in a layered arrangement therewith, with both the first and second expanded foam sheets having respective coincident internal edge surfaces surrounding a cavity for receiving a product.

BRIEF DESCRIPTION OF THE DRAWINGS

FIG. 81 is a graph illustrating acceleration as a function of load for a variety of cushioning articles.

DESCRIPTION OF PREFERRED EMBODIMENTS

Figure 1:
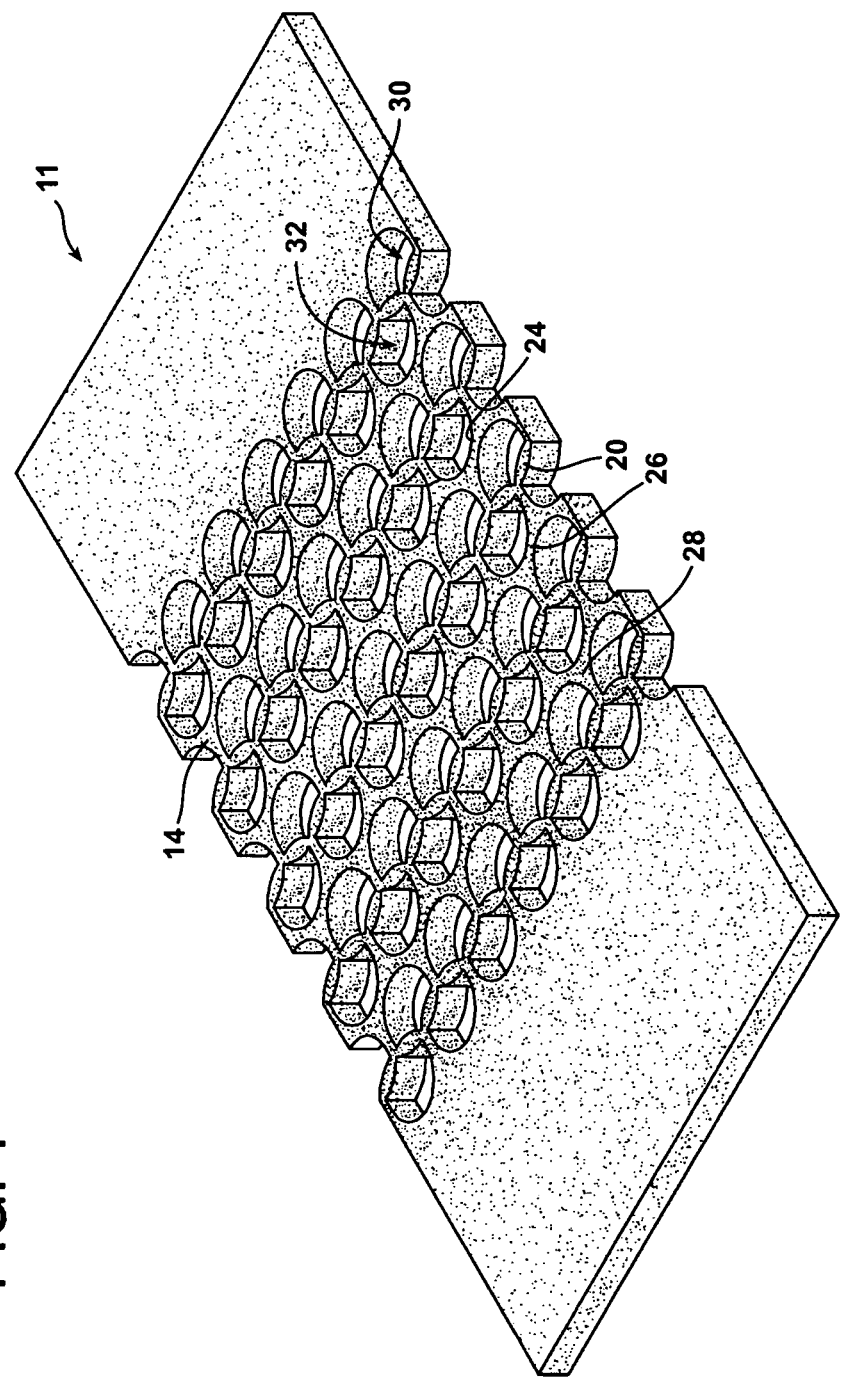
FIG. 1 is a perspective view of a first embodiment (0-Straight) of an expandable foam sheet, in expanded configuration.

As used herein, the phrase "foam sheet", which includes the phrases "expandable foam sheet" and "expanded foam sheet", refers to a sheet comprising foam. While the foam sheet may be 100 weight percent foam, alternatively the foam sheet may comprise components that are not in foamed form, e.g., solid, non-foam particulates, liquid, or other non-foam matter. The foam sheet can be at least 80 weight percent foam, or at least 90 weight percent foam, or at least 95 weight percent foam, or at least 98 weight percent foam, or at least 99 percent foam, or at least 99.5 weight percent foam, or 100 weight percent foam. As used herein, the phrase "locking foam sheet" refers to an expandable foam sheet that, upon the application of mechanical force to expand the width or length of the sheet, elongates in at least one direction and if elongated enough locks in an expanded configuration so that it requires a positive force to close back to its unexpanded configuration.

The expandable foam sheet for use in the present invention can be made from foam that responds elastically to the application of mechanical force. For example, the foam sheet can comprise at least one member selected from the group consisting of polyolefin and/or polyurethane. More specifically, the foam can be made from at least one member selected from the group consisting of ethylene homopolymer or copolymer (including ethylene/alpha-olefin copolymer), propylene homopolymer or copolymer (including propylene/alpha-olefin copolymer), polyurethane, rubber, silicone resin, ethylene/methyl acrylate copolymer, ethylene/butyl acrylate copolymer, ethylene/acrylic acid copolymer, ethylene/methacrylic acid copolymer, ionomer resin, styrene/butadiene copolymer, styrene/butadiene/styrene random and block copolymer, styrene/isoprene/styrene random and block copolymer, and styrene/ethylene/butylene copolymer.

Polyolefin foams, particularly polyethylene foams, and methods for manufacturing such foams are well known in the art. See, e.g., U.S. Pat. No. 5,348,984 (Lee), U.S. Pat. No. 5,462,974 (Lee), U.S. Pat. No. 5,667,728 (Lee), U.S. Pat. No. 6,462,101 (Ramesh et al), and U.S. Pat. No. 6,770,683 (Ramesh et al), the disclosures of which are incorporated herein by reference thereto. One of the most common polyethylenes used is low density polyethylene (LDPE).

As used herein, the term "slit" refers to a cut through the thickness of the foam sheet. While the cut through the thickness of the foam can include the detachment of one or more portions of the foam sheet from the remainder of the sheet, preferably the slit is a cut through the foam sheet without detaching any portion of the foam sheet from the remainder of the foam.

Alternating rows of slits of the same shape, same size, and same orientation can be used in various embodiments of the expandable foam sheet of the invention. Each row of slits is made up of individual slits having an overall "C shape" in the sense that each cut produces an overall convex foam surface on one side of the slit and an overall concave foam surface on the other side of the slit. The open side of the C-shaped slit is herein described as being "concave". The open side of the C-shaped slit defines a "cavity well". While the cavity wells are full of foam when the slit, expandable foam sheet is in its unexpanded configuration, the cavity wells are substantially emptied of foam by the pivoting and locking of the expansion-and-locking arms during expansion of the expandable foam sheet.

Each slit can be spaced a short distance from an adjacent slit in the same row of slits. The slits of a given row can optionally be of the same shape, size, and orientation. While the rows of slits extend across the entirety of the width of the expandable foam sheet, and while the rows of slits can be perpendicular to the direction of expansion, the rows of slits can be angled with respect to the direction of expansion, and can be linear rows or curved rows, including serpentine rows, sinusoidal rows, or even irregularly changing rows.

The shape and size and arrangement of the slits are significant factors in a combination that can provide relatively low density foam with a pressure-to-close of at least 5 gm/cm$^2$. Many slit shapes will not produce a pressure-to-close of at least 5 gm/cm$^2$ in a foam sheet having a density of from 14 to 46 g/liter. The expandable foam sheet can exhibit a pressure-to-close of from 5 to 40 g/cm$^2$ or from 6 to 30 g/cm$^2$, or from 6 to 25 g/cm$^2$, or from 6 to 20 g/cm$^2$, or from 6 to 15 g/cm$^2$, or from 6 to 10 g/cm$^2$, or from 7 to 30 g/cm$^2$, or from 7 to 25 g/cm$^2$, or from 7 to 20 g/cm$^2$, or from 7 to 15 g/cm$^2$, or from 8 to 30 g/cm$^2$, or from 8 to 25 g/cm$^2$, or from 8 to 20 g/cm$^2$, or from 8 to 15 g/cm$^2$.

While all the slits in a given foam sheet can be of the same shape and size, and while all of the slits in a given row can be spaced apart from one another at uniform intervals, the rows of cuts alternate in -A&B-A&B-A&B- arrangement, with the concavity of each slit in a row of slits A facing toward the concavity of each slit in a "coupled" row of slits B. Moreover, the slits in coupled rows A&B "interlock" with each other, in that each A slit has a first terminal portion within a first cavity well of a first coupled B slit and a second terminal portion with a second cavity well of a second coupled B slit. Likewise, each B slit has a first terminal portion within a first cavity well of a first coupled A slit and a second terminal portion with a second cavity well of a second coupled A slit. The degree of interlocking determines the length of the expansion-and-locking arms.

As used herein, the phrase "expansion-and-locking arm" refers to those portions of the expandable foam sheet that pivot during expansion of the foam sheet. Expansion-and-locking arms pivot from an initial position into an inverted and locked position. The expansion and locking arms can be of uniform width, of substantially uniform width, or non-uniform width. An expansion-and-locking arm of substantially uniform width has a width that does not vary more than 10% throughout the arm length. In at least one embodiment, an expansion-and-locking arm of non-uniform width is wider in a middle region than at end regions at which the expansion-and-locking arms are hingedly attached to the fingers.

A cavity well in the expandable foam sheet contains a pair of expansion-and-locking arms. The pair of expansion-and-locking arms in the cavity well of an unexpanded foam sheet can be symmetrical in shape and orientation. Alternatively, the expansion-and-locking arms can be of a-symmetrical shape and/or a-symmetrical orientation in the cavity well of the unexpanded foam sheet.

The edges that run the length of the expansion-and-locking arms can be curved or linear. If curved, the edges can be of a single arc with no inflection point, or serpentine with one or more inflection points. As each expansion-and-locking arm has two edges running the length thereof, the edges may be different, i.e., an inner edge (towards the center of the cavity well in the unexpanded foam sheet, i.e., against the finger in the unexpanded foam sheet) may be linear, while the outer edge (against the wall of the cavity well) is curved, or vice-versa. In some embodiments, both edges of the expansion-and-locking arms are serpentine with one inflection point.

Figure 2A:
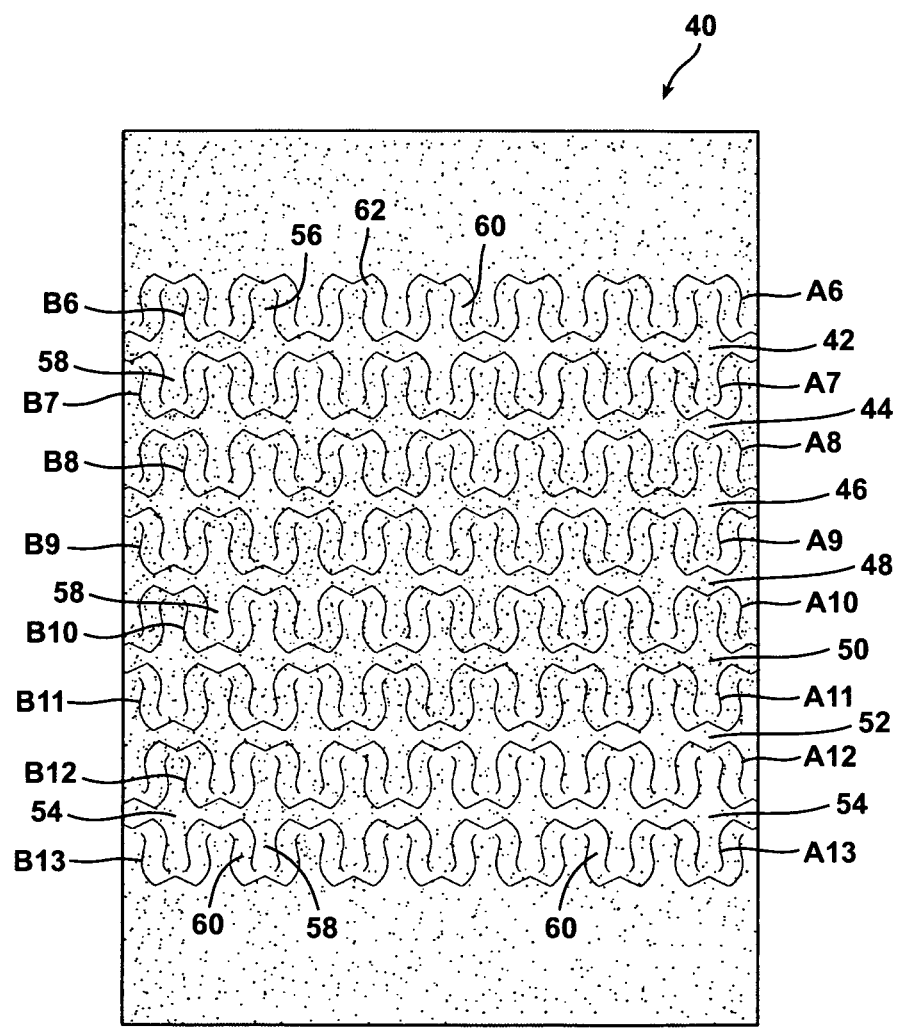
FIG. 2A is a top view of a second embodiment (B1) of an expandable foam sheet, in unexpanded configuration.
Figure 2B:
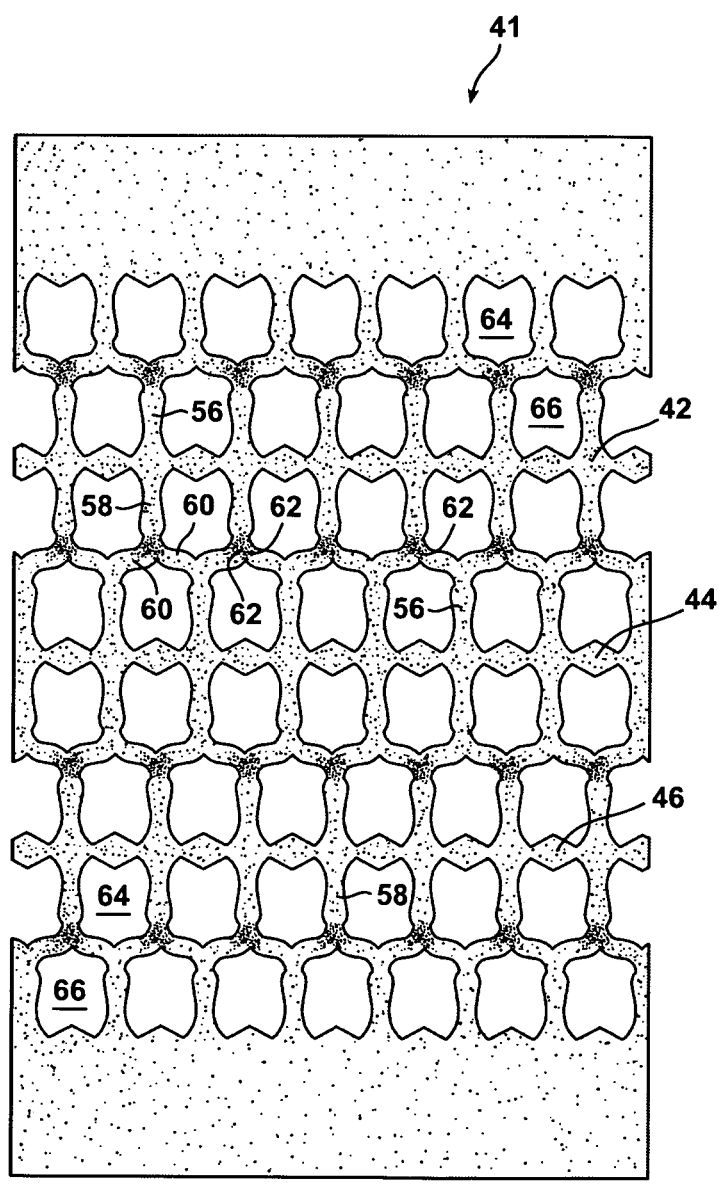
FIG. 2B is a top view of the foam sheet illustrated in FIG. 2A, in its expanded configuration.
Figure 2C:
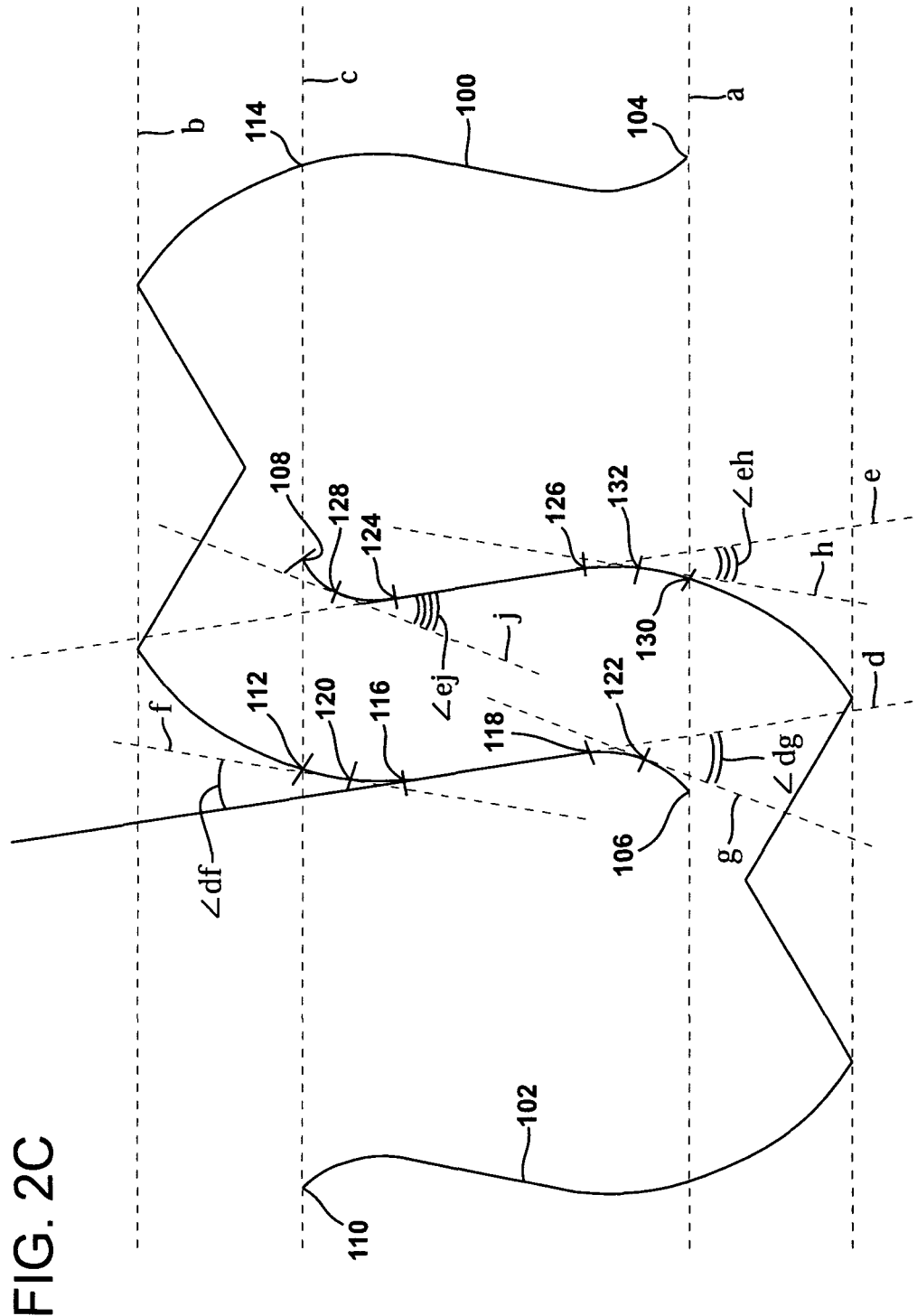
FIG. 2C is an enlarged schematic top view of a portion of the expandable foam sheet of FIGS. 2A and 2B, illustrating the cut pattern with angle lines for determining the degree of serpentine curvature of the expansion-and-locking arms, and additional distances and features.
Figure 3A:
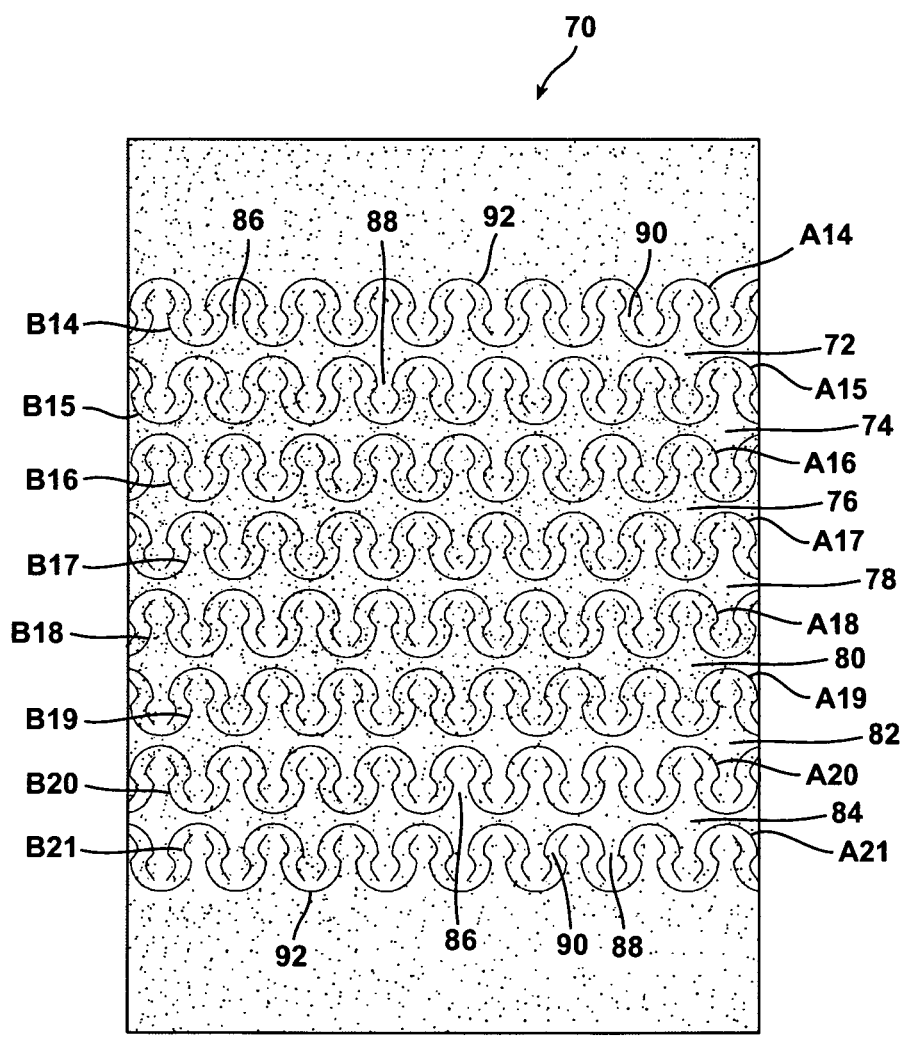
FIG. 3A is a top view of a third embodiment of an expandable foam sheet, in unexpanded configuration.
Figure 3B:
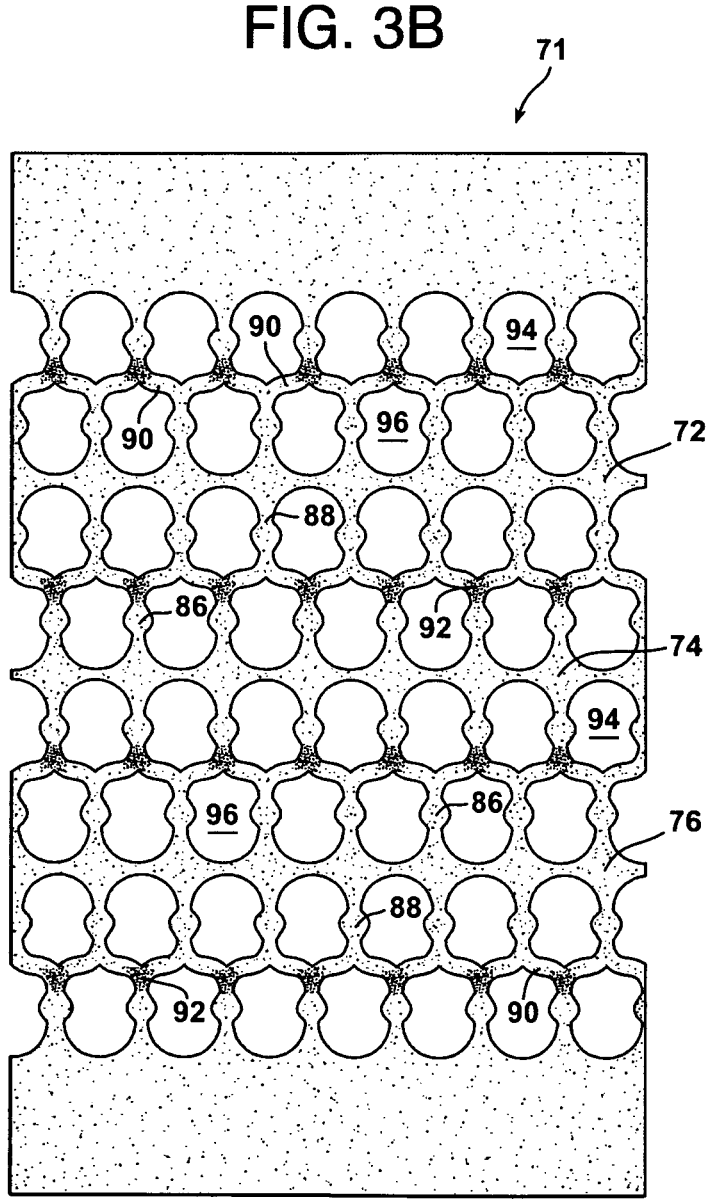
FIG. 3B is a top view of the foam sheet illustrated in FIG. 3A, in its expanded configuration.
Figure 3C:
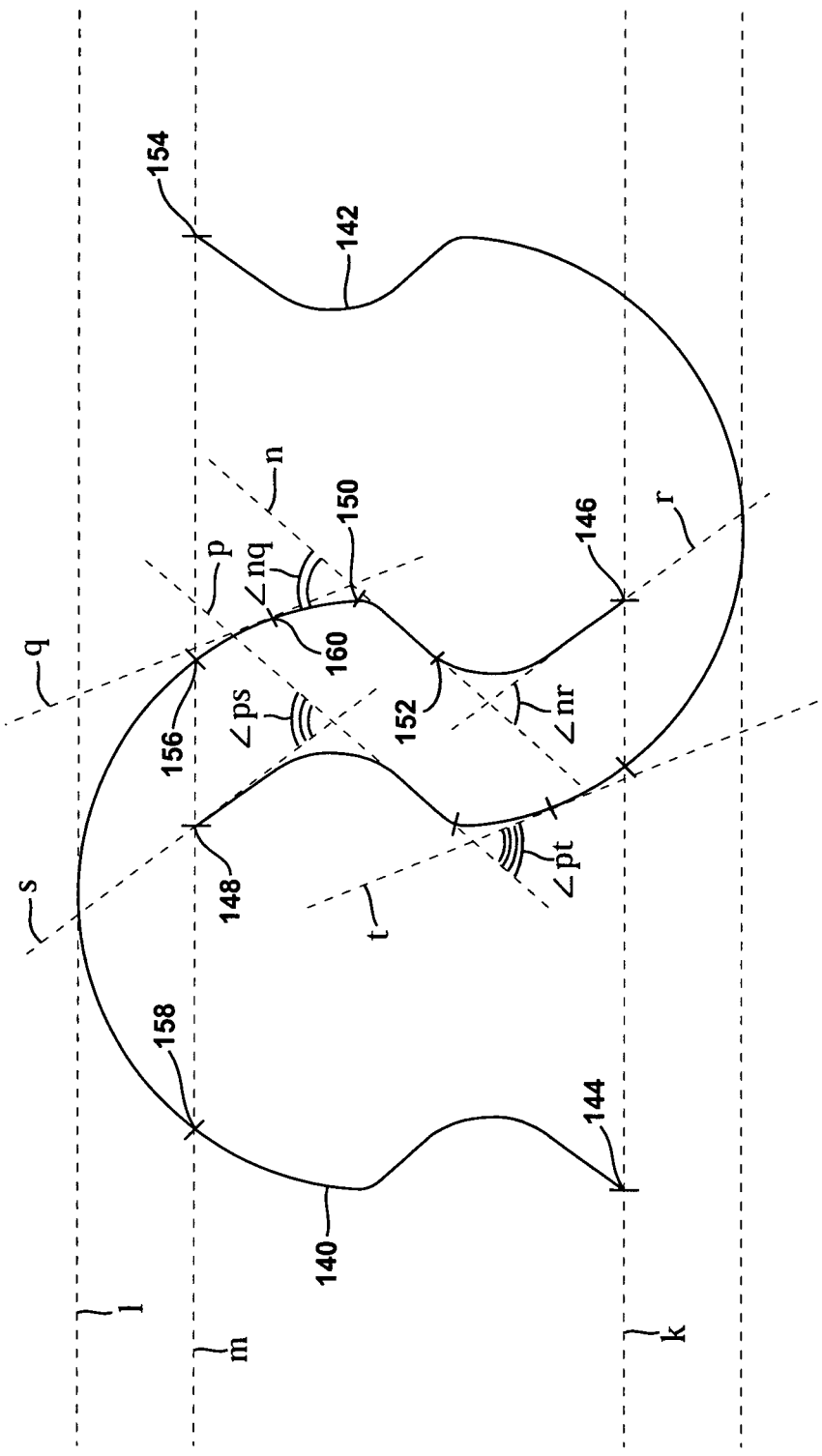
FIG. 3C is an enlarged schematic of a portion of the expandable foam sheet of FIGS. 3A and 3B, illustrating the cut pattern with angle lines for determining the degree of serpentine curvature of the expansion-and-locking arms, and additional features and distances.

FIG. 2C and FIG. 3C, and their respective descriptions below, illustrate the manner in which the total serpentine angle of a serpentine edge is measured, as well as the manner of measurement of the total serpentine angle of an expansion-and-locking arm having two serpentine edges. The expansion-and-locking arms can have a total serpentine angle of from 20 to 250 degrees, or from 40 to 200 degrees, or from 45 to 170 degrees, from 30 to 200 degrees, or from 35 to 170 degrees, or from 40 to 150 degrees, or from 43 to 140 degrees.

The fingers bounding the cavity wells, i.e., on either side of the cavity wells, are integral with (i.e., of one piece with) the stabilization wall. The length of the fingers is from the base of the finger to the tip of the finger. The base of the finger is established by a line representing the extent to which the coupled slit interlocks with the cavity well into which the finger extends. The finger can have tip that is straight or tapering, as in the 0-Straight embodiment of FIG. 1, or can have an enlarged tip that is wider than at least a portion of the remainder of the finger, as in the B1 and B5 embodiments described herein. In the event that the inside edges of both expansion-and-locking arms are serpentine, the finger has an enlarged region, either at its tip or elsewhere along its length.

Each end of each expansion-and-locking arm is hingedly attached to a finger extending from a stabilization wall. The "hinge" is that portion of the foam extending from the end of a slit towards the nearest slit in the adjacent coupled row of slits. The hinge includes the line from the end of the slit to the nearest point in the slit in the adjacent row, as well as foam on either side of the line. As the expansion-and-locking arms pivot on the hinges, foam on one side of the line is compressed as foam on the other side of the line is stretched. As the expansion-and-locking arm is compressed in length, foam on both sides of the hinge line may be compressed. In the unexpanded foam sheet, the hinged connection of the expansion and locking arms to the fingers can have a hinge width of from 0.06 inch to 0.16 inch, or from 0.06 to 0.2 inch, or from 0.07 to 0.18 inch, or from 0.08 0.16 inch, or from 0.09 to 0.16 inch.

In a cavity well, the distance between the ends of the slits extending into the cavity well (i.e., the portions of the interlocking slits that form the edges of the finger, which is entirely within the cavity well) is herein termed the "hinge separation distance". The hinged connection of the first expansion-and-locking arm to the finger in the cavity well can be separated from the hinged connection of the second expansion-and-locking arm to the finger in the cavity well by a hinge separation distance of from 0.06 to 0.16 inch, or from 0.06 to 0.2 inch, or from 0.07 to 0.18 inch, or from 0.08 to 0.16 inch, or from 0.09 to 0.16 inch.

As used herein, the "axis" of an expansion-and-locking arm is a line connecting the center of the hinge regions at opposite ends of the expansion-and-locking arm. During expansion of the foam sheet, the expansion-and-locking arm "pivots" on the hinges at each end of the arm. During expansion of the foam sheet, the expansion-and-locking arm pivots from its position within the cavity well to its inverted and locked position. The angular change of the axis of the expansion and locking arm, i.e., the "degrees of pivoting", can be calculated relative to the direction of expansion. The degrees of pivoting is different for different slit shapes and different slit arrangements.

As used herein, with respect to an expanding foam sheet, the phrase "unit cell" is used with respect to the size of the slits and their arrangement in the expandable foam sheet. The width of a unit cell is defined by the distance between the corresponding points on adjacent fingers, i.e., the repeat finger-to-finger distance. The length of a unit cell is defined by the distance between corresponding points on adjacent stabilization walls, i.e., the repeat stabilization wall-to-stabilization wall distance. Since the foam sheet expands in length, the unit cell area is larger for the expanded sheet than for the unexpanded sheet, because the stabilization wall-to-stabilization wall distance is greater in the sheet in expanded configuration than in the foam sheet in unexpanded configuration. The term "scale", as used in the examples, is the factor by which these repeat distances are multiplied with respect to an initial embodiment having a scale of 1.

Unless otherwise indicated to the contrary, the expandable foam sheet can have a thickness of from 6 to 160 millimeters, or from 6 to 50 millimeters, or from 6 millimeters to 38 millimeters, or from 9 to 32 millimeters, or from 12 to 26 millimeters, or from 12 to 19 millimeters.

As used herein, a single free volume in an expanded foam sheet is the volume occupied by a "hole" produced from the separation of a slit during the expansion process. Moreover, the percent free volume of an expanded foam sheet, i.e., the total amount of volume from the holes in the expanded sheet, is determined by first measuring the length of the foam sheet in its unexpanded configuration ($L_u$). The length of the foam sheet is in the dimension corresponding with the direction of expansion of the foam sheet. Mechanical force is then applied to the foam sheet to expand the foam sheet to its expanded configuration with the all of the expansion-and-locking arms in their inverted and locked positions. Then the length of the expanded foam sheet is measured ($L_e$). Since the width of the foam sheet is substantially the same both before and after expansion (the width may be slightly greater after expansion, as the foam sheet may exhibit auxetic expansion), and since the thickness of the sheet remains substantially the same before and after expansion, and since the density of the foam does not substantially change during expansion, the percent free volume can be calculated as follows: % free volume= $(L_e-L_u)/L_e \times 100$. For example, if the foam sheet in its expanded configuration is twice as long as the foam sheet in its unexpanded configuration, the percent free volume is 50%. If the foam sheet exhibits auxetic behavior, the percent increase in width of the sheet is added to the free volume measurement, i.e., % free volume=$[(L_e-L_u)/L_e \times 100]+[(W_e-W_u)/W_e \times 100]$, where $W_e$ represents width expanded and $W_u$ represents width unexpanded. The expandable foam sheet may expand in a manner that provides a percent free volume of from 40 percent to 70 percent, or from 45 to 65 percent, or from 50 to 60 percent.

Various embodiments of the expandable foam sheet are designed to produce free volume by substantial expansion in length (i.e., the operational direction of expansion), with less than 5 percent expansion in width, or less than 3 percent expansion in width. The foam sheet has faces, side edges, and end edges. The face surfaces are the surfaces exhibiting the cut patterns illustrated in FIGS. 4-76. The side edges are the side edges running the length of the foam sheet. The side edges increase in length as the foam sheet undergoes expansion in the operational direction. The end edges of the foam sheet remain approximately the same size as the foam sheet undergoes expansion in the operational direction.

As used herein, the phrase "lengthwise direction" is used with respect to the direction of expansion of a foam sheet that expands in one direction only. The phrase "transverse direction" is used with respect to the direction perpendicular to the lengthwise direction. While the rows of slits cut into the foam sheet to render it expandable can be oriented transversely, the rows of slits can alternatively be oriented at an angle other than 90 degrees with respect to the direction of expansion.

Force to close is measured by pressing the edge of a sample of expanded foam sample against a scale until a first row of locking arm walls returns from its inverted and locked configuration to its closed configuration. The scales that have been used for the measurement of force-to-close include an electronic (digital) scale manufactured by Pelouze, model PE10, as well as model PE5. Samples were tested by repeating the closing process three times and averaging the values obtained. The first number obtained was the force-to-close the first time the sample was expanded and closed (i.e., a virgin sample), and this number tended to be a little higher than the second closing or the third closing. The force-to-close can be measured directly from the scale as the first row of locking arms returns from inverted and locked configuration to closed configuration. The electronic scale must be manually watched in order to see the force-to-close reading.

Generally, the force-to-close of the expandable foam sheets in Tables 1 and 17 were measured using a sample piece of foam 80 mm wide, in the thickness indicated. However, several of the large scale cut patterns required a doubling of the sample, i.e., use of a 160 mm wide sample in order to obtain an accurate value for the force-to-close. The pressure-to-close was calculated from the force-to-close by dividing the force-to-close by the cross-sectional area of the sample being tested.

In its unexpanded configuration, the expandable foam sheet comprises a plurality of rows of slits A and a plurality of rows of slits B, with each row of slits A having a plurality of A slits therein, and each row of slits B having a plurality of B slits therein. Each row of slits A alternating with each row of slits B in -A&B-A&B-A&B- arrangement, with each row of slits A being coupled with one adjacent row of slits B on a first side of row of slits A; each row of slits B is coupled with the adjacent row of slits A on a first side of row of slits B. Each row of slits A comprises A slits with a concavity facing coupled row of slits B and each row of slits B comprising B slits with a concavity facing coupled row of slits A. Each of the A slits in each row A interlocks with each of the B slits B in each row of slits B in that in each coupled row of slits A and B, the A slits have ends extending into the cavity wells of coupled B slits, and the B slits have ends extending into the cavity wells of coupled slits A. The expansion-and-locking arms are formed by foam between the rows of slits A interlocked with the rows of slits B. The stabilization walls and fingers extending therefrom are formed by foam between adjacent but uncoupled rows of slits A and rows of slits B.

Each A slit in each row of slits A has a concavity facing B slits in the coupled row of slits B. Each A slit in the row of slits A can have a width-to-depth ratio of from 0.5 to 1.5, or 0.5 to 1.4, or 0.6 to 1.3, or 0.7 to 1.2, or 0.8 to 1.2, or 0.9 to 1.2. Each B slit in the row of slits B can have a width-to-depth ratio of from 0.5 to 1.5, or from 0.5 to 1.4, or from 0.6 to 1.3, or from 0.7 to 1.2, or from 0.8 to 1.2, or from 0.9 to 1.2.

Each A slit in the row of slits A can have a depth of from 6 mm to 25 mm, or from 7 to 18 mm, or from 7 to 15 mm, or from 7 to 12 mm. Each B slit in row of slits B can have a depth of from 6 mm to 25 mm, or from 7 to 18 mm, or from 7 to 15 mm, or from 7 to 12 mm.

In the expandable foam sheet, the fingers and cavity wells on each side of each stabilization wall can be aligned directly across from one another, along a line perpendicular to a line running through the middle of the stabilization wall. Alternatively, the fingers and cavity wells on each side of each stabilization wall can be offset from one another (i.e., staggered) along a line having an angle of from 45 to 89 degrees with respect to a line running through the middle of the stabilization wall. The cavity wells and fingers on each side of the stabilization wall can be uniformly spaced apart in a repeating distance, or spaced at non-uniform, irregular, or random intervals.

In one embodiment, the expandable foam sheet comprises A slits coupled with B slits, with the coupled A and B slits having a width-to-depth ratio of from 0.8 to 1.3, with the coupled A and B slits being at least 60% interlocked with respect to each other, or interlocked from 60 to 90%, or interlocked from 65 to 80%, or interlocked from 70 to 75%, with both the A slits and the B slits having a convex region at a bottom of the concavity. The convex region in the A slits protrudes toward the coupled B slits, and the convex region in the B slits protrudes towards the coupled A slits, with the convex region at the bottom of the concavities being formed by a slit line having a centrally-positioned inflection point that is the intersection of two linear slit lines intersecting at an angle of from 60 to 140 degrees, or from 80 to 160 degrees, or from 90 to 150 degrees, or from 100 to 140 degrees, or from 110 to 130 degrees. This convex region extends across at least 40 to 80 percent of the width of the slit, or from 30 to 90 percent, or from 50 to 70 percent, or from 57 to 67 percent of the width of the slit. The first expansion-and-locking arm has two serpentine edges and the second expansion-and-locking arm has two serpentine edges. The first and second expansion- and locking arms each has a total serpentine angle of from 35 to 50 degrees, or from 20 to 80 degrees, or from 30 to 60 degrees. The first and second expansion-and-locking arms each have a substantially uniform width of from 0.06 inch to 0.75 inch. The first and second expansion-and-locking arms pivoting through an angle of from 100 to 120 degrees as the expandable foam sheet is expanded from its unexpanded configuration to its expanded configuration with the expansion-and-locking arms in their inverted and locked position, with the first and second expansion-and-locking arms being hingedly connected to the fingers with hinges having a length of from 0.03 to 0.35 inch, or from 0.04 to 0.32 inch, or from 0.07 to 0.24 inch, or from 0.08 to 0.20 inch, or from 0.09 to 0.17 inch. The expandable foam sheet has a slit pattern with a repeat finger-to-finger distance of from 0.25 inch to 3 inches, or from 0.3 to 1.5 inches, or from 0.35 to 1 inch, or from 0.4 to 0.75 inch, and a repeat stabilization wall-to-stabilization wall distance of from 0.25 inch to 3 inches in the unexpanded configuration, or from 0.3 to 1.5 inches in the unexpanded configuration, or from 0.35 to 1 inch in the unexpanded configuration, or from 0.4 to 0.75 inch in the unexpanded configuration. Various embodiments of the B1 pattern set forth herein exemplify this embodiment.

In another embodiment, the expandable foam sheet comprises A slits coupled with B slits, with both the A slits and B slits having a width-to-depth ratio of from 0.9 to 1.4, with the coupled A and B slits being at least 70% interlocked with respect to each other, or interlocked from 70 to 95 percent, or interlocked from 75 to 90 percent, or interlocked from 80 to 90 percent. The cavity wells of the A slits and B slits comprise a first expansion-and-locking arm having two serpentine edges and a second expansion-and-locking arm having two serpentine edges. The first and second expansion- and locking arm each have a serpentine angle of from 130 to 150 degrees, or from 120 to 160 degrees, or from 110 to 170 degrees, or from 100 to 180 degrees, or from 90 to 200 degrees. The first and second expansion-and-locking arms have a substantially uniform width of from 0.05 to 0.5 inches. During expansion from the unexpanded configuration to the expanded configuration, the first and second expansion-and-locking arms pivot through an angle of from 90 to 110 degrees, or from 90 to 120 degrees, or from 95 to 105 degrees. The first and second expansion-and-locking arms are hingedly connected to the fingers with hinges having a length of from 0.03 to 0.35 inch, or from 0.04 to 0.32 inch, or from 0.07 to 0.24 inch, or from 0.08 to 0.20 inch, or from 0.09 to 0.17 inch. The expandable foam sheet has a slit pattern with a repeat finger-to-finger distance of from 0.25 inch to 3 inches, or from 0.3 to 1.5 inches, or from 0.35 to 1 inch, or from 0.4 to 0.75 inch. The expandable foam sheet has a repeat stabilization wall-to-stabilization wall distance of from 0.25 inch to 3 inches in the unexpanded configuration, or from 0.3 to 1.5 inches in the unexpanded configuration, or from 0.35 to 1 inch in the unexpanded configuration, or from 0.4 to 0.75 inch in the unexpanded configuration. Various examples of the B5 pattern disclosed herein exemplify this embodiment.

In another embodiment, the expandable foam sheet comprises A slits coupled with B slits, with both the A and B slits having an arcuate central portion without an inflection point, and a linear end portion on each side of the arcuate central portion, with the linear end portions providing a hinge angle of from +5 degrees to −5 degrees. The A slits and the B slits each have a width-to-depth ratio of from 1 to 1.8, or from 1.1 to 1.7, or from 1.2 to 1.6, or from 1.3 to 1.5, or from 1.35 to 1.40. The coupled A and B slits are at least 45 percent interlocked with respect to each other, or interlocked from 45 to 90 percent, or from 50 to 80 percent, or from 50 to 70 percent, or from 50 to 60 percent. The first expansion-and-locking arm has two arcuate edges without an inflection point, and the second expansion-and-locking arm also has two arcuate edges without an inflection point. The first and second expansion-and-locking arms are wider in their central region than at their end regions. The first and second expansion-and-locking arms pivot through an angle of from 90 to 105 degrees, or from 90 to 100 degrees, or from 92 to 96 degrees, as the expandable foam sheet is expanded from its unexpanded configuration to its expanded configuration. The first and second expansion-and-locking arms are hingedly connected to the fingers with hinges having a length of from 0.07 to 0.25 inch, or from 0.08 to 0.23 inch, or from 0.1 to 0.2 inch, or from 0.12 to 0.18 inch. The expandable foam sheet has a slit pattern with a repeat finger-to-finger distance of from 0.3 inch to 1.4 inches, or from 0.35 to 1.35 inches, or from 0.4 to 1.1 inch, or from 0.5 to 1.1 inch. The expandable foam sheet has a repeat stabilization wall-to-stabilization wall distance of from 0.3 inch to 1.4 inches in the unexpanded configuration, or from 0.35 to 1.4 inches in the unexpanded configuration, or from 0.4 to 1.1 inches in the unexpanded configuration, or from 0.5 to 1.1 inches in the unexpanded configuration. Various examples of the 0-Straight disclosed herein exemplify this embodiment.

In its unexpanded configuration, the expandable foam sheet can comprise a plurality of transverse stabilization walls X, each stabilization wall comprising a plurality of cavity wells along a first side thereof, and a plurality of cavity wells along a second side thereof. The cavity wells are bounded on a first side by a first finger extending from and integral with the stabilization wall and bounded on a second side by a second finger extending from and integral with the stabilization wall. The fingers extend between adjacent cavity wells on the same side of the stabilization wall, and the cavity wells have at least a portion of a finger from an adjacent stabilization wall extending thereinto. The finger within the cavity well is hingedly attached to an associated pair of expansion-and-locking arms, including being hingedly attached to a first end of a first expansion-and-locking arm within said cavity well, and hingedly attached to a first end of a second expansion-and-locking arm also within said cavity well. The first expansion-and-locking arm has a second end that is hingedly attached to the first finger bounding the first side of the cavity well. The second expansion-and-locking arm has a second end that is hingedly attached to the second finger bounding the second side of the cavity well.

In its expanded configuration, the expandable foam sheet can comprise a plurality of transverse stabilization walls X and a plurality of transverse locking arm walls Y. The plurality of transverse stabilization walls X and the plurality of transverse locking arm walls Y alternate in X-Y-X-Y arrangement. A single transverse stabilization wall is connected to a single transverse locking arm wall by a plurality of the fingers extending from and integral with the transverse stabilization wall. The locking arm walls comprise a plurality of pairs of first and second expansion-and-locking arms in inverted position, with said first and second expansion-and-locking arms in inverted position having emerged from the cavity well of the unexpanded foam sheet during expansion of the foam sheet so that said first and second expansion-and-locking arms are locked in the inverted position. The plurality of cavity wells and the plurality of associated pairs of expansion-and-locking arms locked in inverted position surround a corresponding number (i.e., the same number) of discrete free volumes within the expanded foam sheet.

Unless herein indicated to the contrary, the expandable foam sheet can have a density of from 0.6 to 6 lb/cu.ft, or from 0.7 to 7 lb/cu.ft., or from 0.8 to 5 lb/cu.ft., or from 0.9 to 4.5 lb/cu.ft, or from 1 to 4 lb/cu.ft, or from 1.2 to 4 lb/cu.ft., or from 1.2 to 3 lb/cu.ft., or from 1.2 to 2.2 lb/cu.ft, or from 1.2 to 1.7 lb/cu.ft., or alternatively from 14 to 100 g/liter, or 14 to 48 g/liter, or from 16 to 36 g/liter.

FIGS. 1 and 1A through 1H together illustrate a first preferred embodiment of an expandable foam sheet that can be made in accordance with the present invention. This embodiment is herein referred to as the "0-Straight" embodiment.

Figure 1A:
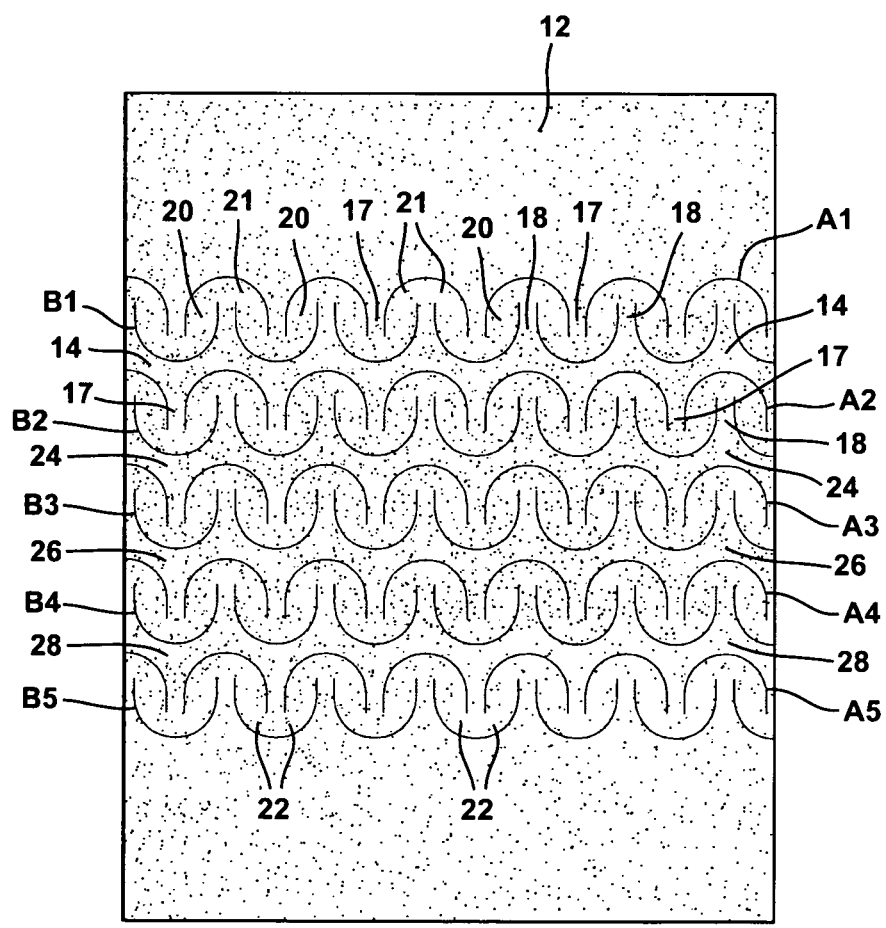
FIG. 1A is a top view of the foam sheet of FIG. 1 in unexpanded configuration.

FIG. 1A illustrates expandable foam sheet 10 in unexpanded configuration. Unexpanded, expandable foam sheet 10 comprises foam 12 has therein five transverse rows of "Type A" slits (A1, A2, A3, A4, and A5), and five transverse rows of "Type B" slits (B1, B2, B3, B4, and B5). Only five rows of Type A and Type B slits are illustrated for brevity. Generally, the foam sheet of the invention will be manufactured with a uniform covering of slits so that the entire foam sheet can be expanded.

The rows of Type A and Type B slits alternate in A1-B2-A2-B2-A3-B3-A4-B4-A5-B5 sequence. Moreover, the type A and B rows of slits are coupled together, providing a sequence of coupled rows of slits: -A1&B1-A2&B2-A3&B3-A4&B4-A5&B5 relationship. Each specific Type A row of slits is also interlocked with a row of Type B slits, in that the "cavity wells" of each concave slit contain the ends of two slits from the row coupled therewith.

As illustrated in FIG. 1A, row of slits A1 is coupled with row of slits B1, A2 with B2, and so on. However, row of slits B1 is adjacent to, but not coupled with, row of slits A2. The foam between these adjacent but unassociated rows of slits B1 and A2 makes up stabilization wall 14, as well as a plurality of fingers 16 extending from a first side of stabilization wall 14, and a plurality of fingers 18 extending from a second side of stabilization wall 14. Fingers 16 and 18 are integral with stabilization wall 14.

Each of the Type A slits in rows of slits A1-A5 has an overall curvilinear shape with an overall concavity facing the Type B slits in the respective rows of Type B slits B1-B5. Likewise, each of the Type B slits in rows of slits B1-B5 has an overall curvilinear shape with an overall concavity facing the Type A slits in the respective rows of Type A slits A-A5. A line connecting the ends of each individual Type A slit of a single row of slits (e.g., row of slits A1) crosses two lines, each representing a slit in coupled row of Type B slits (e.g., row of slits B1). Likewise a line connecting the two ends of each individual Type B slit of a single row of slits (e.g., row of slits B1) crosses two lines, each representing a slit in coupled row of Type B slits (e.g., row of slits A1). In this manner, associated Type A slits Type B slits 16 are "interlocked" with one another. That is, as illustrated in FIG. 1A, in unexpanded foam sheet 10, row of slits A1 is interlocked with row of slits B1.

Upon drawing a line connecting the two ends of an individual slit, the D-shaped area encompassed by the slit and the connecting line defines the boundary of a "cavity well". In the unexpanded foam sheet of FIG. 1A, a first side of stabilization wall 14 has fingers 16 extending into the cavity wells of each slit in row of slits A1. A second side of stabilization wall 14 has fingers 18 extending into the cavity wells of each slit in row of slits B2. The same relationship is present in the fingers extending from each side of additional stabilization walls 24, 26, and 28 of FIG. 1A.

A series of short lines (not illustrated) connecting together the ends of each successive slit of row of slits A2 slit of FIG. 1A, taken in combination with the individual lines representing the entire row of slits A2 in FIG. 1A, produce a first transverse line across the full width of expandable foam sheet 10. Likewise, a series of short lines (not illustrated) connecting together the ends of each successive slit of row of slits B2 of FIG. 1A, taken in combination with the individual lines representing the entire row of Type B2 of FIG. 1A, produces a second transverse line across the full width of expandable foam sheet 10. The foam between these two transverse lines represents a series of expansion-and-locking arms 20, as well as the regions of hinged connection 22 of expansion-and-locking arms 20 to fingers 17 extending from and integral with stabilization wall 14, as well as the regions of hinged connection 21 of expansion-and-locking arms 20 to fingers 18 of stabilization wall 24. The foam that makes up expansion-and-locking arms 20, and the regions of hinged connection 22 and 21 of the expansion-and-locking arms 20 to fingers 17 and 18, respectively, are further described below as they are more easily identified after the foam sheet is expanded.

Figure 1B:
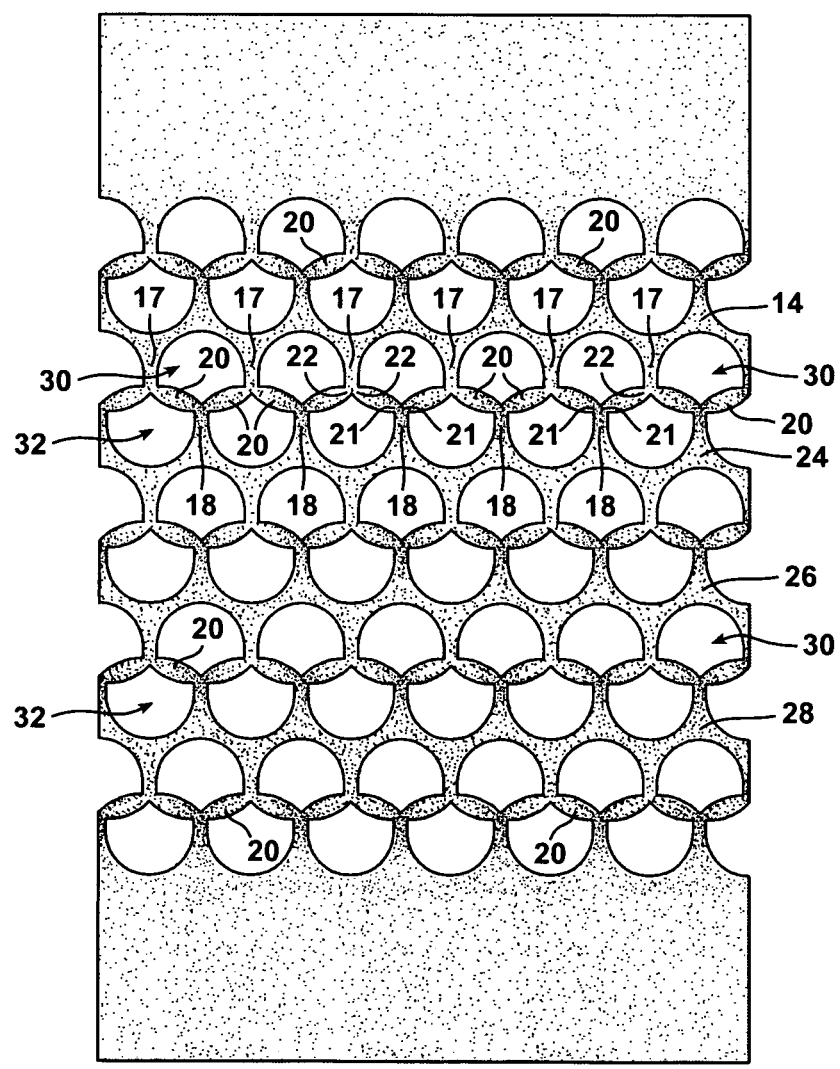
FIG. 1B is a top view of the foam sheet of FIG. 1 in its expanded configuration.
Figure 1C:
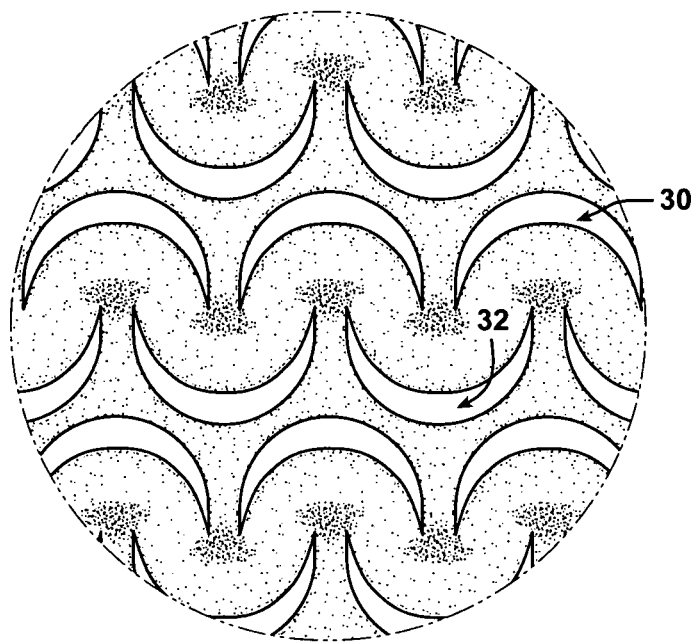
FIG. 1C is an enlarged view of a portion of the expanded foam sheet of FIG. 1 and FIG. 1A, as expansion passes through a first stage.

FIGS. 1, 1B, and 1C illustrate the expandable foam sheet 10 illustrated in FIG. 1A, except that in FIGS. 1, 1B and 1C, the foam sheet is illustrated in its expanded configuration, i.e., as expanded foam sheet 11. As is apparent from a comparison of FIG. 1A with FIGS. 1, 1B, and 1C, the expansion of the foam sheet is in a direction perpendicular to the rows of Type A slits and the rows of Type B slits. During expansion of the sheet, each slit forms a single free volume, i.e., a single hole through expanded foam sheet 11. The individual slits in the Type A rows of slits A1-A5 have opened up to form Type A free volumes 30, and the individual slits in the Type B rows of slits B1-B5 have opened up to form type B free volumes 32.

During expansion of the foam sheet, an applied mechanical stretching force perpendicular to the rows of slits causes each of the slits in each of the A1-A5 and B1-B5 rows of slits to open up and form a single free volume. The opening up of each of the slits occurs as the end of each of the fingers from stabilization walls 14, 24, 26, and 28 pulls on the associated pairs of expansion-and-locking arms 20 present in each of the cavity wells. As the fingers pull on the pairs of expansion-and-locking arms 20, the expansion and locking arms 20 pivot out of the cavity wells and into their final locked position in expanded foam sheet 1. Because the Type A slits are coupled with respective Type B slits, the simultaneous pivoting of an entire row of expansion- and locking arms from within the coupled cavity wells of the coupled rows of slits results in the formation of two rows of free volumes, with one row being a Type A free volumes 30, and the other row being the Type B free volumes 32. In the expandable foam sheet illustrated in FIGS. 1, 1A, 1B, and 1C, the Type A free volumes are mirror images of the Type B free volumes because the Type A slits are mirror images of the Type B slits, and because fingers are centrally positioned into each of the cavity wells of both the Type A slits and the Type B slits.

As illustrated in FIGS. 1 and 1B, upon expansion of the expandable foam sheet, expansion-and-locking arms 20 are readily apparent between stabilization walls 14 and 24, as are the hinged connections 22 of the first ends of expansion-and-locking arms 20 to the ends of fingers 17 extending from first stabilization wall 14, as well as the hinged connections 21 of the second ends of expansion-and-locking arms 20 to the ends of fingers 18 extending from stabilization wall 24. Each of expansion-and-locking arms 20 between stabilization walls 14 and 24 lock together to form a "locking arm wall". Similarly, expansion-and-locking arms 20, and their hinged connections to the ends of the fingers between adjacent stabilization walls 24 and 26, are also readily apparent in FIG. 1B, as are expansion-and-locking arms 20 and their hinged connections to the ends of the fingers between adjacent stabilization walls 26 and 28.

As in unexpanded foam sheet 10, expanded foam sheet 11 retains transverse stabilization walls 14, 24, 26, and 28. Unlike unexpanded foam sheet 10, expanded foam sheet 11 also exhibits a transverse locking arm wall between adjacent pair of stabilization walls. A transverse locking arm wall is present between adjacent stabilization walls 14 and 24. Another transverse locking arm wall is present between adjacent stabilization walls 24 and 26. Yet another transverse locking arm wall is present between adjacent stabilization walls 26 and 28. Each locking arm wall is made up of a row of expansion-and-locking arms 20 in their locked positions.

Figure 1D:
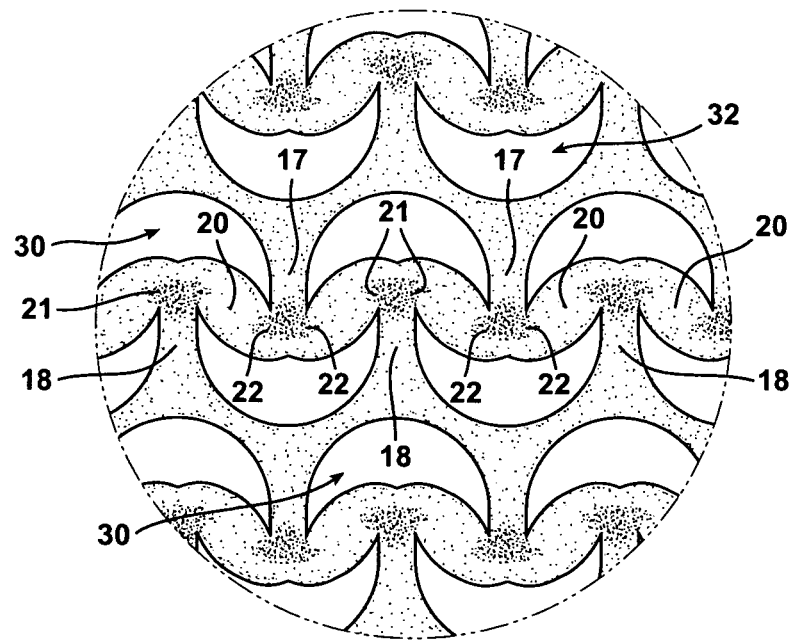
FIG. 1D is an enlarged view of a portion of the expanded foam sheet of FIG. 1 and FIG. 1A, as passes through a second stage.
Figure 1E:
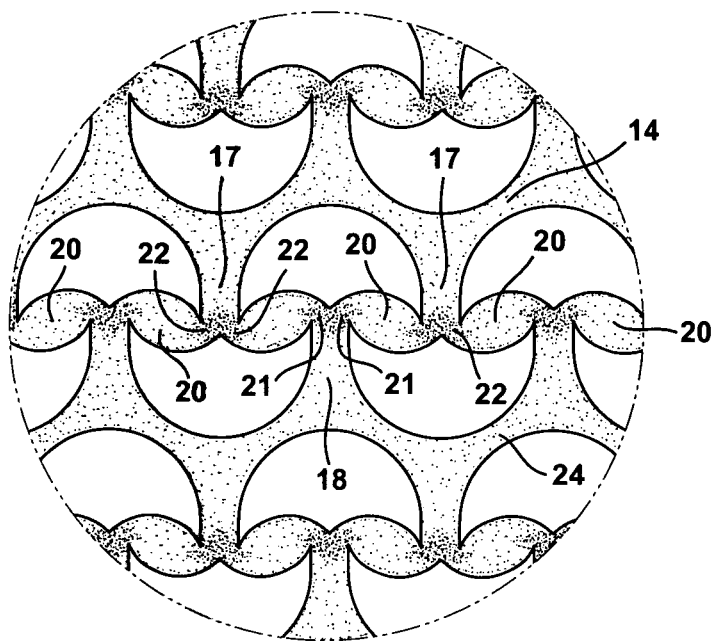
FIG. 1E is an enlarged view of a portion of the expanded foam sheet of FIG. 1 and FIG. 1A, as expansion passes through a third stage.
Figure 1F:
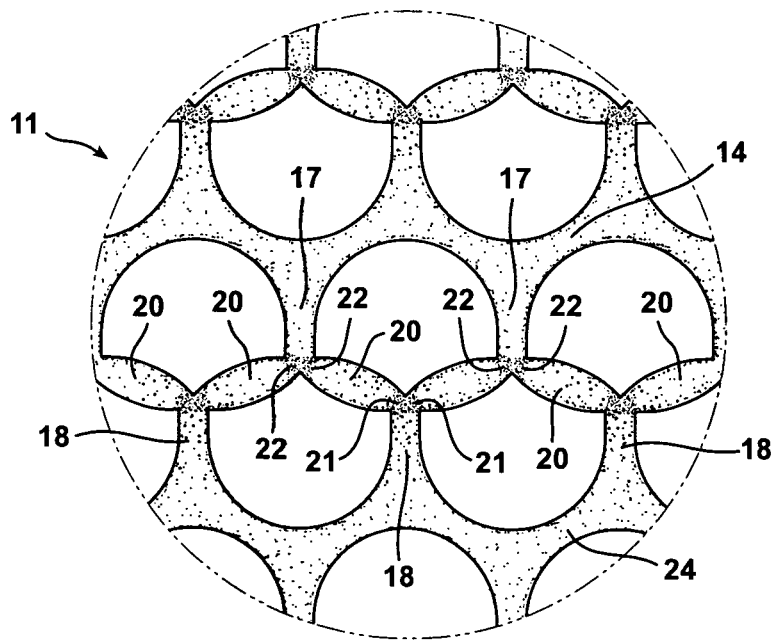
FIG. 1F is an enlarged view of a portion of the expanded foam sheet of FIG. 1 and FIG. 1A, as expansion is complete and the arms are in locked position.

The expandable foam sheet is designed so that during expansion, the expansion-and-locking arms are subjected to lengthwise compression. In some embodiments, the expansion-and-locking arms also buckle during expansion of the expandable foam sheet. FIGS. 1C, 1D, and 1E illustrate the expansion process of a portion of unexpanded foam sheet 12 as it undergoes mechanical stretching and expansion to form expanded foam sheet 11. Upon the application of a mechanical stretching force, expansion begins with the formation of small Type A free volumes 30 and Type B free volumes 32. See FIG. 1C. As expansion continues, the expansion-and-locking arms 20 begin to undergo compression as the slits begin to open up, and the hinge regions simultaneously undergo compression and stretching. See FIG. 1D. This compressive force increases as expansion continues, until the compressive force reaches a maximum at the point at which the overall compressive force on the expansion-and-locking arms is substantially transverse to the direction of expansion. See FIG. 1E. Further expansion occurs beyond the point of maximum compressive force. As further expansion occurs, the lengthwise compressive force decreases as the expansion-and-locking arms 20 are allowed to increase in length. See FIG. 1F.

In this manner, the expansion-and-locking arms go from an initial zero energy state in the unexpanded sheet, through an activation energy in which they reach maximum compression (and buckling in some embodiments discussed below), with further expansion of the sheet subjecting the expansion-and-locking arms to decreasing compressive force as the arms move into their expanded and locked position, with the expansion-and-locking arms being in a final energy state (FIG. 1F) which is lower than the highest energy state in which the expansion-and-locking arms are oriented in their most compressed position (FIG. 1E). While the expanded foam sheet can generally be returned to its unexpanded state by the application of a mechanical force in the closing direction, doing so requires the input of enough mechanical energy to force the expansion and locking arms back up and over the activation energy curve. This energy input to close the sheet is referred to herein as the force-to-close.

During expansion of the foam sheet, the rotation of the expansion and locking arms can be considered in terms of the expansion and locking arms pivoting relative to the fingers to which they are hingedly connected. The hinges connecting the expansion and locking arms to the fingers are actually hinge regions of the foam sheet. Compression forces concentrate at the hinge regions, and in many embodiments the hinge regions are narrower, or with compression and/or hinging become narrower, than the width of the expansion-and-locking arms. Expansion of the foam sheet causes the hinge regions to undergo substantial compression, as well as substantial stretching. While some domains in the hinge regions are highly compressed by the effective rotation (i.e., pivoting) of the expansion-and-locking arms, other domains in the hinge regions are stretched by the effective rotation of the expansion-and-locking arms.

During the expansion process, the compression of the foam making up the expansion-and-locking arms generates a force having a vector that is perpendicular to the direction of expansion. This perpendicular force gives the foam sheet an auxetic nature, i.e., it expands slightly in width as it is being expanded in length. This width-wise auxetic expansion maximizes as the expansion-and-locking arms pass through their highest energy state, i.e., the maximum on the activation energy curve. Upon locking in the expanded configuration, the expanded foam sheet is longer than the unexpanded foam sheet, and may be (or may not be) wider than the unexpanded foam sheet. Expandable foam sheets that expand and lock in the expanded configuration and exhibit a width greater than the width of the unexpanded foam sheet, are considered to be auxetic expandable foam sheets.

FIGS. 2A and 2B illustrate another preferred embodiment of an expandable foam sheet 40 in accordance with the present invention. This embodiment is herein referred to as the "B1" embodiment. FIG. 2A illustrates expandable foam sheet 40 in unexpanded configuration. Again, for brevity, unexpanded, expandable foam sheet 40 is illustrated with eight transverse rows of rows of Type A slits, i.e., rows of slits A6 through A13, and eight transverse rows of Type B slits, i.e., rows of slits B6 through B13. As in the 0-Straight embodiment discussed above, in the B1 embodiment, each individual Type A row of slits A6 through A13 is coupled and interlocked with a respective row of Type B slits B6-B13, with the rows of Type A and Type B slits alternating in A-B-A-B arrangement, more particularly alternating in a coupled -A&B-A&B-A&B- arrangement. Unexpanded, expandable foam sheet 60 also has stabilization walls 42, 44, 46, 48, 50, 52, and 54, each of which has a plurality of fingers 56 extending from and integral with a first side thereof, and a plurality of fingers 58 extending from and integral with a second side thereof. The Type A slits of rows of slits A6-A13 each have an overall curvilinear shape with an overall concavity facing and interlocking with respective coupled row of Type B slits B6-B13. Likewise, Type B slits of rows of slits B6-B13 each have an overall curvilinear shape with an overall concavity facing and interlocking with respective coupled row of Type A slits A6-A13. While in FIG. 2A the type B slits have the same size and shape as the Type A slits, there is no requirement that they have the same size and shape.

As in the 0-Straight embodiment, in the B1 embodiment the arrangement of the coupled rows of slits with their concavities facing one another provides cavity wells with one centrally-positioned finger 56 or 58 within each cavity well. The foam between the coupled rows of slits A6-A13 and respectively B6-B13 provides expansion and locking arms 60, with the foam between the coupled rows of slits further including hinged connections 62 of each end of expansion-and-locking arms 60 to fingers 56 and 58 which extend from stabilization walls 42, 44, 46, 48, 50, 52, and 54.

FIG. 2B illustrates a portion of the B1 of FIG. 1A, in its expanded configuration as expanded foam sheet 41. Expanded foam sheet 41 includes Type A free volumes 64 and Type B free volumes 66. A locking arm wall is present between stabilization walls 42 and 44, and a locking arm wall is also present between stabilization wall 44 and 46. Hinged connections 62 connect expansion and locking arm walls 60 to the ends of fingers 56 and 58.

FIG. 2C illustrates an enlarged schematic view of one Type A slit 100 coupled with one Type B slit 102. While FIG. 2C is one preferred embodiment of the invention, FIG. 2C is herein used in a generic sense, i.e., the means of determining particular features such as width, depth, width-to-depth ratio, arm length, individual serpentine angles, total serpentine angle, hinge distance, percent interlocking, etc., is to be determined in a corresponding manner for other embodiments of the invention disclosed herein, as well as for yet additional embodiments of the invention within the scope of the claims below.

The depth of Type A slit is the distance between dashed line a and dashed line b. The cavity well is the area between the line 100 and the portion of dashed line a between points 104 and 106. The width of Type A slit 100 is the distance along dashed line a between slit endpoints 104 and 106. In this manner, the width-to-depth ratio can be calculated. Dashed line c runs through both endpoints 110 and 108 of slit 102. The distance between dashed line a and dashed line c represents the amount to which slit 102 interlocks into slit 101. The distance between line a and line c, divided by the depth of slit 100 (i.e., the distance between line a and line b), multiplied by 100, is the percent to which slit 102 interlocks with slit 100, and also the percent to which slit 100 interlocks with slit 102, as both slits 100 and 102 are of identical size and shape. Embodiment B1 illustrated in FIG. 2C exhibits 73% interlocking. The length of the expansion-and-locking arms increases as the percent interlocking increases.

The length of the expansion-and-locking arms is herein considered to be the distance between points 106 and 108, which are respective endpoints of coupled slits 100 and 102, respectively. The length of the other expansion and locking arms are measured in the same manner. A line (not illustrated) extending between point 108 and the closest location on line 100 is herein considered to correspond with the hinge distance, with additional hinge distances being measured in like manner.

The expansion-and-locking arm between slits 100 and 102 has two serpentine edges, i.e., curved edges having at least one inflection point between segments curving in opposite directions. The inflection point in the curve is in a region in which the curve is relatively straight. As a result, dashed line d represents the orientation of slit 100 at the inflection point of the outer edge of the expansion and locking arm within the cavity well of slit 100. Dashed line d is substantially coincident with slit 100 from point 116 to point 118. Similarly, dashed line e represents the orientation of slit 102 at the inflection point of the inner edge of the expansion and locking arm within the cavity well of slit 100.

Dashed line c is established by the connection of endpoints 108 and 110 of slit 102. The points at which dashed line c crosses slit 100 includes points 112 and 114. Dashed line f is tangent to slit 100 at midpoint 120 between point 112 and point 116. Angle df, i.e., the angle between line d and dashed line f, represents the amount of curvature in the convex outer edge of the expansion-and-locking arm.

A corresponding system of angular measurement is made between dashed line d and dashed line g. Dashed line g is tangent slit 100 at midpoint 122 between points 118 and 106. Angle dg represents the concave recurve portion of the serpentine expansion-and-locking arm. The total serpentine curve measurement for the outside serpentine edge of the expansion-and-locking arm is the sum of angle df and angle dg.

A corresponding system of angular measurement is also carried out for the inside edge of the expansion-and-locking arm between slits 100 and 102. Dashed line e represents the orientation of slit 102 at the inflection point of the inner edge of the expansion and locking arm within the cavity well of slit 100. Dashed line e is substantially coincident with slit 102 from point 124 to point 126. Point 108 is an endpoint of slit 102, and dashed line j is tangent to slit 102 at the midpoint of the segment between points 108 and 124. Angle ej, i.e., the angle between line e and dashed line j, represents the amount of curvature in the concave inner edge of the expansion-andlocking arm. Similarly, points 126 and 130 are established on the inside recurve edge of the expansion-and-locking arm, and dashed line h is tangential to slit 102 at midpoint 132 between points 126 and 130. Angle eh represents the amount of recurve in the convex inner edge of the expansion-and-locking arm. The sum of angle ej and angle eh represents the total serpentine curve measurement for the inside serpentine edge of the expansion-and-locking arm. The total serpentine curve measurement for an expansion and locking arm with serpentine inside and outside edges is the average of the total serpentine angle of the outside edge and the total serpentine angle of the inside edge. In FIG. 3C, angle df is 16 degrees, angle dg is 25 degrees, angle ej is 28 degrees, and angle eh is 17 degrees. As a result, the total serpentine angle for the expansion and locking arm between slit 100 and slit 102 is 43 degrees.

FIGS. 3A and 3B illustrate another preferred embodiment of an expandable foam sheet 70 in accordance with the present invention. This embodiment is herein referred to as the "B5" embodiment. FIG. 3A illustrates expandable foam sheet 70 in unexpanded configuration. Unexpanded, expandable foam sheet 70 is illustrated with eight transverse rows of rows of Type A slits, i.e., rows of slits A14 through A21, and eight transverse rows of Type B slits, i.e., rows of slits B14 through B21. Again, each individual Type A row of slits A14 through A21 is coupled and interlocked with a respective row of Type B slits B14 through B21, with the rows of Type A and Type B slits alternating in A-B-A-B arrangement, more particularly alternating in a coupled -A&B-A&B-A&B- etc. arrangement. Unexpanded, expandable foam sheet 70 also has stabilization walls 72, 74, 76, 78, 80, 82, and 84, each of which has a plurality of fingers 86 extending from and integral with a first side thereof, and a plurality of fingers 88 extending from and integral with a second side thereof. The Type A slits of rows of slits A14-A21 each have an overall curvilinear shape with an overall concavity facing and interlocking with respective coupled row of Type B slits B14-B21. Likewise, Type B slits of rows of slits B14-B21 each have an overall curvilinear shape with an overall concavity facing and interlocking with respective coupled row of Type A slits A14-A21.

In the B5 embodiment the arrangement of the coupled rows of slits with their concavities facing one another provides cavity wells with one centrally-positioned finger 86 or 88 within each cavity well. The foam between the coupled rows of slits A14-A21 and respectively B14-B21 provides expansion and locking arms 90, with the foam between the coupled rows of slits further including hinged connections 92 of each end of expansion-and-locking arms 90 to fingers 86 and 88 which extend from stabilization walls 72, 74, 76, 78, 80, 82, and 84.

FIG. 3B illustrates a portion of the B5 sheet of FIG. 1A, in its expanded configuration as expanded foam sheet 71. Expanded foam sheet 71 includes Type A free volumes 94 and Type B free volumes 96. A locking arm wall is present between stabilization walls 72 and 74, and a locking arm wall is also present between stabilization wall 74 and 76. Hinged connections 92 connect expansion and locking arm walls 90 to the ends of fingers 86 and 88.

FIG. 3C illustrates an enlarged schematic view of one Type A slit 140 coupled with one Type B slit 142 for the B5 slit pattern of FIGS. 3A and 3B. Although FIG. 3C is slightly different from FIG. 2C, an analogous method of measurement is used for the B5 embodiment as for the B1 embodiment of FIG. 2C. The depth of Type A slit 140 is the distance between dashed line k and dashed line l. The cavity well is the area between the slit line 140 and the portion of dashed line k between points 144 and 146. The width of Type A slit 140 is the distance along dashed line k between slit endpoints 144 and 146. The length of the expansion-and-locking arms is the distance between points 146 and 148, which are respective endpoints of coupled slits 140 and 142, respectively. A line (not illustrated) extending between point 148 and the closest location on line 140 is the hinge distance. The expansion-and-locking arm between slits 140 and 142 has two serpentine edges, and the inflection point in the curve is in a region in which the curve is relatively straight. As a result, dashed line n represents the orientation of slit 140 at the inflection point of the outer edge of the expansion and locking arm within the cavity well of slit 140. Dashed line n is substantially coincident with slit 140 from point 150 to point 152. Similarly, dashed line p represents the orientation of slit 142 at the inflection point of the inner edge of the expansion and locking arm within the cavity well of slit 140. Dashed line m is established by the connection of endpoints 148 and 154 of slit 142. The points at which line m crosses slit 140 include points 156 and 158. Dashed line q is tangent to slit 140 at midpoint 160 between point 150 and point 156. Angle nq, i.e., the angle between line n and line q, represents the amount of curvature in the convex outer edge of the expansion-and-locking arm. Since the concave outer edge of the expansion-and-locking arm between slits 140 and 142 includes a straight section. Dashed line r includes this straight section of slit 140. Angle nr represents the amount of recurve in the concave outer edge of the expansion-and-locking arm between slits 140 and 142. The two curves of the inside edge of the expansion and locking arm are measured using inflection point line p and tangent lines r and s, thereby setting up angle ps and angle pt. The total serpentine curve for the expansion and locking arm in FIG. 3C is (nq+nr+ps+pt)÷2, which in FIG. 3C is (63+78+78+62)÷2=140.5 degrees.

Examples

Figure 4:
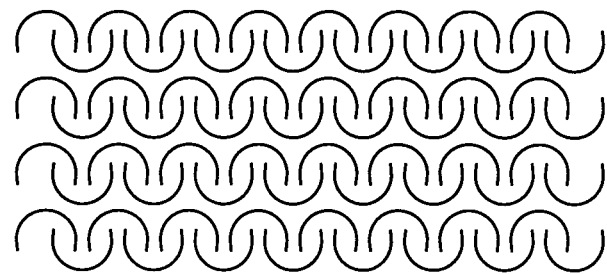
FIG. 4 through 76 are top views of embodiments of an expandable foam sheet, each being illustrated in unexpanded configuration (i.e., closed configuration).
Figure 5:
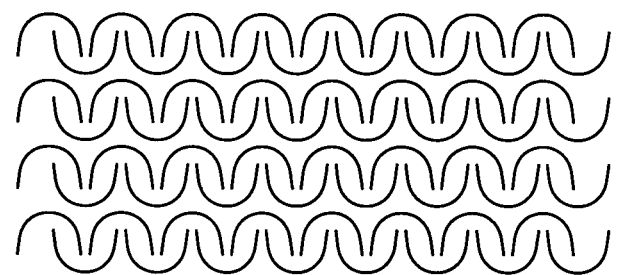
Figure 6:
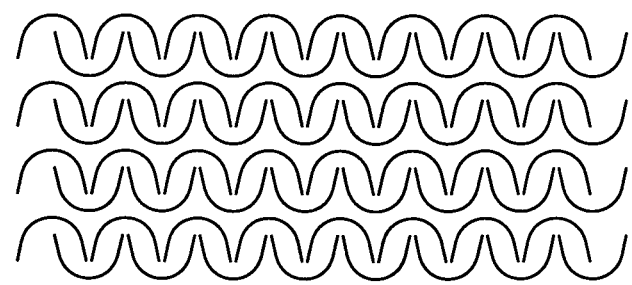
Figure 77:
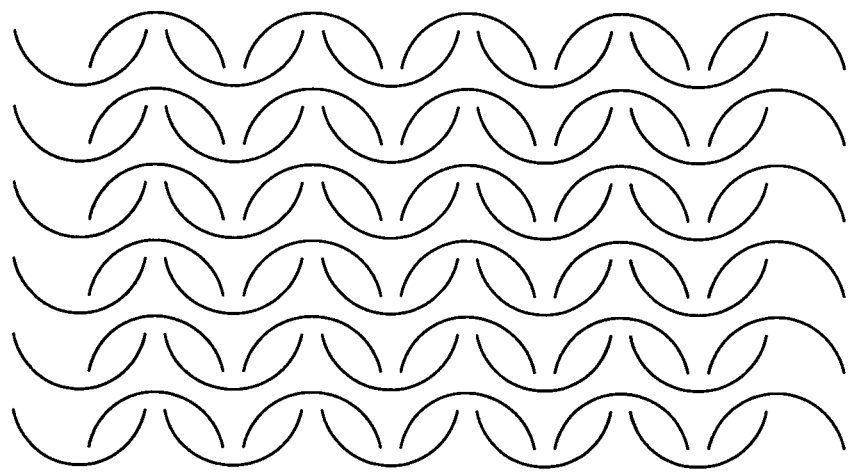
FIG. 77 is a top view of an embodiment of an expandable foam sheet herein referred to as Comparative No. 1, identified in Table 17 as "Cmp#1".
Figure 78A:
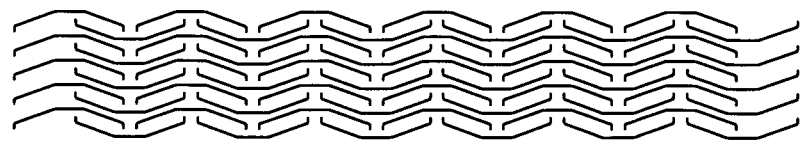
FIG. 78A is a top view of an embodiment of an expandable foam sheet herein referred to as Comparative No. 2A, identified in Table 17 as "CP#2A".
Figure 78B:
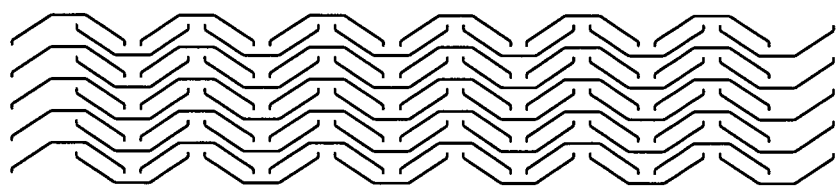
FIG. 78B is a top view of an embodiment of an expandable foam sheet herein referred to as Comparative No. 2B, identified in Table 17 as "CP#2B".
Figure 78C:
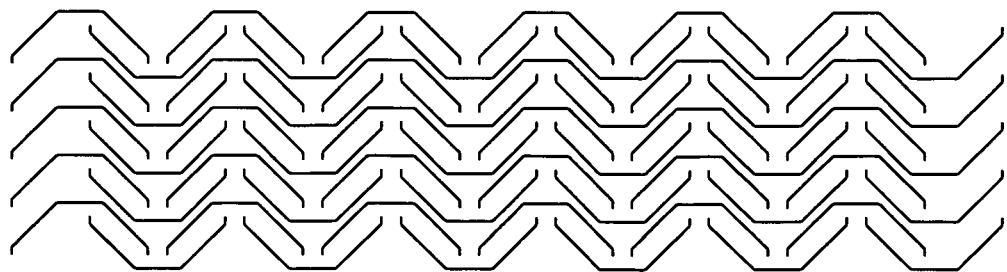
FIG. 78C is a top view of an embodiment of an expandable foam sheet herein referred to as Comparative No. 2C, identified in Table 17 as "CP#2C".

Table 1, below, provides data for the embodiments of various expandable foam sheets illustrated in FIGS. 1, 4-76. The slit patterns illustrated in FIGS. 1A, 2B, 3B, and 4-77, and 79-82 are not unscaled schematics, but rather are drawn with proportional accuracy so that upon being provided with at least one actual measurement from the embodiment illustrated, the actual size and arrangement of the slit patterns can be calculated from measurements taken directly from these figures. More particularly, Table 1 provides the actual measurements for both "repeat finger to finger" and "repeat stabilization wall to stabilization wall" (i.e., "s. wall to s. wall") distances, from which the actual sizes and arrangements of the slits can be calculated in order to reproduce the same slit patterns and arrangements illustrated in each of FIGS. 1 and 4-76. FIG. 77 illustrates the slit shape and arrangement for Comparative Example No. 1, and FIGS. 78A, 78B, and 78C illustrate the slit patterns and arrangements for three different versions of a second comparative slit pattern and arrangement.

Each of the foam sheets in Table 1 had a thickness of 0.75 inch, and each of the foam sheets was polyethylene foam obtained from Sealed Air Corporation. As indicated in Table 1, foam sheets of two different densities were used: 1.2 lb/cu.ft and 1.7 lb/cu.ft. Table 17, below, provides many further examples of expandable foam sheet of various densities and various thicknesses. The foam sheet used in the examples in Tables 1 and 17 was as follows:

Table of Materials

| Density (lb/cu.ft) | Nominal Thickness (in) | Product Identity | Source |
|---|---|---|---|
| 6 | 0.25 | Cellu-Cushion ® 6.0PCF | Sealed Air Corporation |
| 4 | 1.1 | Ethafoam ® 400 | Sealed Air Corporation |
| 2.2 | 0.13 | Cellu-Cushion ® 2.2 PCF | Sealed Air Corporation |
| 2.2 | 0.5 | Cellu-Cushion ® 2.2 PCF | Sealed Air Corporation |
| 2.2 | 0.88 | Cellu-Cushion ® 2.2 PCF | Sealed Air Corporation |
| 2.2 | 1 | Cellu-Cushion ® 2.2 PCF | Sealed Air Corporation |
| 2.2 | 1.1 | Cellu-Cushion ® 2.2 PCF | Sealed Air Corporation |
| 1.7 | 0.13 | Cellu-Cushion ® 1.7 PCF | Sealed Air Corporation |
| 1.7 | 0.25 | Cellu-Cushion ® 1.7 PCF | Sealed Air Corporation |
| 1.7 | 0.33 | Cellu-Cushion ® 1.7 PCF | Sealed Air Corporation |
| 1.7 | 0.5 | Cellu-Cushion ® 1.7 PCF | Sealed Air Corporation |
| 1.7 | 0.75 | Cellu-Cushion ® 1.7 PCF | Sealed Air Corporation |
| 1.2 | 0.13 | Cell-Aire ® CA 125 | Sealed Air Corporation |
| 1.2 | 0.25 | Cell-Aire ® CA 250 | Sealed Air Corporation |
| 1.2 | 0.33 | Cellu-Cushion ® 1.2 PCF | Sealed Air Corporation |
| 1.2 | 0.5 | Cellu-Cushion ® 1.2 PCF | Sealed Air Corporation |
| 1.2 | 0.75 | Cellu-Cushion ® 1.2 PCF | Sealed Air Corporation |
| 1.2 | 1 | Cellu-Cushion ® 1.2 PCF | Sealed Air Corporation |

Foam sheets were supplied on a 48" wide roll of 125 feet in length. The pattern was cut across the full width of the web with the stabilization wall repeat length being along the length of the material. For prototyping purposes a JetEdge 50 hp waterjet pump system capable of delivering up to 50,000 psi was used in conjunction with an x-y servo motor controlled cutting table. The waterjet nozzle incorporating a sapphire or diamond orifice of 0.004" in diameter. The waterjet stream being of pure water without the use of additional abrasive cutting agents. Typical running time for a 12" by 6" sheet incorporating a design pattern using serpentine arms with cell area of approximately 0.25 in$^2$ was approximately 3 hours. In some cases, multiple waterjet heads were used to simultaneously create the pattern as further described in U.S. patent application U.S. Ser. No. 11/846,147 to De Luca.

FIGS. 1-82 illustrate accurate proportions for each of the slit patterns. That is, knowing the identity of the foam sheet being used, and with the knowledge of the cut patterns of FIGS. 1-82, in combination with the disclosed value of the finger-to-finger repeat distance provided in Table 1, as well as the disclosed stabilization wall repeat distance provided in Table 1, any one or more of the cut patterns in FIGS. 1-82 can be reproduced using the waterjet cutting system disclosed above.

Figure 76:
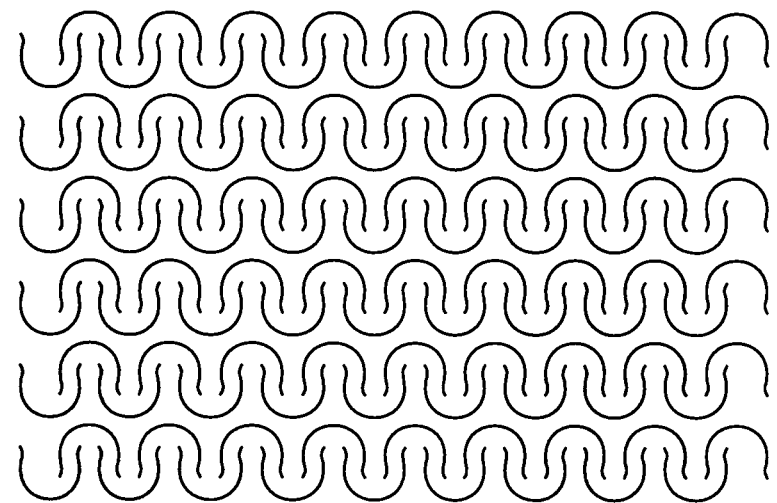

Table 1, below, lists various measurements pertaining to the slit size, shape, and arrangement for expandable the foam sheet that were prepared and are illustrated in FIGS. 1 and 4-76. These examples utilized polyethylene foam sheet having a thickness of 0.75 inch and a density of 1.2 or 1.7 lb/cu.ft. The foam sheet was cut into samples 80 mm wide (or double wide, i.e., 160 mm when necessary due to slit size), and the expanded foam was tested for force-to-close, using a scale as described above. Pressure-to-close was calculated from force-to-close results in combination with the cross-sectional area of the sample.

Figure 11:
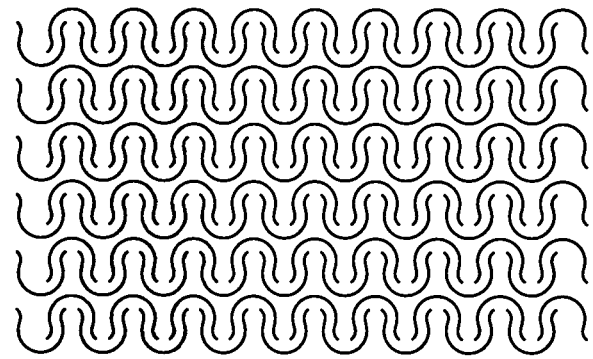
FIG. 11B is an enlarged schematic of a top view of a portion of the expandable foam sheet of FIG. 11, with additional lines indicating various measurements reported in various tables below.
Figure 11B:
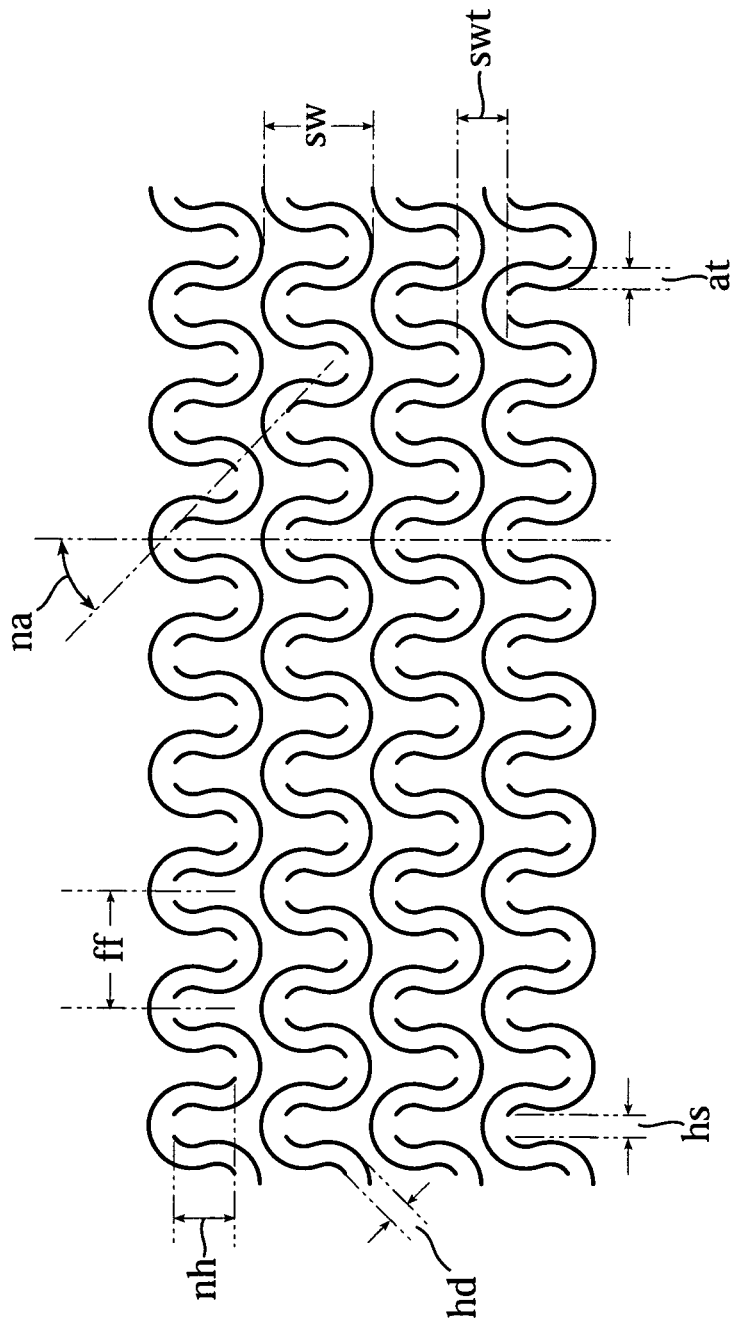
Figure 13:
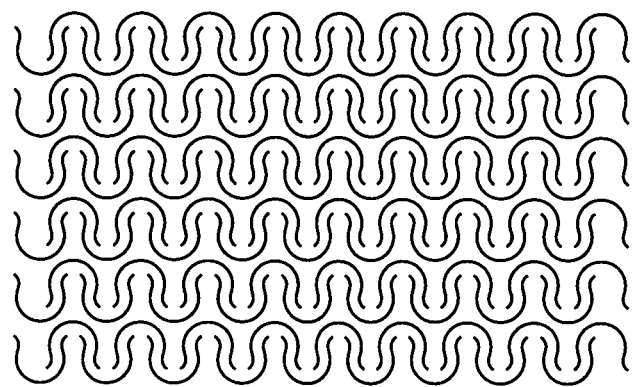

Distances related to the size and arrangement of the slits are also provided in Table 1. FIG. 11B provides a general guide for determining various measurements in each of FIGS. 1 and 4-76. "Repeat finger-to-finger" is the distance determined in accordance with ff in FIG. 11B. "Repeat stabilization wall-to-stabilization wall" is the distance determined in accordance with sw in FIG. 11B. "Stabilization Wall Thickness" is the distance determined in accordance with swt in FIG. 11B. "Neck Height" is the distance determined in accordance with nh in FIG. 11B. "Neck Angle" is the measurement (in degrees) determined in accordance with angle na in FIG. 11B. "Hinge Distance" is the distance determined in accordance with hd in FIG. 11B. "Hinge Separation" is the distance determined in accordance with hs in FIG. 11B. "Arm Thickness" is the distance determined in accordance with at in FIG. 11B. "Stable Open" was a qualitative measurement on a scale of 1 to 10, with 1 lacking stability and 10 being very stable. "Stiffness" was a qualitative measurement of the stiffness of the expanded foam sheet, with 1 being relatively very flexible and 10 being relatively very stiff. Unexpanded Length and Expanded Length can be used to calculate percent free volume, e.g., if a sample increased 100% in length, it has 50% free volume. Finally, in many instances the "Sample Name" is indicative of the features of the slit shape illustrated in the FIG. indicated in Table 1.

TABLE 1

| PATTERN NAME | FIG. No. | Density (lb/ft³) | Thickness (in) | Force-to-Close (g) | Pressure-to-Close (g/cm²) | Repeat Finger-to-Finger (in) | repeat stab. wall-to-s. wall (in) | Stabiliz. Wall Thickness (in) | Hinge Angle | Hinge distance (in) | Hinge separation | Arm Thickness (in) | Neck Height (in) | Unexpanded Length (in) | Expanded Length (in) | Stable open | stiffness | Comment |
|---|---|---|---|---|---|---|---|---|---|---|---|---|---|---|---|---|---|---|
| 15-under | 5 | 1.7 | .75 | 120 | 7.9 | .67 | .63 | .15 | 7.5 | .16 | .08 | .22 | .25 | 2.5 | 5 | 9 | 8 | High f-t-close tore opening |
| 25-under | 6 | 1.7 | .75 | 0 | 0 | .67 | .63 | .15 | 12.5 | .16 | .04 | .23 | .26 | 1 | 1 | 1 | 1 | |
| 30-under | 8 | 1.7 | .75 | 95 | 6.2 | .67 | .63 | .17 | 15 | .16 | .11 | .19 | .23 | 2.5 | 5 | 9 | 9 | Good |
| 45-under | 10 | 1.7 | .75 | 100 | 6.6 | .67 | .63 | .18 | 22.5 | .16 | .1 | .19 | .24 | 2.5 | 5 | 9 | 9 | Good |
| 15-over | 4 | 1.7 | .75 | 35 | 2.3 | .67 | .63 | .15 | -7.5 | .16 | .15 | .22 | .21 | 2.5 | 4.9 | 6 | 8 | Barely locks |
| 30-over | 7 | 1.7 | .75 | 0 | 0 | .67 | .63 | .15 | -15 | .16 | .16 | .22 | .20 | 2.5 | 4.6 | 5 | 8 | Unstable open |
| 45-over | 9 | 1.7 | .75 | 30 | 2.0 | .67 | .63 | .15 | -22.5 | .16 | .16 | .21 | .19 | 2.5 | 4.8 | 6 | 7 | Barely locks |
| 0-straight | 1 | 1.7 | .75 | 135 | 8.9 | .67 | .63 | .15 | 0 | .16 | .12 | .21 | .23 | 2.5 | 5 | 9 | 9 | Good |
| all-the-way-1 | 11 | 1.2 | .75 | 30 | 2.0 | .67 | .63 | .11 | 58 | .13 | .13 | .13 | .34 | 4 | 8.6 | 7 | 6 | Unremarkable |
| sm. pattern-1 | 12 | 1.2 | .75 | — | — | .33 | .31 | .05 | 37 | .05 | .06 | .05 | .2 | 2 | 3.5 | 9 | 3 | Mushy |
| all-the-way-2 | 13 | 1.2 | .75 | 30 | 2.0 | .67 | .63 | .11 | 58 | .13 | .13 | .13 | .34 | 4 | 6 | 8 | 7 | Not great |
| B5a-symm-1 | 14 | 1.2 | .75 | 75 | 4.9 | .67 | .69 | .11 | 37 | .09 | .11 | .11 | .41 | 4.1 | 9.2 | 9 | 8 | Like Pt-B5 |
| B5a-symm-2 | 15 | 1.2 | .75 | 70 | 4.6 | .67 | .67 | .11 | 37 | .09 | .11 | .11 | .41 | 4 | 9 | 9 | 8 | Like Pt-B5 |
| B5a-symm-3 | 16 | 1.2 | .75 | 70 | 4.6 | .63 | .70 | .09 | 37 | .09/.07 | .07 | .11/.14 | .41 | 4.1 | 8.9 | 8 | 8 | Like Pt-B5 |
| B5a-symm-4 | 17 | 1.2 | .75 | 60 | 3.9 | .71 | .70 | .09 | 37 | .09/.07 | .15 | .11/.08 | .41 | 4.1 | 9.1 | 8 | 7 | Like Pt-B5 |

| PATTERN NAME | FIG. No. | Density (lb/ft³) | Thickness (in) | Force-to-Close (g) | Pressure-to-Close (g/cm²) | repeat Finger-to-Finger (in) | repeat S. Wall-to-S. Wall (in) | Stabiliz. Wall Thickness (in) | Hinge Angle | Hinge distance (in) | Hinge separation | Arm Width (in) | Neck Height (in) | Unexpanded Length (in) | Expanded Length (in) | Stable open | stiffness | Comment |
|---|---|---|---|---|---|---|---|---|---|---|---|---|---|---|---|---|---|---|
| PatTest-1 | 18 | 1.2 | .75 | 60 | 3.9 | .67 | .63 | 0.17 | 60 | 0.17 | 0.09 | 0.17 | .26 | 3.75 | 7.5 | 9 | 8 | Good; sloppy |
| PatTest-2 | 19 | 1.2 | .75 | 75 | 4.9 | .67 | .63 | 0.1 | 55 | 0.15 | 0.09 | 0.15 | .3 | 3.75 | 8.25 | 9 | 8 | Good; sloppy |
| PatTest-3 | 20 | 1.2 | .75 | 80 | 5.2 | .67 | .63 | 0.11 | 67 | 0.13 | 0.09 | 0.13 | .35 | 3.75 | 8.62 | 9 | 7 | Sloppy |
| PatTest-4 | 21 | 1.2 | .75 | 70 | 4.6 | .67 | .63 | 0.11 | 69 | 0.11 | 0.09 | 0.11 | .39 | 3.75 | 9.12 | 9 | 7 | Sloppy |
| PatTest-5 | 22 | 1.2 | .75 | 25 | 1.6 | .67 | .63 | 0.11 | 71 | 0.09 | 0.09 | 0.09 | .43 | 3.75 | 9.5 | 9 | 5 | Sloppy |
| PatTest-6 | 23 | 1.2 | .75 | 0 | 0 | .67 | .63 | 0.12 | 73 | 0.07 | 0.09 | 0.07 | .47 | 1 | 1 | 1 | 1 | Rips; thin wall |
| PatTest-7 | 24 | 1.2 | .75 | 0 | 0 | .67 | .63 | 0.12 | 74 | 0.05 | 0.09 | 0.05 | .51 | 1 | 1 | 1 | 1 | Rips; thin wall |
| PatTest-8 | 25 | 1.2 | .75 | 0 | 0 | .67 | .63 | 0.12 | 75 | 0.03 | 0.09 | 0.03 | .55 | 1 | 1 | 1 | 1 | Rips; thin wall |
| PatTest-B1 | 26 | 1.2 | .75 | 20 | 1.3 | .67 | .6 | 0.15 | 61 | 0.15 | 0.09 | 0.15 | .23 | 3.5 | 6.75 | 4 | 6 | Unstable |
| PatTest-B2 | 27 | 1.2 | .75 | 85 | 5.6 | .67 | .68 | 0.15 | 63 | 0.15 | 0.09 | 0.15 | .3 | 4 | 8.25 | 8 | 7 | |
| PatTest-B3 | 28 | 1.2 | .75 | 100 | 6.6 | .67 | .75 | 0.15 | 65 | 0.15 | 0.1 | 0.15 | .38 | 4.38 | 9.75 | 9 | 8 | |
| PatTest-B4 | 29 | 1.2 | .75 | 90 | 5.9 | .67 | .83 | 0.15 | 62 | 0.15 | 0.09 | 0.15 | .45 | 4.38 | 8.5 | 9 | 7 | A little sloppy |
| PatTest-B5 | 30 | 1.2 | .75 | 80 | 5.2 | .67 | .91 | 0.15 | 67 | 0.15 | 0.09 | 0.15 | .53 | 3.5 | 8.38 | 9 | 7 | closes to side |
| PatTest-B6 | 31 | 1.2 | .75 | 70 | 4.6 | .67 | .98 | 0.15 | 68 | 0.15 | 0.09 | 0.15 | .6 | 3.75 | 9.25 | 9 | 6 | |
| PatTest-B7 | 32 | 1.2 | .75 | 50 | 3.3 | .67 | 1.1 | 0.15 | 69 | 0.15 | 0.09 | 0.15 | .68 | 4.16 | 10.25 | 9 | 4 | |
| PatTest-B8 | 33 | 1.2 | .75 | 30 | 2.0 | .67 | 1.1 | 0.15 | 70 | 0.15 | 0.09 | 0.15 | .75 | 4.5 | 11.25 | 9 | 4 | |
| PatTest-B9 | 34 | 1.2 | .75 | 90 | 5.9 | .67 | 1.0 | 0.15 | 64 | 0.15 | 0.09 | 0.15 | .63 | 4 | 9.625 | 9 | 7 | |

TABLE 1-continued

| PATTERN NAME | FIG. No. | Density (lb/ft³) | Thickness (in) | Force-to-Close (g) | Pressure-to-Close (g/cm²) | repeat Fing.-to-Finger (in) | repeat Stabil.-wall-to-Stabil.-wall (in) | Stabiliz Wl Thickness (in) | Hinge Angle | Hinge distance (in) | Hinge separation | Arm Thickness | Neck Height (in) | Unexpanded Length (in) | Expanded Length (in) | Stable open | stiffness | Comment |
|---|---|---|---|---|---|---|---|---|---|---|---|---|---|---|---|---|---|---|
| PatTry-A1 | 35 | 1.2 | .75 | 25 | 1.6 | .67 | .76 | .15 | 62 | .15 | .1 | 0.15 | .37 | 4.5 | 8.75 | 6 | 7 | |
| PatTry-A2 | 36 | 1.2 | .75 | 80 | 5.2 | .67 | .76 | .15 | 62 | .15 | .1 | 0.15 | .37 | 4.38 | 8.5 | 7 | 8 | |
| PatTry-A3 | 37 | 1.2 | .75 | 160 | 10.4 | .67 | .74 | .15 | 44 | .15 | .1 | 0.15 | .37 | 4.38 | 8.5 | 9 | 8 | Good |
| PatTry-B1 | 38 | 1.2 | .75 | 170 | 11.2 | .67 | .69 | .1 | 44 | .08 | .15 | 0.15 | .67 | 4 | 8.38 | 9 | 9 | Very Good |
| PatTry-B1 | 38 | 1.2 | .75 | 170 | 11.2 | .67 | .69 | .1 | 44 | .08 | .15 | 0.15 | .67 | 4 | 8.38 | 9 | 9 | Very Good |
| PatTry-B3 | 39 | 1.2 | .75 | 140 | 9.2 | .67 | .66 | .09 | 0 | .16 | .12 | 0.21 | .23 | 2.5 | 4.75 | 9 | 9 | 0-str shifted |
| PatTry-B3 | 39 | 1.7 | .75 | 170 | 11.2 | .67 | .66 | .09 | 0 | .16 | .12 | 0.21 | .23 | 2.5 | 4.75 | 8 | 9 | A-3 shifted |
| PatTry-B4 | 40 | 1.2 | .75 | 120 | 7.9 | 0.5 | .71 | .08 | -15 | .06 | .13 | 0.15 | .38 | 2.75 | 6 | 10 | 8 | offset roundi |
| PatTry-B5 | 41 | 1.2 | .75 | 140 | 9.2 | .67 | .70 | .09 | 37 | .09 | .11 | 0.11 | .41 | 3.5 | 8 | 10 | 8 | offset roundi |
| PatTry-B6 | 42 | 1.2 | .75 | 30 | 2.0 | .65 | .44 | .11 | 0 | .08 | .13 | 0.2 | .17 | 2.5 | 4.75 | 5 | 8 | Mod PT C2 |
| PatTry-B7 | 43 | 1.2 | .75 | 40 | 2.6 | .65 | .48 | .08 | 0 | .08 | .13 | 0.2 | .17 | 2.75 | 5 | 5 | 8 | offset PT B6 |
| PatTry-B8 | 44 | 1.2 | .75 | 0 | 0 | .70 | .60 | .08 | 0 | .08 | .2 | 0.15 | .23 | 3.75 | 6.5 | 2 | 7 | Mod PT C5 |
| PatTry-B9 | 45 | 1.2 | .75 | 20 | 1.3 | .70 | .60 | .08 | 0 | 0.08 | .2 | 0.15 | .23 | 3.75 | 6.5 | 4 | 8 | Mod PT B8 |

| PATTERN NAME | FIG. No. | Density (lb/ft³) | Thickness (in) | Force-to-Close (g) | Press.-to-Close (g/cm²) | repeat Finger-to-Finger (in) | S. wall-to S. wall (in) | S. Wall Thickness (in) | Hinge Angle | Hinge distance (in) | Hinge separation | Arm Thickness | Neck Height (in) | Unexpanded Length (in) | Expanded Length (in) | Stable open | stiffness | Comment |
|---|---|---|---|---|---|---|---|---|---|---|---|---|---|---|---|---|---|---|
| PatTry-C1 | 46 | 1.2 | .75 | 20 | 1.3 | .83 | .48 | 0.13 | -45 | .08 | .3 | .21 | .18 | 3.38 | 6.5 | 6 | 7 | |
| PatTry-C2 | 47 | 1.2 | .75 | 20 | 1.3 | .83 | .48 | 0.13 | 0 | .08 | .13 | .21 | .25 | 1.88 | 3.5 | 7 | 7 | |
| PatTry-C3 | 48 | 1.2 | .75 | 60 | 3.9 | .71 | .42 | 0.13 | 0 | .08 | .12 | .16 | .25 | 3 | 6.75 | 8 | 7 | |
| PatTry-C4 | 49 | 1.2 | .75 | 0 | 0 | .88 | .35 | 0.1 | 90 | .12 | .06 | .14 | .24 | 2.88 | 6 | 1 | 5 | |
| PatTry-C5 | 50 | 1.2 | .75 | 0 | 0 | .70 | .79 | 0.14 | 0 | .15 | .2 | .15 | .21 | 5 | 7.88 | 1 | 7 | |
| Roundi | | 1.7 | .75 | 90 | 5.9 | .67 | .63 | 0.15 | -40 | .08 | .25 | .21 | .33 | 3 | 7 | 10 | 6 | OK; mushy |
| Roundi-2 | 52 | 1.7 | .75 | 0 | 0 | .67 | .63 | 0.13 | -42.5 | .08 | .43 | .08 | .22 | 4 | 7 | 8 | 2 | rips; thin walls |
| Roundi-3 | 53 | 1.7 | .75 | 45 | 3.0 | .67 | .58 | 0.1 | 51 | .08 | .12 | .08 | .39 | 3 | 7.38 | 10 | 7 | Good; thin |
| Roundi-4 | 54 | 1.7 | .75 | 70 | 4.6 | .67 | .58 | 0.07 | 37 | .09 | .11 | .11 | .41 | 3.5 | 9 | 10 | 9 | Good; thin |
| Roundi-5 | 55 | 1.7 | .75 | 0 | 0 | .60 | .33 | 0.11 | 22 | .12 | .13 | .14 | .02 | 1.5 | 2.5 | 1 | 8 | Not locking |
| Roundi-6 | 56 | 1.7 | .75 | 0 | 0 | .60 | .35 | 0.08 | 22 | .16 | .13 | .16 | -.03 | 1.75 | 2.75 | 1 | 8 | Not locking |
| Roundi-7 | 57 | 1.7 | .75 | 0 | 0 | .60 | .19 | 0.05 | 22 | .06 | .13 | .1 | .09 | 1 | 1.88 | 3 | 3 | Close soon |
| Roundi-9 | 58 | 1.7 | .75 | 30 | 2.0 | .45 | .45 | 0.09 | 0 | .06 | .08 | .11 | .38 | 2.88 | 6 | 9 | 3 | Unstable |
| Roundi-10 | 59 | 1.7 | .75 | 75 | 4.9 | .50 | .56 | 0.09 | 15 | .06 | .13 | .15 | .38 | 3.5 | 8 | 10 | 8 | good; sloppy |
| Roundi-11 | 60 | 1.7 | .75 | 120 | 7.9 | 0.5 | .69 | 0.17 | -15 | .12 | .13 | .15 | .38 | 4 | 9 | 10 | 9 | Good; stiff |
| Roundi-12 | 61 | 1.7 | .75 | 50 | 3.3 | .50 | .50 | 0.06 | 45 | .16 | .08 | .08 | .38 | 3 | 7.5 | 10 | 7 | Thin; sloppy |
| Roundi-13 | 62 | 1.7 | .75 | 105 | 6.9 | .50 | .63 | 0.13 | 40 | .07 | .07 | .09 | .38 | 3.75 | 8.5 | 10 | 8 | Stiff; good |
| Roundi-14 | 63 | 1.7 | .75 | 50 | 3.3 | .55 | .70 | 0.11 | 30 | .08 | .08 | .1 | .41 | 4.12 | 9.25 | 7 | 6 | Odd; sloppy |
| Roundi-15 | 64 | 1.7 | .75 | 110 | 7.2 | .57 | .65 | 0.19 | 20 | .09 | .11 | .14 | .29 | 4 | 7.5 | 10 | 8 | Good |

TABLE 1-continued

| PATTERN NAME | FIG. No. | Density (lb/ft³) | Thickness (in) | Force-to-Close (g) | Pressure-to-Close (g/cm²) | Repeat Finger-to-Finger (in) | Repeat Stabil. Wall-to-Stzabil. Wall (in) | Stabiliz. Wall Thickness (in) | Hinge Angle | Hinge distance (in) | Hinge separation | Arm Thickness | Neck Height (in) | Unexpanded Length (in) | Expanded Length (in) | Stable open | stiffness | Comment |
|---|---|---|---|---|---|---|---|---|---|---|---|---|---|---|---|---|---|---|
| Walltest-1 | 65 | 1.2 | .75 | 0 | 0 | .67 | .63 | 0.1 | 18 | .17 | .17 | .17 | .16 | 3.75 | 6.5 | 1 | 8 | Not locking |
| Walltest-2 | 66 | 1.2 | .75 | 55 | 3.6 | .67 | .63 | 0.1 | 42 | .15 | .15 | .15 | .26 | 3.75 | 7.5 | 6 | 8 | Barely locks |
| Walltest-3 | 67 | 1.2 | .75 | 80 | 5.2 | .67 | .63 | .11 | 55 | .13 | .13 | .13 | .32 | 3.75 | 8.25 | 9 | 8 | Sloppy |
| Walltest-4 | 68 | 1.2 | .75 | 50 | 3.3 | .67 | .63 | .11 | 64 | .11 | .11 | .11 | .38 | 3.75 | 9 | 9 | 7 | rips; thin walls |
| Walltest-5 | 69 | 1.2 | .75 | 30 | 2.0 | .67 | .63 | .11 | 71 | .09 | .09 | .09 | .43 | 3.75 | 9.5 | 9 | 6 | rips; thin walls |
| Walltest-6 | 70 | 1.2 | .75 | 15 | 1.0 | .67 | .63 | .12 | 76 | .07 | .07 | .07 | .48 | 3.75 | 10.2 | 10 | 3 | tore opening |
| Walltest-7 | 71 | 1.2 | .75 | 0 | 0 | .67 | .63 | .12 | 81 | .05 | .05 | .05 | .52 | 1 | 1 | 1 | 1 | tore opening |
| Walltest-8 | 72 | 1.2 | .75 | 0 | 0 | .67 | .63 | .12 | 85 | .05 | .05 | .03 | .56 | 1 | 1 | 1 | 1 | Inoperable |
| Walltest-B1 | 73 | 1.2 | .75 | 120 | 7.9 | .67 | .68 | .15 | 42 | .15 | .15 | .15 | .26 | 4 | 7.5 | 8 | 7 | Unremarkable |
| Walltest-B2 | 74 | 1.2 | .75 | 90 | 5.9 | .49 | .50 | .11 | 42 | .11 | .11 | .11 | .19 | 6 | 11 | 7 | 7 | Unstable |
| Walltest-B3 | 75 | 1.2 | .75 | 30 | 2.0 | .31 | .32 | .11 | 0 | .08 | .13 | 0.2 | .17 | 2.5 | 4.75 | 5 | 8 | Mushy; fragile |
| Walltest-B4 | 76 | 1.2 | .75 | 0 | 0 | .13 | .14 | .03 | 42 | .03 | .03 | .03 | .05 | 0.8 | 1.5 | 2 | 1 | Cut poorly |

Figure 7:
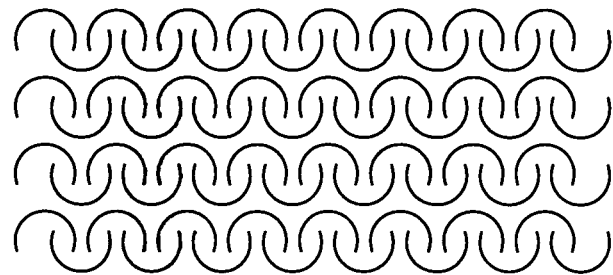
Figure 8:
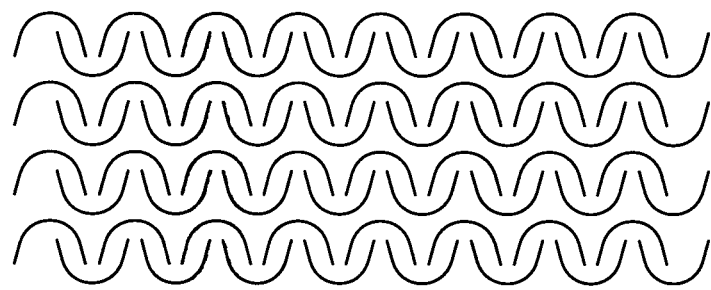
Figure 9:
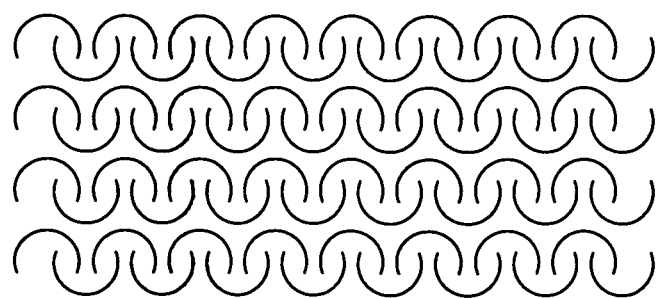
Figure 10:
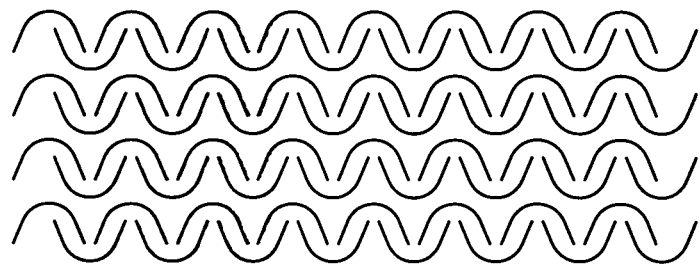
Figure 12:
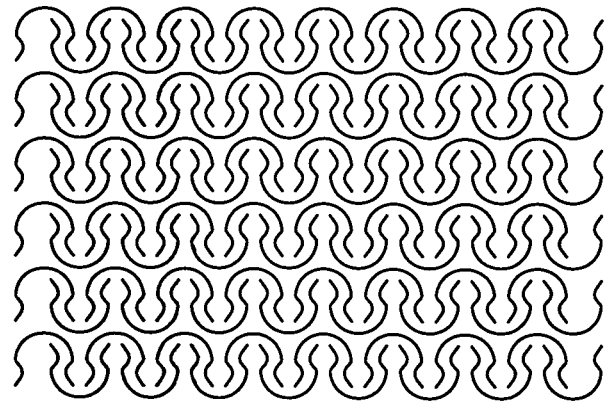

Considering the results of Table 1 in more detail with respect to FIGS. 4-10, it is apparent that as the arms pivot from the unexpanded configuration to the expanded configuration, the longer arm length of the "under" cut patterns of FIGS. 5, 6, 8, and 10 compress and/or buckle more than the shorter arms of the "over" cut patterns of FIGS. 4, 7, and 9, resulting in greater pressure-to-close.

TABLE 2

| FIG. No | FIG. Name | Force-to-Close (g) | Pressure to Close (p-t-c) g/cm$^2$ | Arm Length (mm) |
|---|---|---|---|---|
| 5 | 15-under | 120 | 7.9 | 5 |
| 6 | 25-under | Tore | 0 | 5.3 |
| 8 | 30-under | 95 | 6.2 | 5 |
| 10 | 45-under | 100 | 6.6 | 5.2 |
| 4 | 15-over | 15 | 2.3 | 4 |
| 7 | 30-over | 0 | 0 | 3.5 |
| 9 | 45-over | 30 | 2.0 | 3.8 |
| 2 | 0-Straight | 135 | 8.9 | 6.8 |

The compression and/or buckling of the arms maximized as the arms pivoted through a line perpendicular to the direction of expansion, i.e., directly across the width of the sheet as the sheet is expanded in its length. A comparison of the relatively long-arm embodiments of FIGS. 5, 6, 8, and 10 produced pressure-to-close of 7.9, 6.2, and 6.6 g/cm$^2$, whereas the relatively short-arm embodiments of FIGS. 4, 7, and 9 exhibited pressure-to-close of 2.3, 0, and 2.0 grams/cm$^2$. The embodiment of FIG. 6 exhibited tearing during application of expansion force, due to the too-small spacing between adjacent cuts, i.e., the hinge distance was so small that the tensile strength of the foam at the hinge was less than the force-to-expand, resulting in tearing of the structure. It should also be noted that the force-to-close of FIG. 3 (i.e., "0-straight"), which is neither an "under" cut pattern nor an "over" cut pattern, also had longer arms and as a result exhibited a high pressure-to-close of 8.9 g/cm$^2$.

Figure 14:
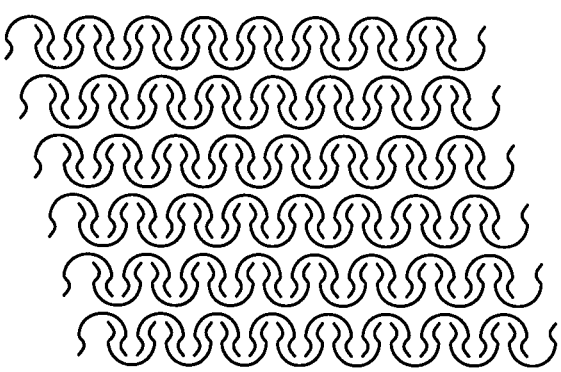
Figure 15:
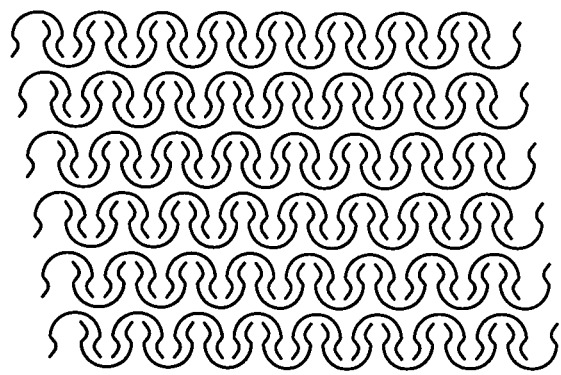

FIGS. 14 and 15 reveal the force-to-close effect of staggering the rows:

TABLE 4

| FIG. No | FIG. Name | Force-to-Close (g) | Pressure to Close (p-t-c) g/cm$^2$ | Arm thickness (in) |
|---|---|---|---|---|
| 14 | B5-assymetric-1 | 75 | 4.9 | 0.11 |
| 15 | B5-assymetric-2 | 70 | 4.6 | 0.11 |

As can be seen, the greater degree of staggering of the rows of slits in FIG. 14 produced a slightly higher force-to-close, relative to the lesser degree of staggering of the rows of slits of the embodiment of FIG. 15. Further study revealed that as the fingers on opposite sides of a stabilization wall come into alignment with one another, the force-to-close increases. Further data supporting this discovery is set forth in various embodiments below.

Figure 16:
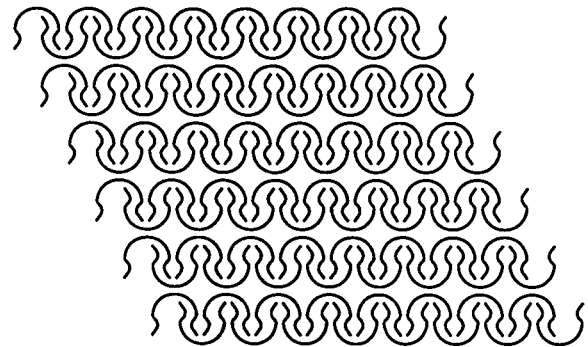
Figure 17:
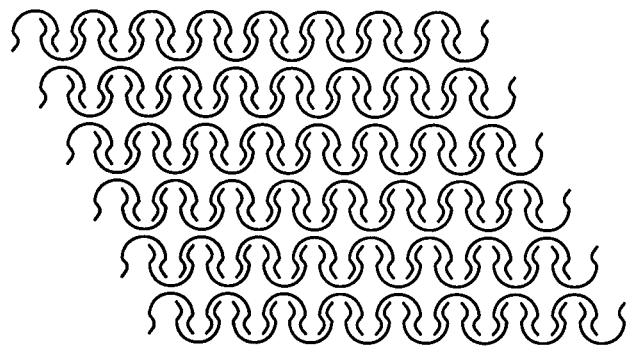
Figure 18:
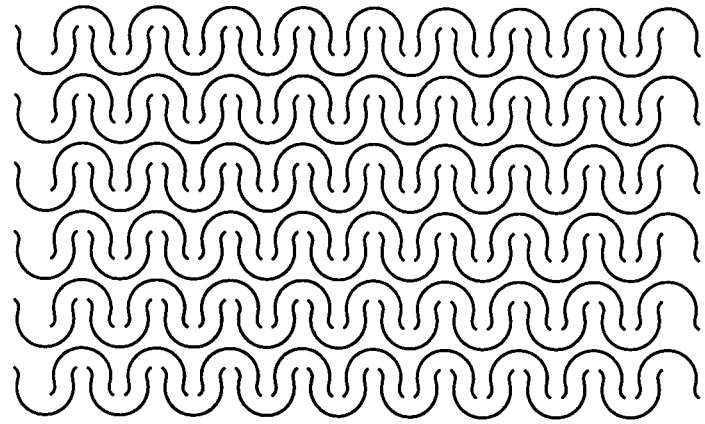
Figure 19:
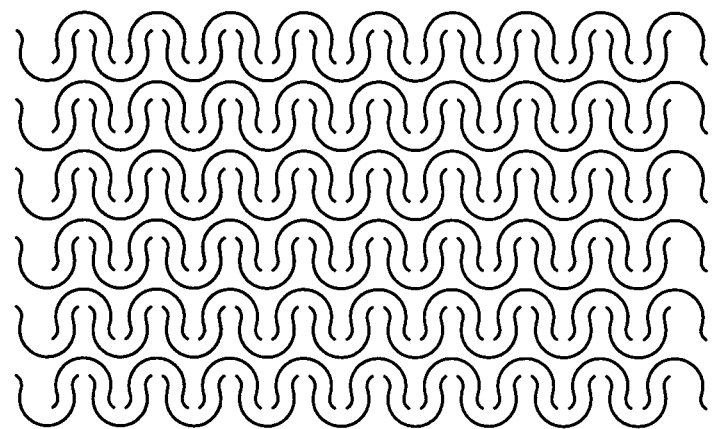

FIGS. 16 and 17 are directed to the force-to-close effects of staggered embodiments having pairs of "unbalanced arms", i.e., the first arm in a cavity well having a width less than the second arm in the cavity well.

TABLE 5

| FIG. No. | FIG. name | Force-to-close (g) | Pressure-to-close (g/cm$^2$) | Arm thickness (in) |
|---|---|---|---|---|
| 16 | B5-assymetrical-3 | 70 | 4.6 | 0.11/0.14 |
| 17 | B5-assymetrical-4 | 60 | 3.9 | 0.11/0.08 |

As can be seen, the unbalanced arms in the embodiment of FIG. 17 produced a slightly lower force-to-close, relative to the embodiment of FIG. 16, but the thinner arm (0.08) of the embodiment of FIG. 17, relative to the thicker arm (0.14") of the embodiment FIG. 16, likely contributed to the difference in pressure-to-close.

FIGS. 18-25 illustrate the effect of decreasing arm thickness on pressure-to-close for a cut pattern yielding balanced serpentine arms.

TABLE 6

| FIG. No | FIG. Name | Force to Close (g) | Pressure-to-Close g/cm$^2$ | Arm Thickness (in) |
|---|---|---|---|---|
| 18 | PatTest-1 | 60 | 3.9 | 0.17 |
| 19 | PatTest-2 | 75 | 4.9 | 0.15 |
| 20 | PatTest-3 | 80 | 5.2 | 0.13 |
| 21 | PatTest-4 | 70 | 4.6 | 0.11 |
| 22 | PatTest-5 | 25 | 1.6 | 0.09 |
| 23 | PatTest-6 | 0 | 0 | 0.07 |
| 24 | PatTest-7 | 0 | 0 | 0.05 |
| 25 | PatTest-8 | 0 | 0 | 0.03 |

Figure 20:
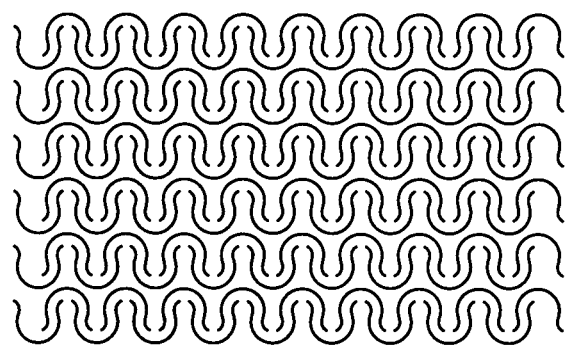
Figure 21:
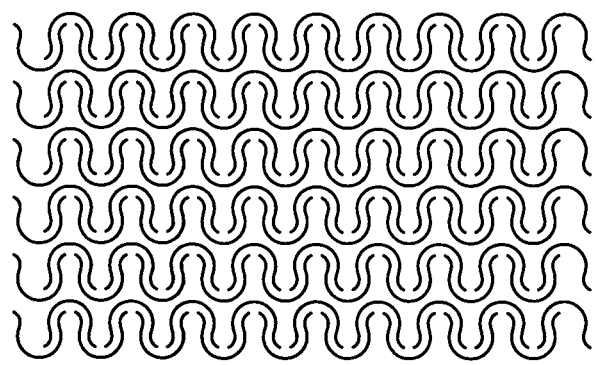
Figure 22:
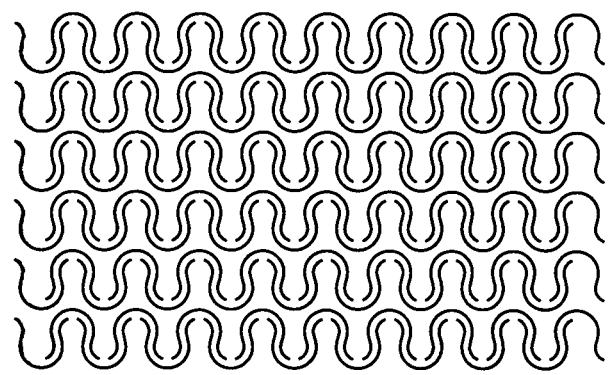
Figure 23:
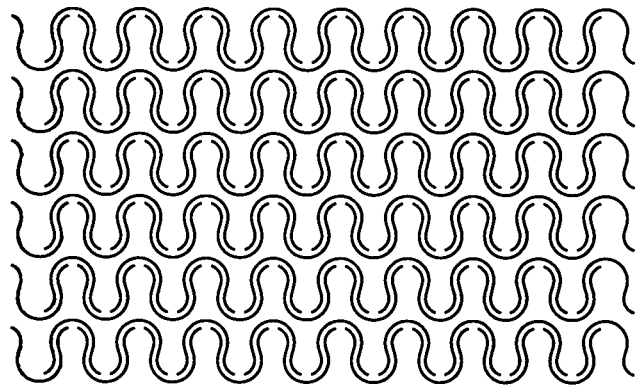
Figure 24:
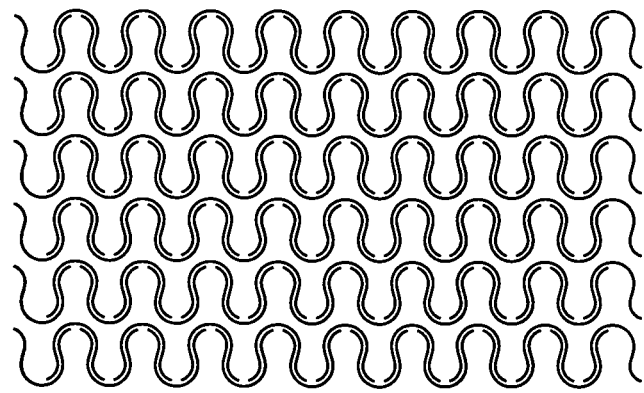
Figure 25:
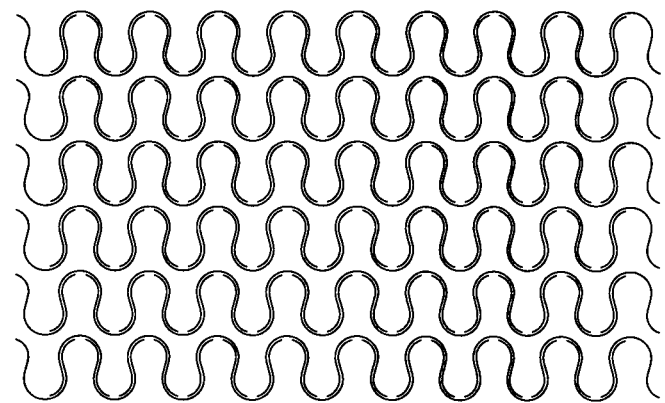
Figure 26:
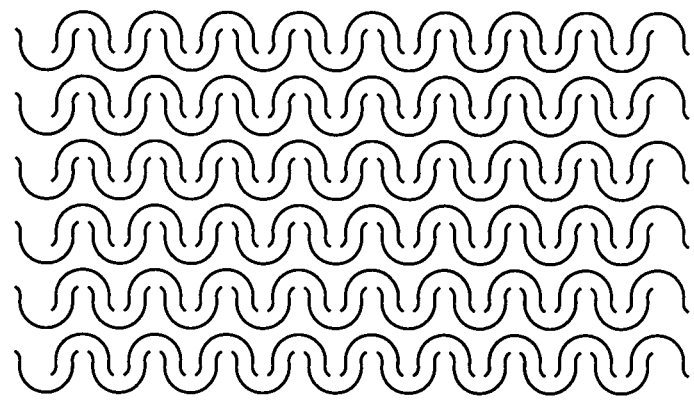
Figure 27:
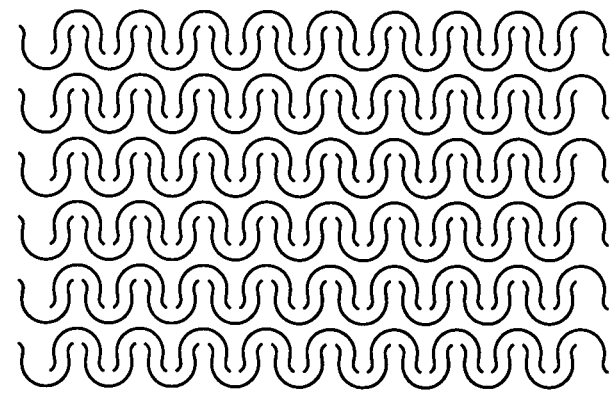
Figure 28:
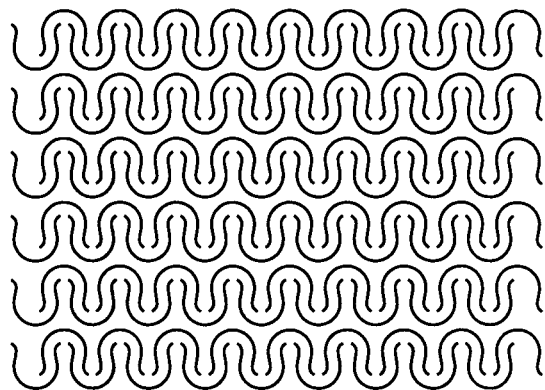
Figure 29:
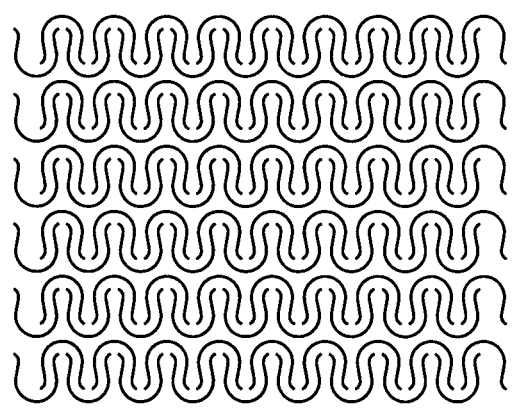
Figure 30:
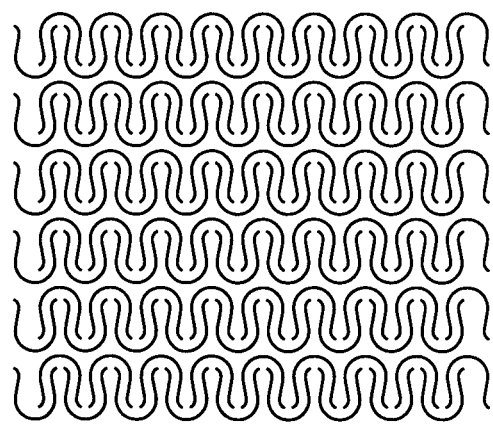
Figure 31:
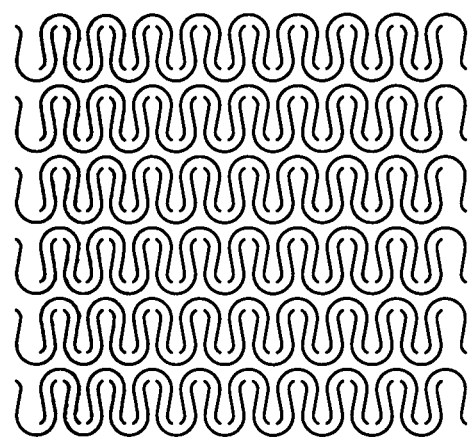
Figure 32:
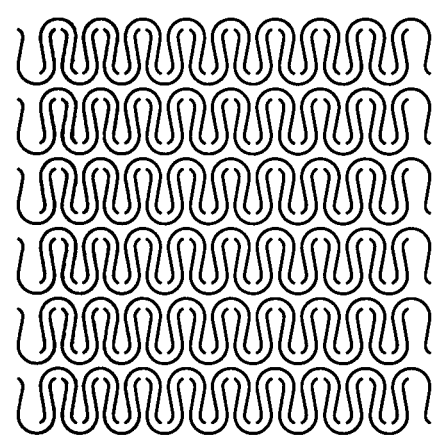
Figure 33:
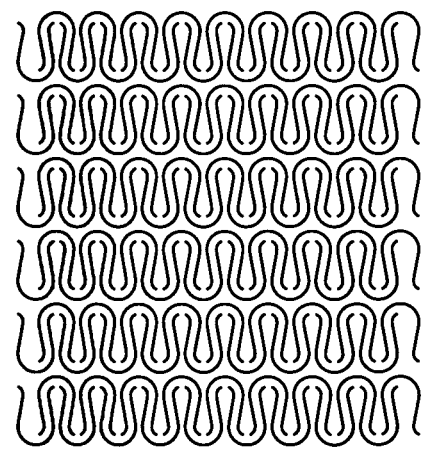
Figure 34:
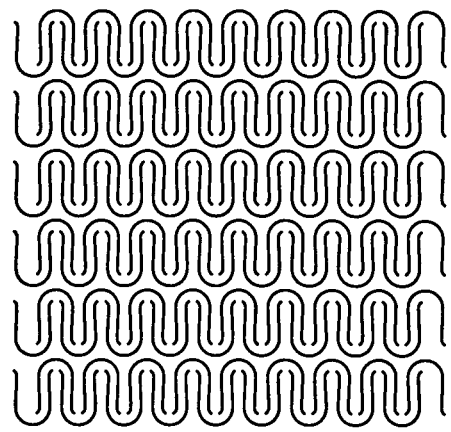

Pressure-to-close maximized for the embodiment of FIG. 20, having an arm thickness of 0.13 inch. Pressure-to-close dropped off sharply as arm thickness decreased from 0.11 inches to 0.03 inches. As can be seen from reviewing FIGS. 18-25, the samples with thicker arms also had thicker hinge regions. Thicker hinges result in more foam stretching and foam compression in the hinge regions as the arm moves into its locked position. Too thick an arm correlates with lower pressure-to-close, as there is too much foam compression and foam stretching in the hinge, both of which produce restorative forces and lower the difference between high energy state with the arms in the transverse position and the lower energy state of the arms in the locked position, thereby lowering the pressure-to close. On the other hand, the arms that were too thin also had thin hinges. These samples exhibited low pressure-to-close due to the lack of foam compression in arms that buckled rather than compressed when moving through the high energy transverse position.

FIGS. 26-34 illustrate the effect of increasing width-to-depth ratio on pressure-to-close on expandable foam sheet having serpentine arms.

TABLE 7

| FIG. No | FIG. Name | Force to Close (g) | Pressure to Close (gm/cm$^2$) | Width to Depth Ratio |
|---|---|---|---|---|
| 26 | PatTest-B1 | 20 | 1.3 | 1.54 |
| 27 | PatTest-B2 | 85 | 5.6 | 1.27 |
| 28 | PatTest-B3 | 100 | 6.6 | 0.86 |
| 29 | PatTest-B4 | 98 | 5.9 | 0.93 |
| 30 | PatTest-B5 | 80 | 5.2 | 0.71 |
| 31 | PatTest-B6 | 70 | 4.6 | 0.78 |
| 32 | PatTest-B7 | 50 | 3.3 | 0.69 |
| 33 | PatTest-B8 | 30 | 2.0 | 0.64 |
| 34 | PatTest-B9 | 90 | 5.9 | 0.75 |

The pressure-to-close exhibited by the embodiments of FIGS. 26-29 correlates with increasing neck height and decreasing width-to-depth ratio, with the lowest width-to-depth ratio (0.86) correlating with the highest pressure-to-close of the 26-29 group (6.6 g/cm$^2$).

Figure 35:
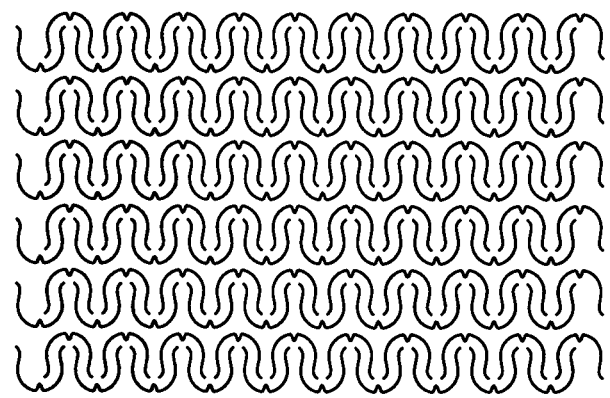
Figure 36:
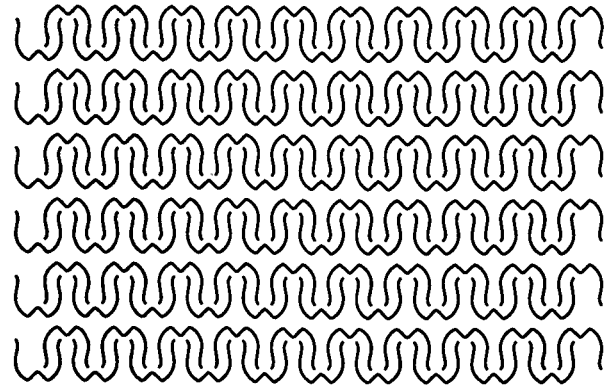
Figure 37:
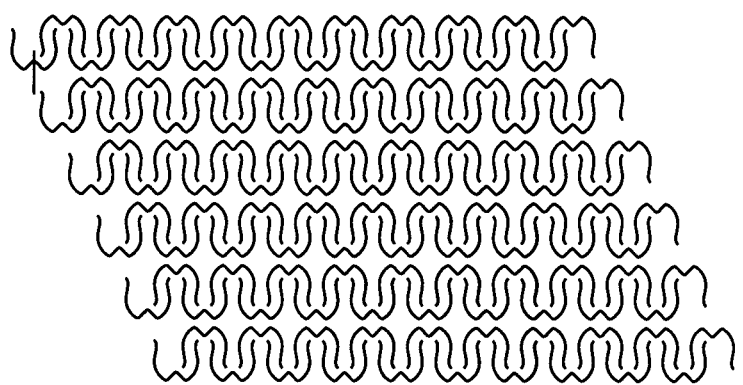

FIGS. 35, 36, 37, and 38 illustrate embodiments with serpentine arms but having a reduced width hinge by providing a v-shaped "notch" at the top of the cavity cut. FIGS. 35-37 illustrate the pressure-to-close effects of (i) notch angle, and (ii) alternation of fingers on stabilization wall, for expandable foam sheet having serpentine arms.

TABLE 8

| FIG. No | FIG. Name | Force to Close (g) | Pressure to Close (gm/cm$^2$) | Hinge distance (in) | Notch Angle (degrees) | Alternating vs. Aligned Fingers on Stabilization Wall |
|---|---|---|---|---|---|---|
| 35 | PatTry-A1 | 25 | 1.6 | 0.15 | 45 | Alternating |
| 36 | PatTry-A-2 | 80 | 5.2 | 0.15 | 90 | Alternating |
| 37 | PatTry-A-3 | 160 | 10.4 | 0.15 | 90 | Aligned |
| 38 | PatTry-B-1 | 170 | 11.2 | 0.08 | 135 | Aligned |

Figure 38:
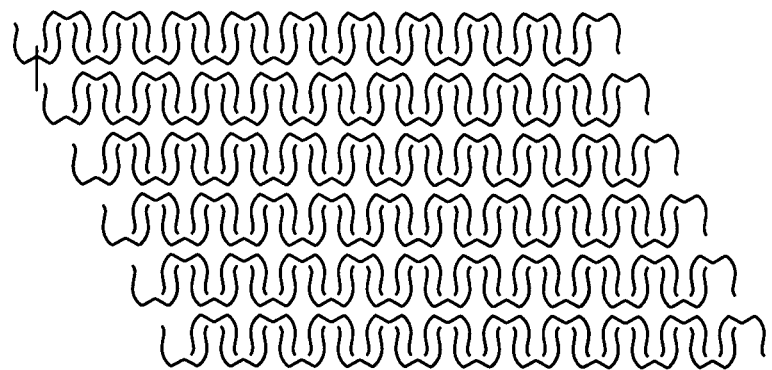
Figure 39:
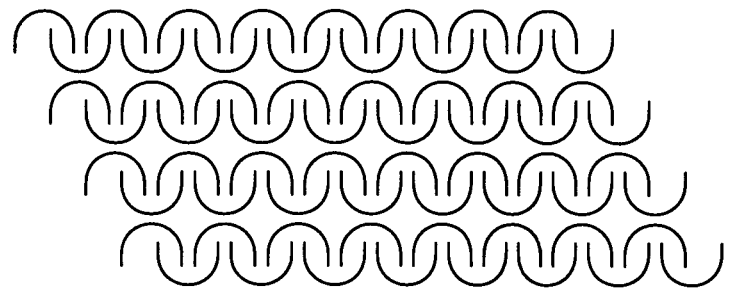
Figure 40:
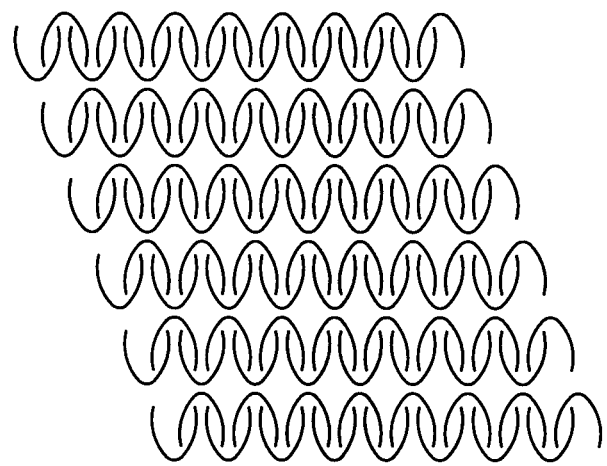
Figure 41:
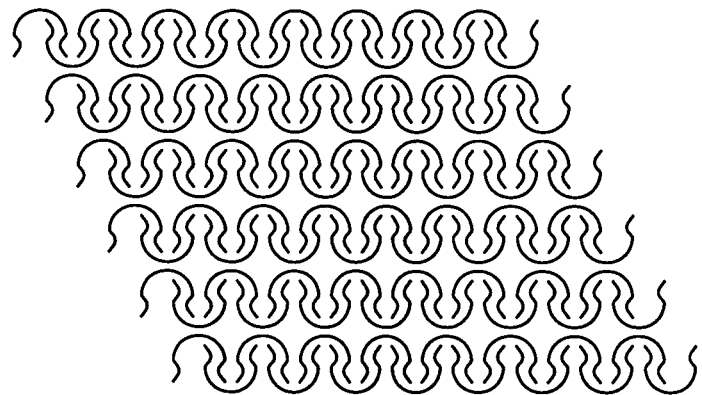
Figure 42:
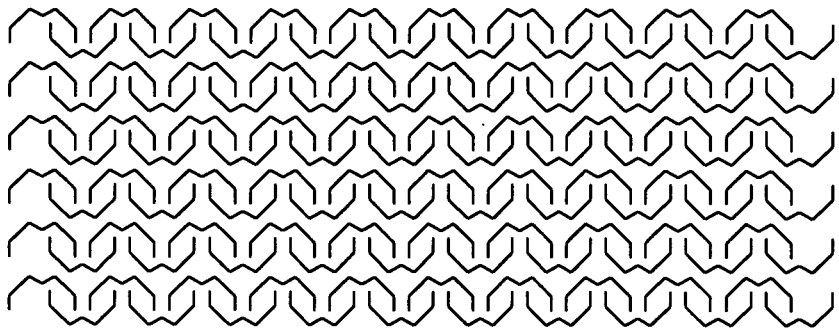
Figure 43:
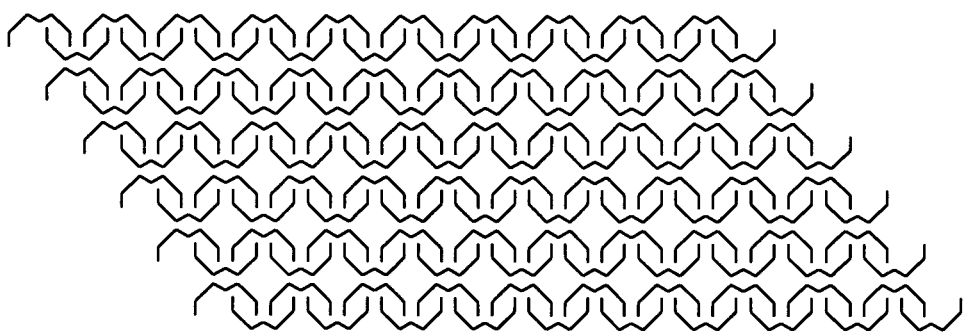
Figure 44:
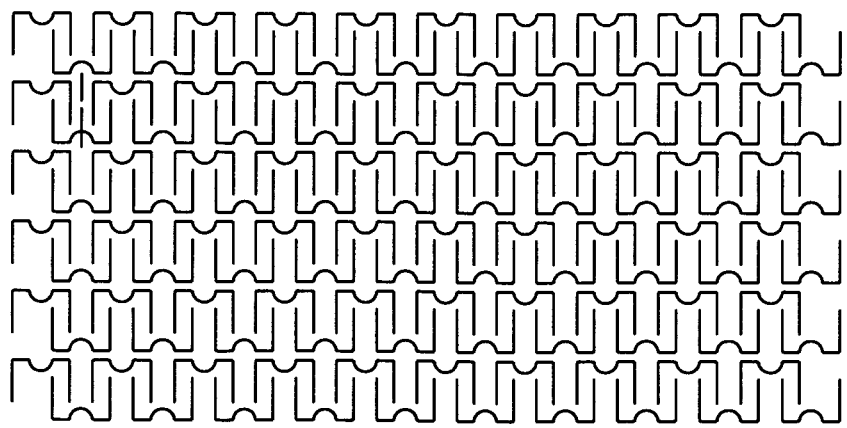
Figure 45:
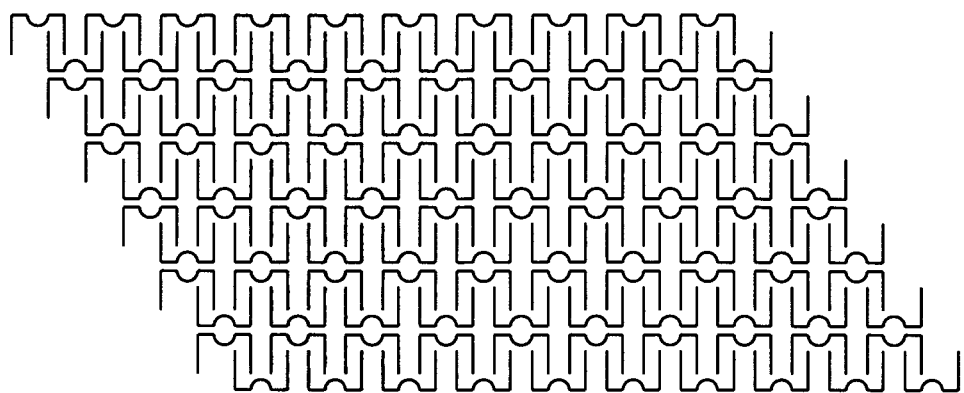

The hinge distance (i.e., width of the expansion-and-locking arm where it meets the hinge line) was the same for the embodiments of FIGS. 35, 36, and 37, but the pressure-to-close increased significantly upon increasing the notch angle from 45 to 90 degrees (FIG. 35 v. FIG. 36). The force-to-close increased significantly further upon aligning the fingers on opposing sides of the stabilization wall (FIG. 36 v. FIG. 37). This demonstrates the beneficial effect of "staggering" of the rows of slits by 50%, so that the fingers on opposite sides of a given stabilization wall are aligned with one another (e.g., FIG. 37), rather than alternating (FIG. 36), to produce higher pressure-to-close, i.e., greater locking force. The embodiment of FIG. 39, with its larger notch, its aligned fingers on each side of the stabilization walls, and smaller hinge distance, produces still higher locking force (FIG. 38 vs. FIG. 37).

FIGS. 38-45 demonstrate the effect of width-to-depth ratio, finger alignment, and hinge angle, for a variety of different slit patterns, all of which exhibit relatively high interlocking of associated rows of slits and relatively small hinge distances.

TABLE 9

| FIG. No | FIG. Name | Pressure-to-Close (g/cm$^2$) | Aligned Finger on Stab. Wall | Width-to-Depth Ratio | Hinge Angle (deg.) | Hinge Distance (in) | approx % interlock | Arm Thickness (in) |
|---|---|---|---|---|---|---|---|---|
| 38 | PatTry-B1 | 170 | Yes | 1.13 | 44 | .08 | 65 | 0.15 |
| 39 | PatTest-B3 | 140 | Yes | 1.29 | 0 | .16 | 65 | 0.21 |
| 40 | PatTest-B4 | 120 | Yes | 0.74 | −15 | .06 | 70 | 0.15 |
| 41 | PatTest-B5 | 140 | Yes | 1.2 | 37 | .09 | 75 | 0.11 |
| 42 | PatTest-B6 | 30 | No | 1.95 | 0 | .08 | 65 | 0.2 |
| 43 | PatTest-B7 | 40 | Yes | 1.93 | 0 | .08 | 50 | 0.2 |
| 44 | PatTest-B8 | 0 | No | 1.4 | 0 | .08 | 60 | 0.15 |
| 45 | PatTest-B9 | 20 | No | 1.4 | 0 | .08 | 60 | 0.15 |

The embodiments of FIGS. 38-41 exhibited relatively lower width-to-depth ratios (0.74, 1.13, 1.2, and 1.29) and each had aligned fingers on each side of the stabilization wall. The relatively low width-to-depth ratio and relatively high percent interlocking provides long arms that (if wide enough) compress and produce higher locking, i.e., higher pressure-to-close. The higher width-to-depth ratio, alone or in combination with the non-aligned fingers on each stabilization wall, contributed to the lower pressure-to-close for the embodiments of FIGS. 42-45. While a positive hinge angle appears to be beneficial, it is not absolutely necessary, as the negative hinge angle of the FIG. 40 appears to be more than compensated for by the very low width-to-depth ratio of 0.74, the aligned fingers on the stabilization walls, the high percent interlocking, and the arms of adequate thickness.

Figure 46:
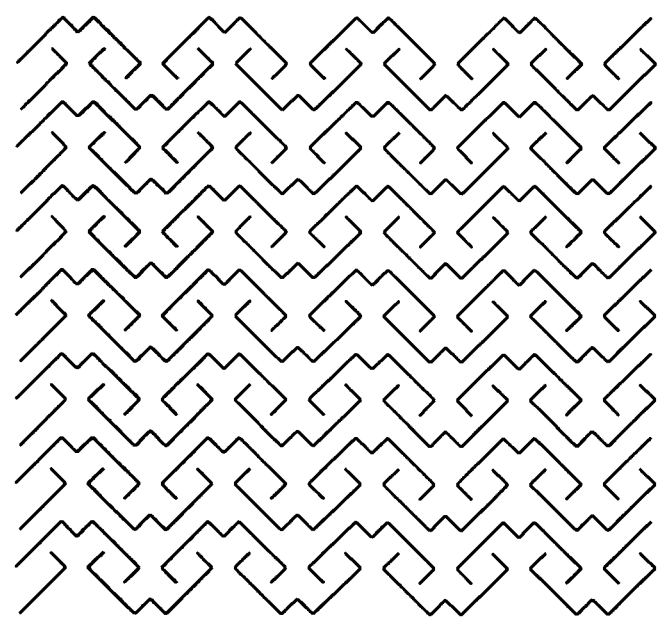
Figure 47:
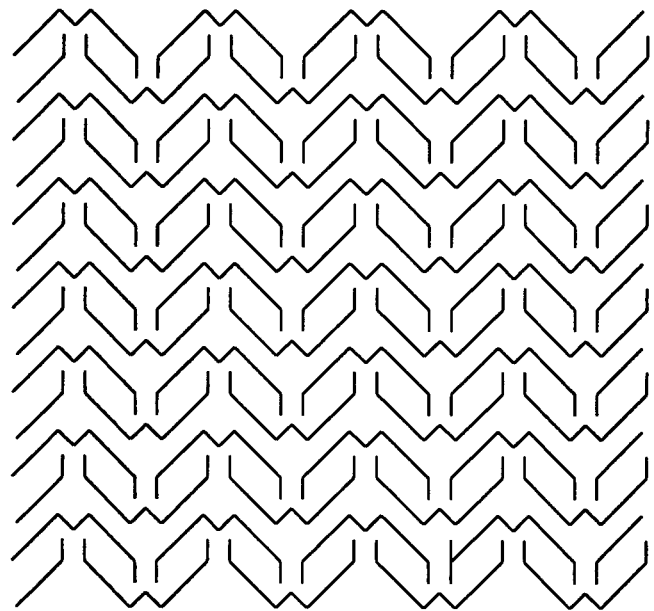
Figure 48:
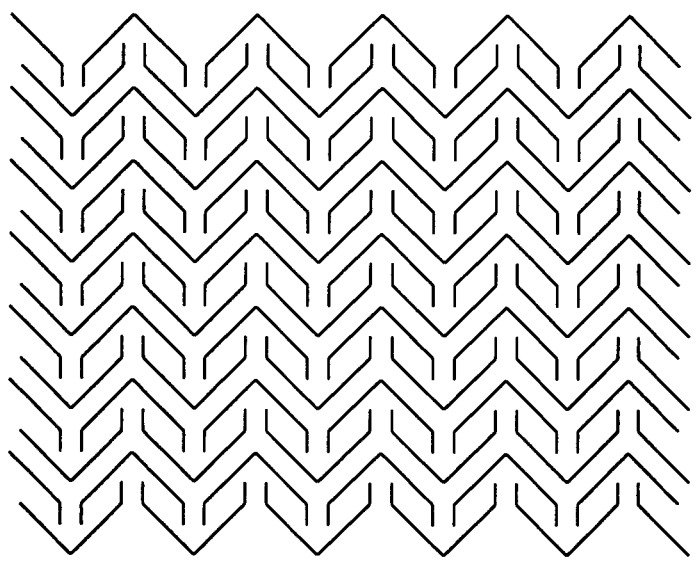
Figure 49:
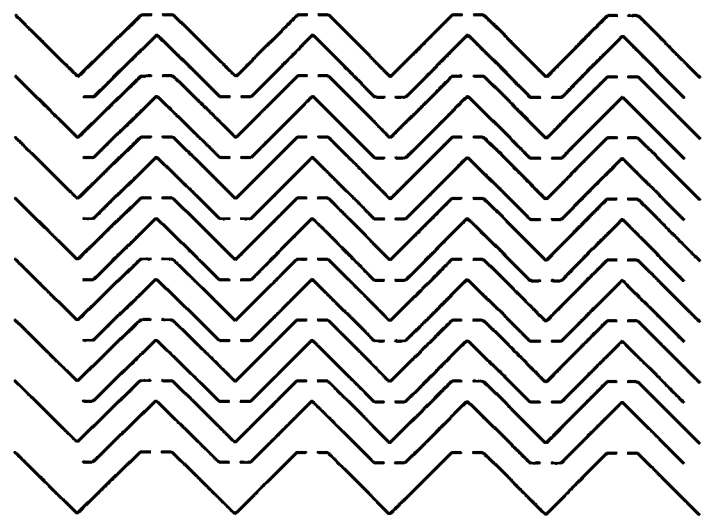
Figure 50:
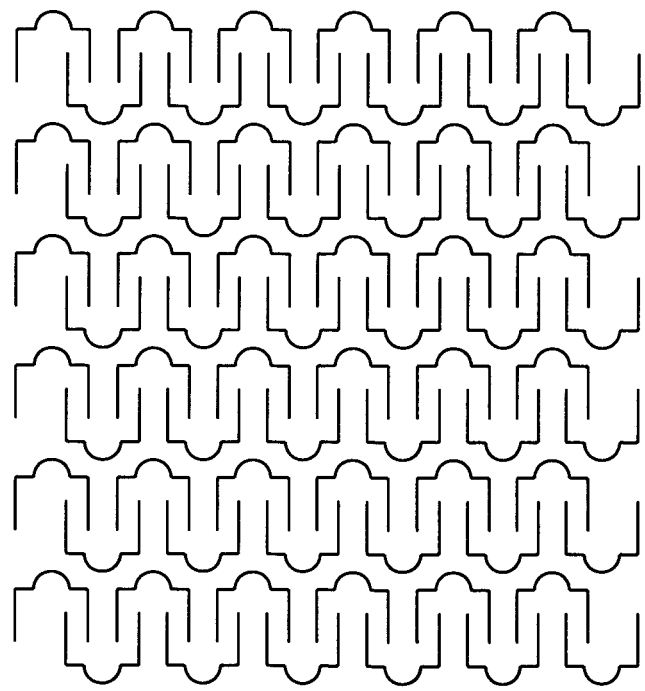

FIGS. 46-50 demonstrate the effect of variations in the tip of the cut, i.e., having it come to a square peak as in FIGS. 48 and 49, providing a notch to thin out the hinge as in FIGS. 46 and 47, and providing a hump to thicken the hinge area as in FIG. 50.

TABLE 10

| FIG. No | FIG. Name | Pressure-to-Close (g) | Shape of Peak of slit | Hinge distance (in) | Aligned Fingers on Stabil. Wall | Width-to-Depth Ratio | Hinge Angle (deg.) |
|---|---|---|---|---|---|---|---|
| 46 | PatTry-C-1 | 1.3 | Notch | .08 | No | 1.37 | −45 |
| 47 | PatTest-C-2 | 1.3 | Notch | .08 | No | 1.83 | 0 |
| 48 | PatTest-C-3 | 3.9 | Square | .08 | No | 1.42 | 0 |
| 49 | PatTest-C-4 | 0 | Square | .12 | No | 2.46 | 90 |
| 50 | PatTest-C-5 | 0 | Hump | .15 | N/A | 1.0 | 0 |

Figure 51:
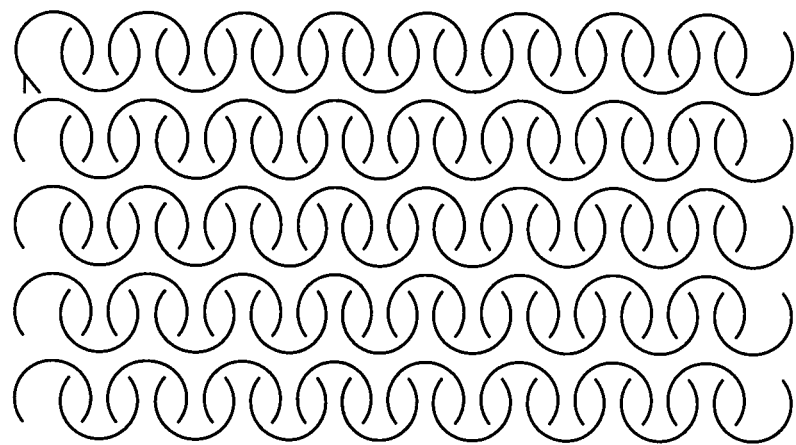

The notched cuts (FIGS. 46 and 47) exhibited the same pressure-to-close even though the turned-in cut of FIG. 46 exhibited a significantly lower hinge angle (−45 vs. 0 degrees). The negative hinge angle, and resulting shorter arms, appear to be compensated for by the lower width-to-depth ratio (1.37 vs. 1.83). The square-tipped cut pattern with the significantly lower width-to-depth ratio produced much higher pressure-to-close than the same cut shape but with a much higher width-to-depth ratio (FIG. 48 v. FIG. 49). The bulbous protrusion thickening the hinge area provided zero pressure-to-close in spite of the low width-to-depth ratio (FIG. 50), as the thicker hinge and hump appears to have offered considerable resistance to high locking force, due to excessive foam stretching and excessive foam compression in the hinge regions in the expanded configuration FIGS. 51 and 52 demonstrate the effect of flaring the ends of the fingers in slit patterns having negative hinge angles.

TABLE 11

| FIG. No | FIG. Name | Pressure-to-close (g/cm²) | Arm Thickness (in) | Hinge Angle (deg) | Hinge distance (in) | Comment |
|---|---|---|---|---|---|---|
| 51 | Roundi | 5.9 | 0.20 | −40 | 0.08 | OK; mushy |
| 52 | Roundi-2 | 0 | 0.08 | −42.4 | 0.08 | Ripped when opening due to thin walls |

Figure 52:
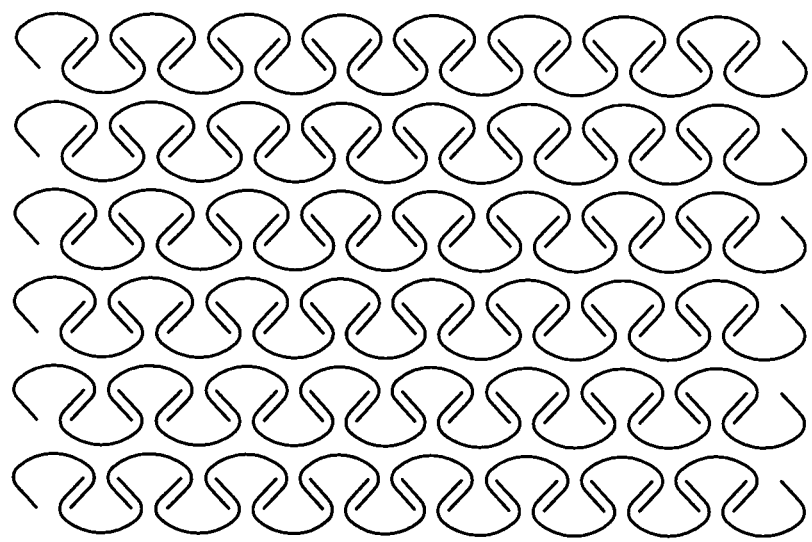

The flared ends of the fingers in the embodiment of FIG. 52, in combination with the thin arms, resulted in ripping of the arms during an attempt to expand the sheet. The torn sheet is considered to exhibit a zero pressure-to-close. Note that the embodiment of FIG. 51 exhibited relatively high pressure-to-close, and that it did not rip as the fingers were not flared so much that the force to compress the flared finger end did not overcome the tensile strength of the arms or hinges.

Figure 53:
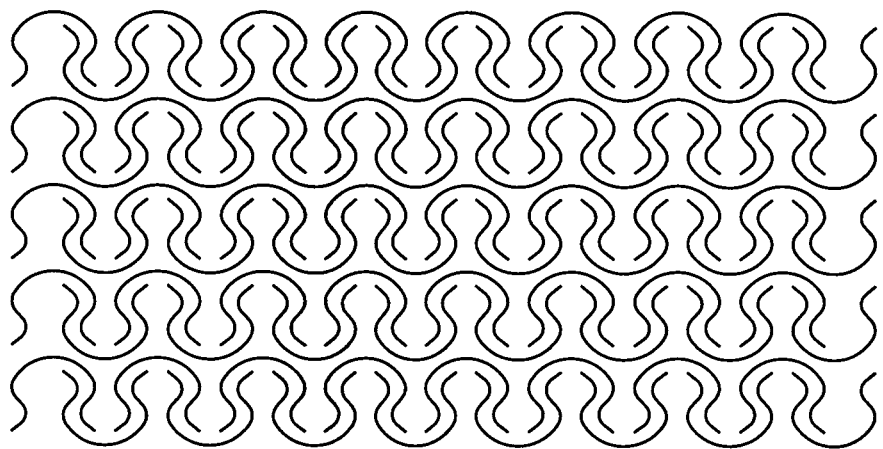
Figure 54:
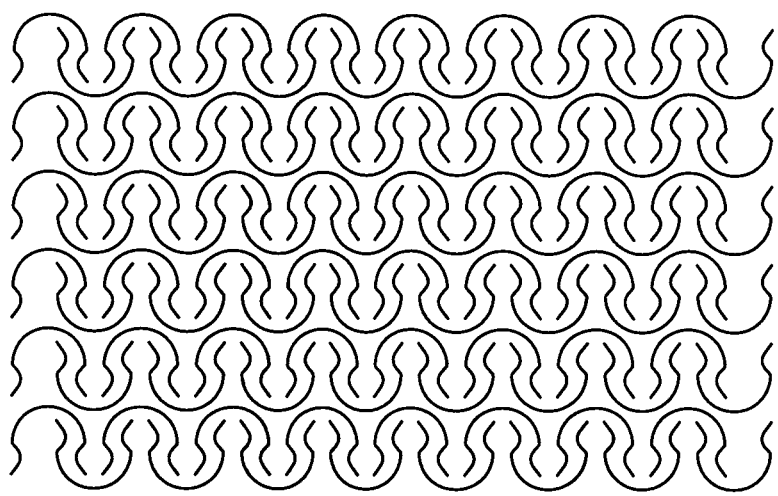

FIGS. 53 and 54 embody slit patterns having serpentine arms of relatively uniform width, with fingers having a neck terminating in a bulbous end.

TABLE 12

| FIG. No | FIG. Name | Pressure-to-close (g/cm²) | Arm Thickness (in) | Bulb width-to-neck width ratio |
|---|---|---|---|---|
| 53 | Roundi-3 | 3.0 | 0.08 | 2.32 |
| 54 | Roundi-4 | 4.6 | 0.11 | 2.08 |

The embodiment of FIG. 54, with its relatively thicker arm (0.11 in to 0.08 in), exhibited a significantly higher pressure-to-close than the embodiment of FIG. 53. The bulb-to-neck width ratio of each of these embodiments did not present the tearing exhibited by the embodiment of FIG. 52, above.

Figure 55:
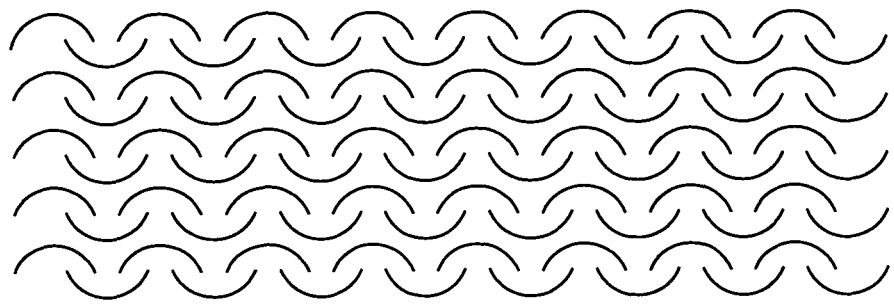
Figure 56:
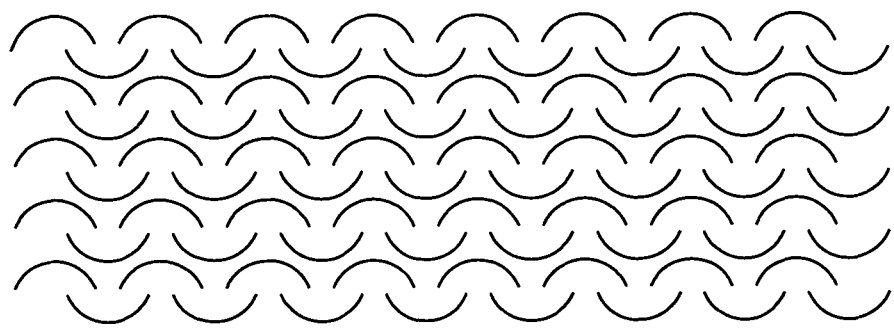
Figure 57:
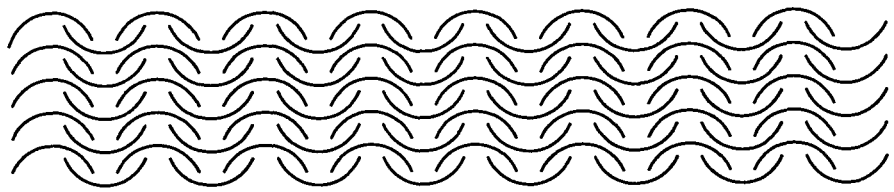
Figure 58:
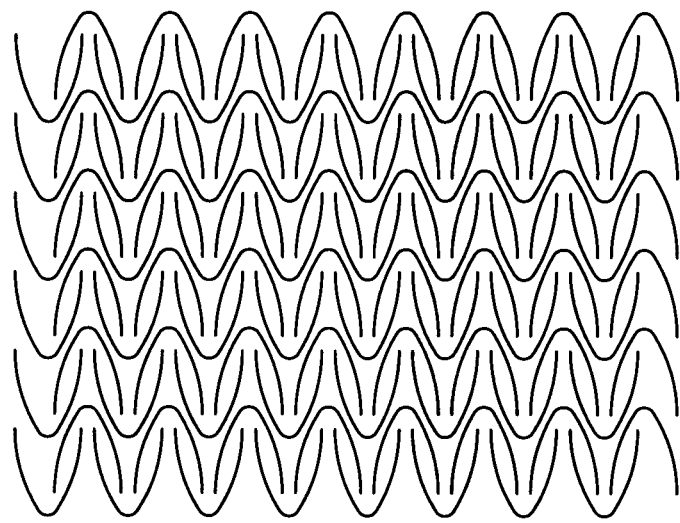
Figure 59:
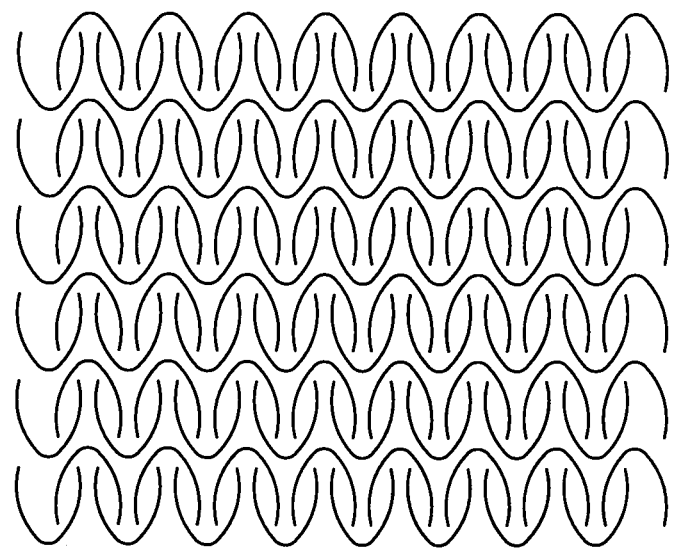
Figure 60:
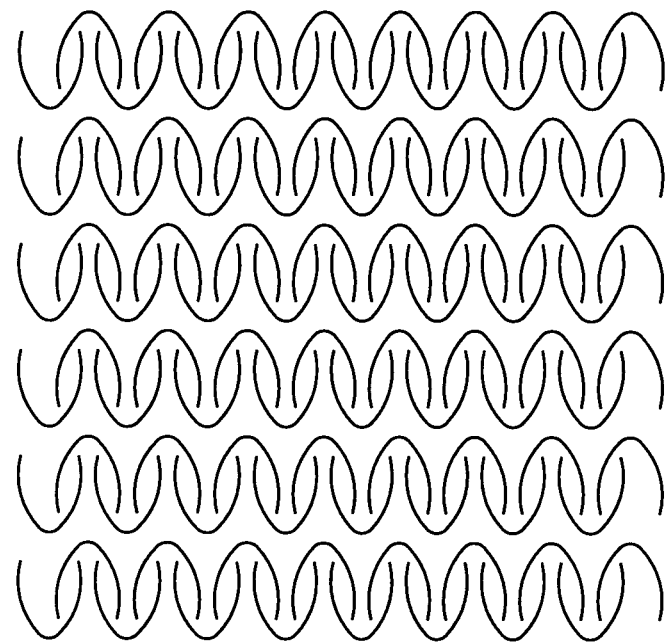
Figure 61:
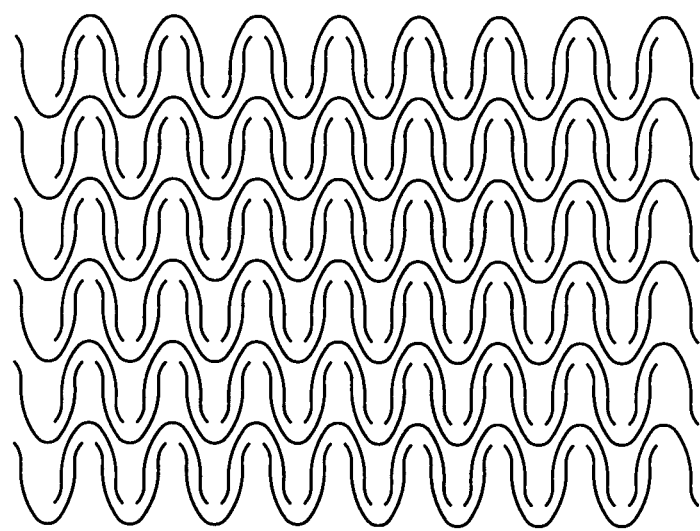
Figure 62:
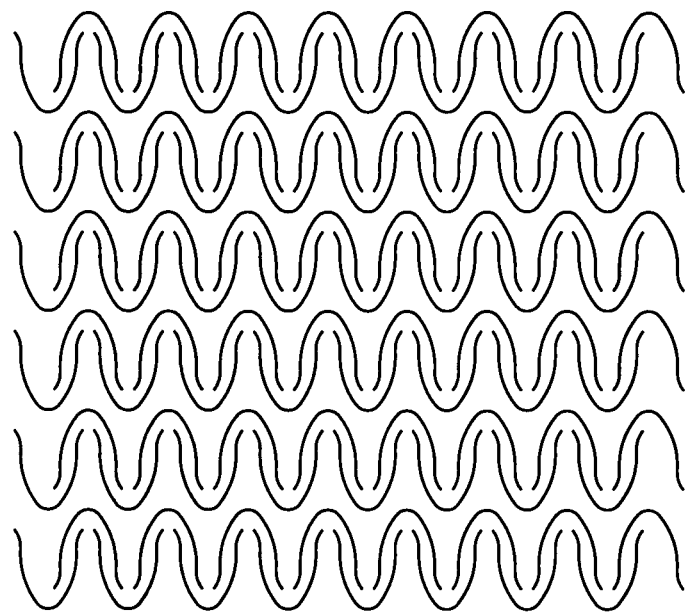
Figure 63:
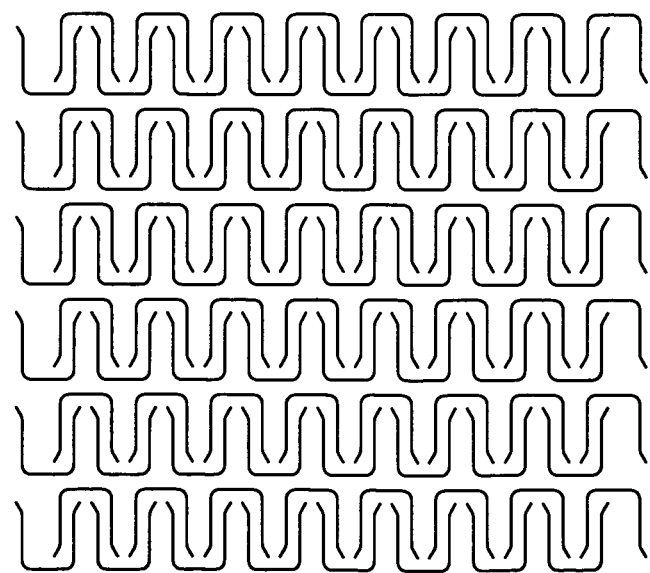
Figure 64:
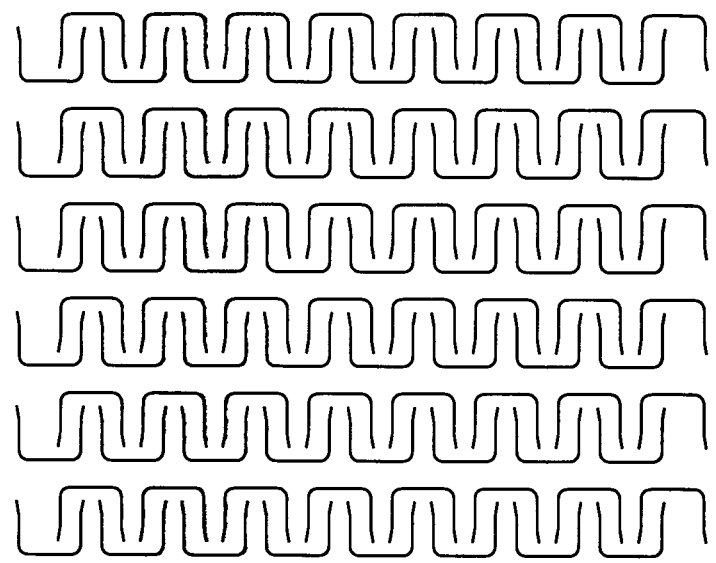
Figure 65:
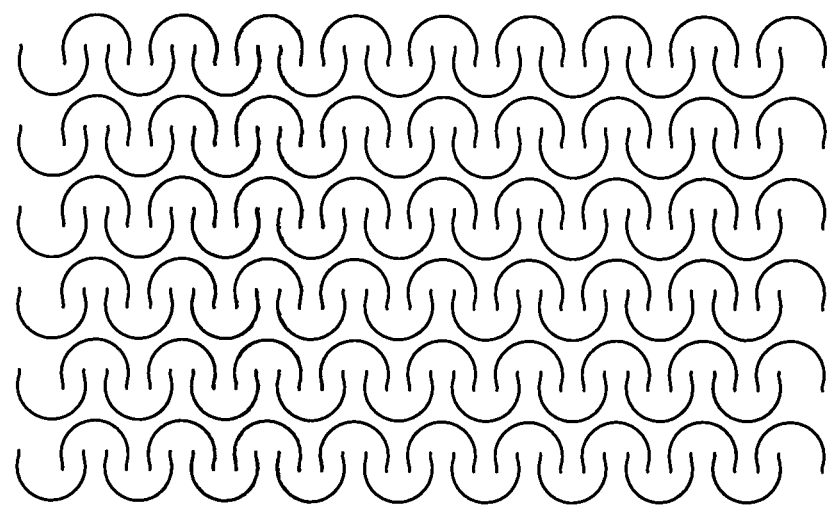
Figure 66:
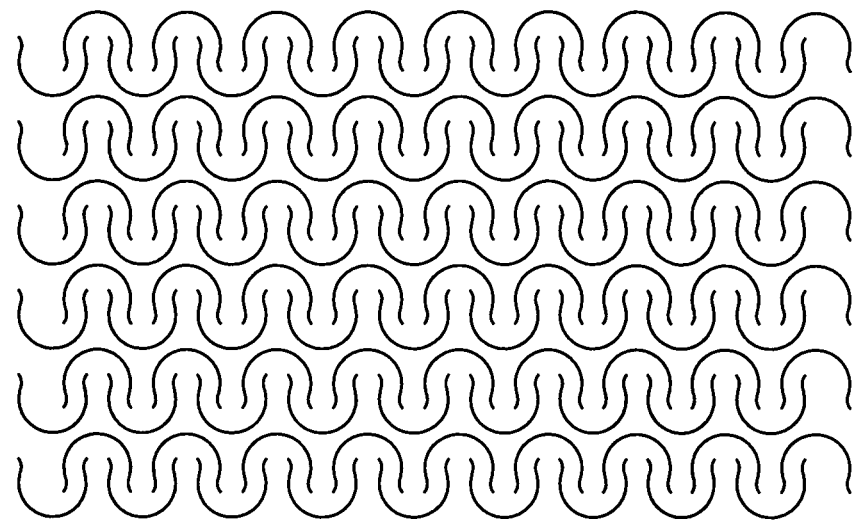
Figure 67:
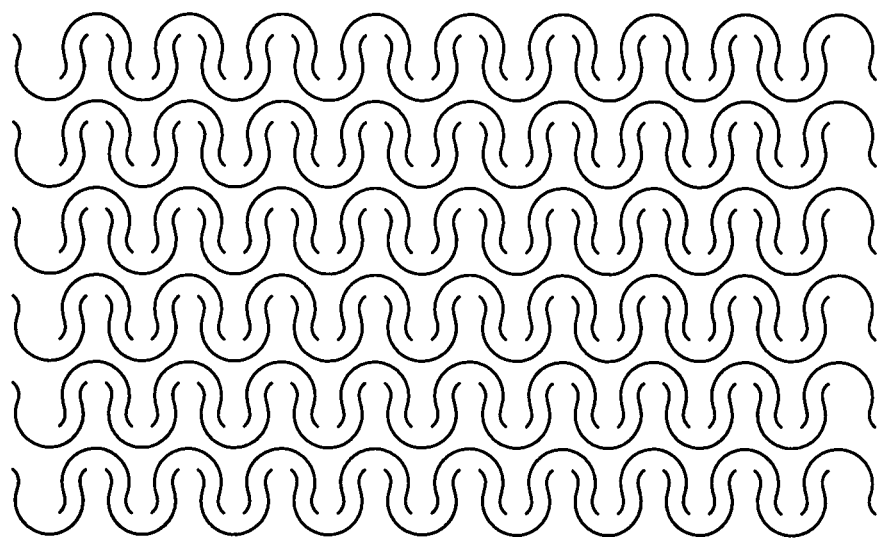
Figure 68:
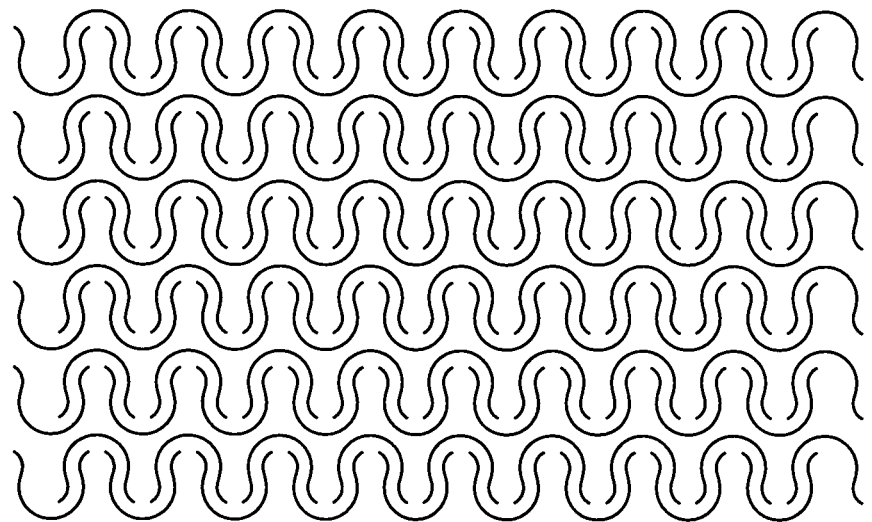
Figure 69:
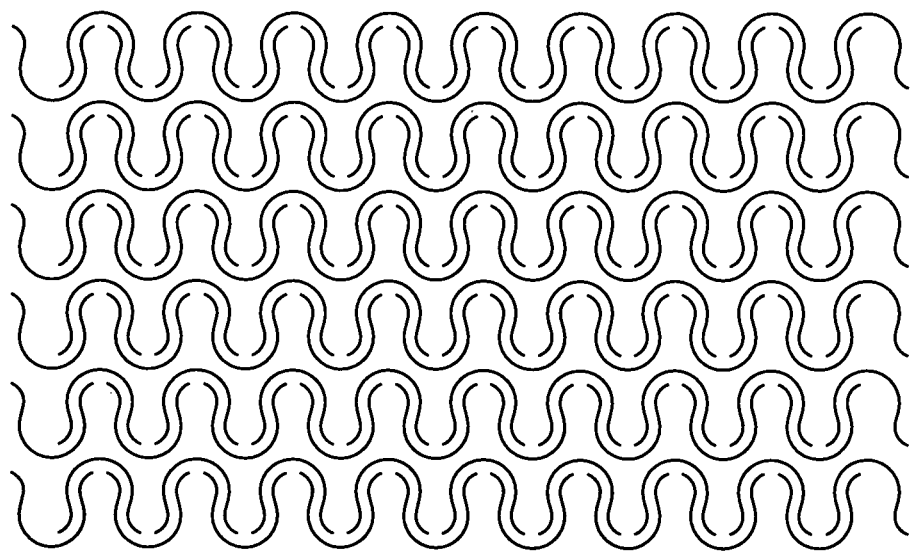
Figure 70:
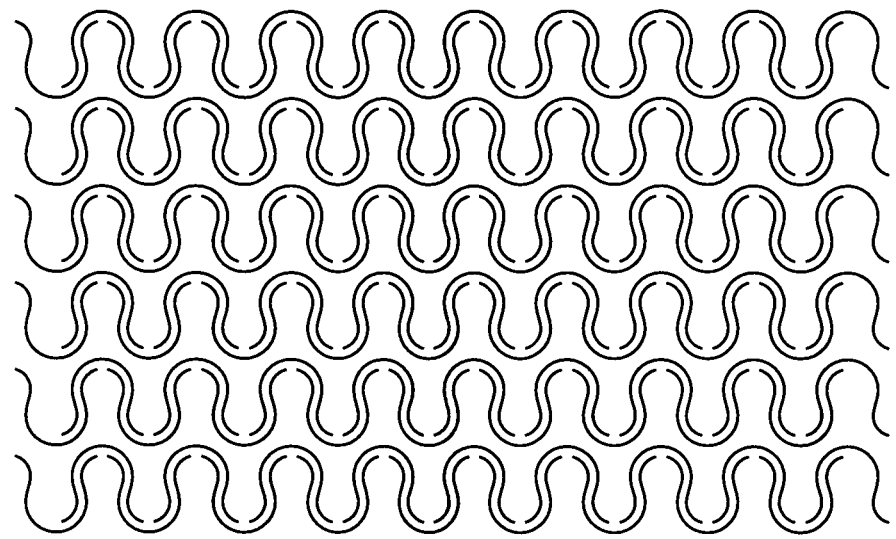
Figure 71:
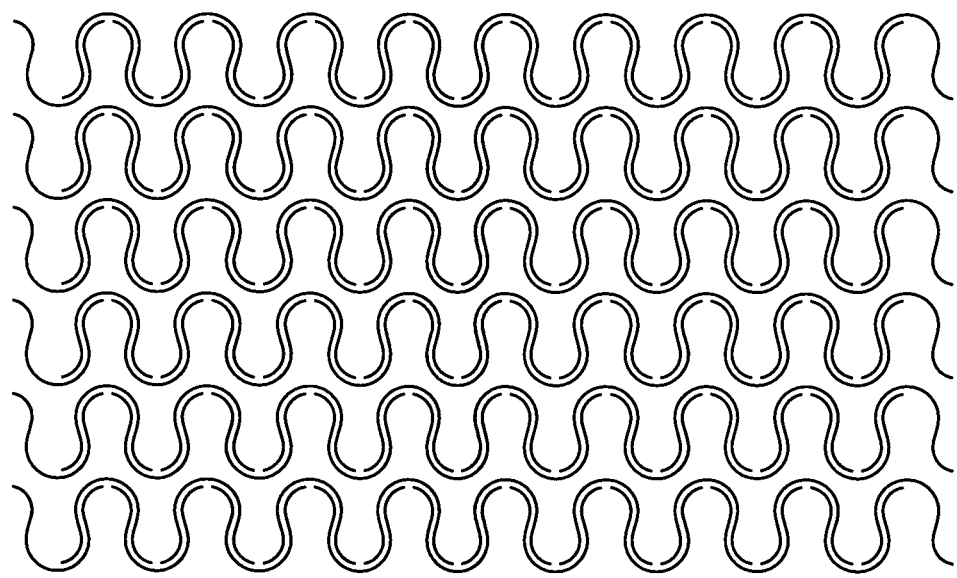
Figure 72:
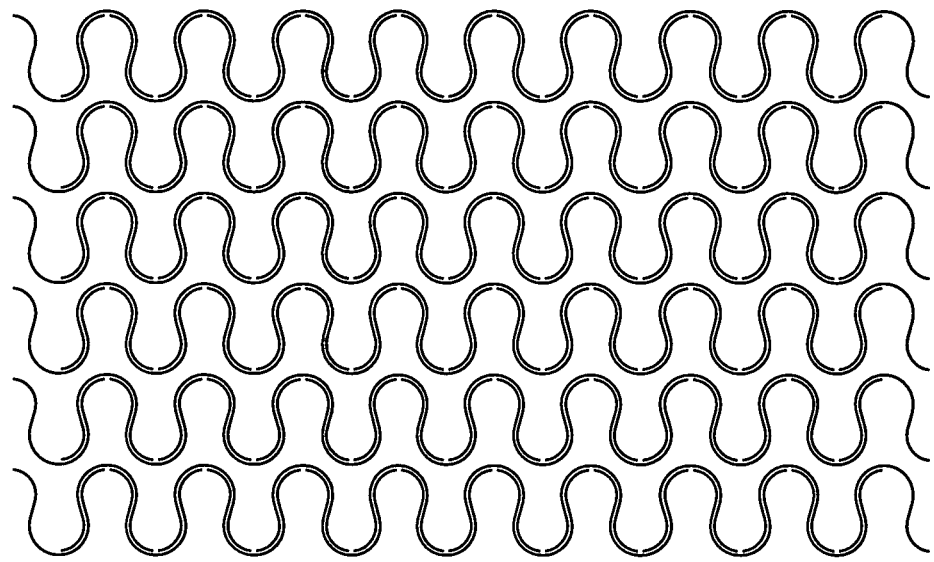
Figure 73:
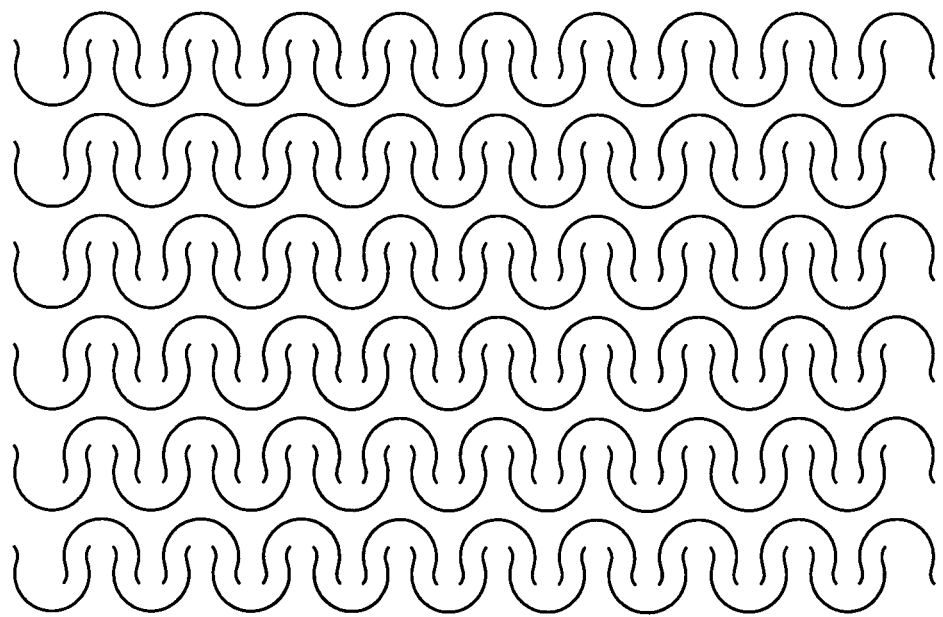
Figure 74:
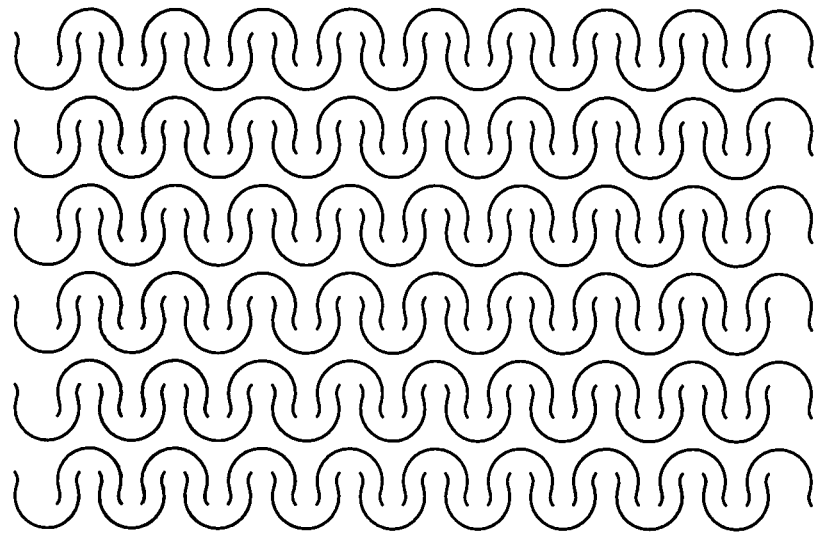
Figure 75:
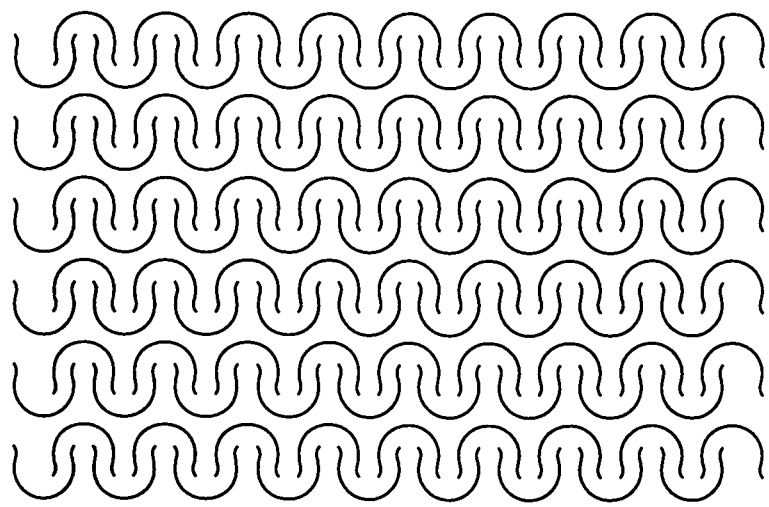

FIGS. 55, 56, and 57 exhibit slit patterns having high width-to-depth ratios and low percent interlocking, and all exhibited a pressure-to-close of 0 g/cm².

TABLE 13

| FIG. No | FIG. Name | Pressure-to-close (g/cm²) | Width-to-Depth Ratio | Interlocking (percent) |
|---|---|---|---|---|
| 55 | Roundi-5 | 0 | 3.1 | 0 |
| 56 | Roundi-6 | 0 | 3.1 | −10 |
| 57 | Roundi-7 | 0 | 3.1 | +50 |

The embodiments of FIGS. 58, 59, 60, 61, 62, 63, and 64 were all of a similar cut pattern with a high to very high degree of interlocking, but notably they varied in the thickness of the stabilization wall.

TABLE 14

| FIG. No | FIG. Name | Pressure-to-close (g/cm²) | Stab. Wall Thickness (in) | Width-to-depth ratio | Arm Thickness (in) | Comment |
|---|---|---|---|---|---|---|
| 58 | Roundi-9 | 2.0 | 0.05 | 0.74 | .11 | Unstable |
| 59 | Roundi-10 | 4.9 | 0.09 | 0.77 | .15 | good; sloppy |
| 60 | Roundi-11 | 7.9 | 0.17 | 0.77 | .15 | Good; stiff |
| 61 | Roundi-12 | 3.3 | 0.06 | 0.83 | .08 | Thin; sloppy |
| 62 | Roundi-13 | 6.9 | 0.13 | 0.86 | .09 | Stiff; good |
| 63 | Roundi-14 | 3.3 | 0.11 | 1.0 | 0.1 | Odd; sloppy |
| 64 | Roundi-15 | 7.2 | 0.19 | 1.11 | .14 | Good |

The embodiments with the thicker stabilization walls exhibited higher pressure-to-close. The relatively slight differences in the width-to-depth ratios did not appear to correlate with pressure-to-close, indicating that width-to-depth ratios in the 0.7 to 1.2 range are good for producing relatively high locking force. The embodiments with thinner stabilization walls were considered to be "sloppy" in expansion, and generally exhibited lower pressure-to-close. A stabilization wall thickness of 0.05 inch appears to be too low to produce high locking force. The embodiments of FIGS. 63 and 64 exhibited "square-type" cut patterns, with the FIG. 64 embodiment exhibiting a higher force-to-close than the FIG. 63 embodiment, apparently due to thicker arms (0.14" vs. 0.10") and thicker stabilization wall (0.19" vs. 0.11"), and in spite of its higher width-to-depth ratio (1.11 versus 1.0).

The embodiments of FIGS. 65 through 72 illustrate the effect of varying the arm thickness on cut patterns with serpentine arms.

TABLE 15

| FIG. No | FIG. Name | Pressure-to-Close (g/cm²) | Arm Thickness (inch) | Hinge separation (in) | Hinge distance (in) | Hinge Angle (deg) |
|---|---|---|---|---|---|---|
| 65 | Walltest-1 | 0 | 0.17 | 0.17 | 0.17 | 18 |
| 66 | Walltest-2 | 3.6 | 0.15 | 0.15 | 0.15 | 42 |
| 67 | Walltest-3 | 5.2 | 0.13 | 0.13 | 0.13 | 55 |
| 68 | Walltest-4 | 3.3 | 0.11 | 0.11 | 0.11 | 64 |
| 69 | Walltest-5 | 2.0 | 0.09 | 0.09 | 0.09 | 71 |
| 70 | Walltest-6 | 1.0 | 0.07 | 0.07 | 0.07 | 76 |
| 71 | Walltest-7 | 0 | 0.05 | 0.05 | 0.05 | 81 |
| 72 | Walltest-8 | 0 | 0.03 | 0.03 | 0.03 | 85 |

The maximum pressure-to-close was obtained with an arm thickness of 0.13 inch, with pressure-to-close dropping off for to zero for both thicker arms (0.17 inch, producing too much foam compression and foam stretching in the hinge area) and thinner arms (0.05 inch, too thin to exhibit the longitudinal foam compression along the axis of the arm at the peak of the activation energy curve, followed by low longitudinal compression along the axis of the arm in the locked position).

The embodiments of FIG. 73 through 76 illustrate the effect of varying the arm thickness, hinge separation, hinge distance, and hinge angle on cut patterns having serpentine arms.

TABLE 16

| FIG. No. | FIG. Name | Pressure-to-Close (g/cm$^2$) | Repeat finger-to-finger (in) | Repeat S. Wall to S. Wall (in) |
|---|---|---|---|---|
| 73 | Walltest-B1 | 7.9 | .67 | .68 |
| 74 | Walltest-B2 | 5.9 | .49 | .50 |
| 75 | Walltest-B3 | 2.0 | .31 | .32 |
| 76 | Walltest-B4 | 0 | .13 | .14 |

As is apparent from the pressure-to-close results, locking force decreased as the size of the slits decreased. A review of the data set forth in Table 1 reveals that as the finger-to-finger and stabilization wall-to-stabilization wall decreases, the pressure to close also decreases. While decreasing arm thickness and decreasing hinge separation can be understood to decrease locking force, decreasing hinge distance would seem to have the opposite effect, as less compressed foam in the hinge area after locking would lower the spring-back force associated with a larger amount of compressed foam in the expanded and locked configuration.

Table 17, below, provides pressure-to-close data for various additional embodiments of the expandable sheets referred to above as "B5" (FIG. 3A), "B1" (FIG. 2A), "0-Straight" (FIG. 1A), Comparative No. 1 (FIG. 80), Comparative No. 2A (FIG. 81A), Comparative No. 2B, and Comparative No. 2C.

TABLE 17

| Row No. | Sample Identity | Density (lb/ft³) | Sheet Thickness (in) | Scale | Force-to-Close (g) | Pressure-to-Close (g/cm²) | Repeat Finger-to-Finger (in) | Repeat Sta. Wall-to-Sta. Wall (closed) (in) | Cell Area (closed) (in²) | Cell Area (open) (in²) | Hinge distance (in) | Hinge Separation (in) | Hinge Angle (deg) | Arm Width (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 1 | B5 | 6 | 0.28 | 4 | 0 | 0 | 2.68 | 2.8 | 7.5 | 0.00 | 0.36 | 0.44 | 37 | .44 | 0.36 | 1.64 | 8 | 0.00 | |
| 2 | B5 | 6 | 0.28 | 2 | 250 | 44 | 1.34 | 1.4 | 1.88 | 4.76 | 0.18 | 0.22 | 37 | 0.22 | 0.18 | 0.82 | 5.38 | 13.63 | Diff to close |
| 3 | B5 | 6 | 0.28 | 1.5 | 400 | 70 | 1.01 | 1.05 | 1.06 | 2.70 | 0.14 | 0.17 | 37 | 0.17 | 0.14 | 0.62 | 6 | 15.38 | Diff to close |
| 4 | B5 | 6 | 0.28 | 1 | 400 | 70 | 0.67 | 0.7 | 0.47 | 1.22 | 0.09 | 0.11 | 37 | 0.11 | 0.09 | 0.41 | 4 | 10.38 | Diff to close |
| 5 | B5 | 6 | 0.28 | .75 | 500 | 84 | 0.50 | 0.53 | 0.26 | 0.67 | 0.07 | 0.08 | 37 | 0.08 | 0.07 | 0.31 | 3 | 7.63 | |
| 6 | B5 | 6 | 0.28 | 0.5 | 500 | 84 | 0.34 | 0.35 | 0.12 | 0.29 | 0.05 | 0.06 | 37 | 0.06 | 0.05 | 0.21 | 2 | 5.00 | |
| 7 | | | | | | | | | | | | | | | | | | | |
| 8 | B5 | 4 | 1.1 | 4 | 350 | 15.7 | 2.68 | 2.8 | 7.5 | 17.82 | 0.36 | 0.44 | 37 | .44 | 0.36 | 1.64 | 8 | 19.00 | |
| 9 | B5 | 4 | 1.1 | 2 | 550 | 24.6 | 1.34 | 1.4 | 1.88 | 4.71 | 0.18 | 0.22 | 37 | 0.22 | 0.18 | 0.82 | 5.38 | 13.50 | Some tearing |
| 10 | B5 | 4 | 1.1 | 1.5 | 900 | 40.3 | 1.01 | 1.05 | 1.06 | 2.64 | 0.14 | 0.17 | 37 | 0.17 | 0.14 | 0.62 | 6 | 15.00 | |
| 11 | B5 | 4 | 1.1 | 1 | 800 | 35.8 | 0.67 | 0.7 | 0.47 | 1.18 | 0.09 | 0.11 | 37 | 0.11 | 0.09 | 0.41 | 4 | 8.50 | Diff to open |
| 12 | B5 | 4 | 1.1 | 1 | 900 | 40.3 | 0.67 | 0.7 | 0.47 | 1.17 | 0.09 | 0.11 | 37 | 0.11 | 0.09 | 0.41 | 4 | 10.00 | |
| 13 | B5 | 4 | 1.1 | .75 | 700 | 31.3 | 0.50 | 0.53 | 0.26 | 0.66 | 0.07 | 0.08 | 37 | 0.08 | 0.07 | 0.31 | 3 | 7.50 | |
| 14 | B5 | 4 | 1.1 | 0.5 | 500 | 22.3 | 0.34 | 0.35 | 0.12 | 0.29 | 0.05 | 0.06 | 37 | 0.06 | 0.05 | 0.21 | 2 | 4.88 | |
| 15 | | | | | | | | | | | | | | | | | | | |
| 16 | B5 | 2.2 | 0.13 | 4 | 0 | 0 | 2.68 | 2.8 | 7.5 | 0.00 | 0.36 | 0.44 | 37 | .44 | 0.36 | 1.64 | 8 | 0.00 | Flpd opening |
| 17 | B5 | 2.2 | 0.5 | 4 | 170 | 16.7 | 2.68 | 2.8 | 7.5 | 17.82 | 0.36 | 0.44 | 37 | .44 | 0.36 | 1.64 | 8 | 19.00 | |
| 18 | B5 | 2.2 | 0.88 | 4 | 0 | 0 | 2.68 | 2.8 | 7.5 | 15.95 | 0.36 | 0.44 | 37 | .44 | 0.36 | 1.64 | 8 | 17.00 | |
| 19 | B5 | 2.2 | 1.1 | 4 | 800 | 35.8 | 2.68 | 2.8 | 7.5 | 18.64 | 0.36 | 0.44 | 37 | .44 | 0.36 | 1.64 | 8 | 19.88 | |

| Row No. | Sample Identity | Density (lb/ft³) | Sheet Thickness (in) | Scale | Force-to-Close (grams) | Pressure-to-Close (g/cm²) | rep. fingr-to-fingr. (in) | Rpt. s. wall-to-s. wall-Closed (in) | Cell Area-closed (in²) | Cell Area-open (in²) | Hinge distance (in) | Hinge Separation (in) | Hinge Angle (deg) | Arm Width (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 20 | B5 | 2.2 | 0.13 | 2 | 0 | 0 | 1.34 | 1.4 | 1.88 | 0.00 | 0.18 | 0.22 | 37 | 0.22 | 0.18 | 0.82 | 5.38 | 0.00 | Flpd opening |
| 21 | B5 | 2.2 | 0.5 | 2 | 90 | 8.9 | 1.34 | 1.4 | 1.88 | 4.54 | 0.18 | 0.22 | 37 | 0.22 | 0.18 | 0.82 | 5.38 | 13.00 | |
| 22 | B5 | 2.2 | 0.88 | 2 | 180 | 10.1 | 1.34 | 1.4 | 1.88 | 4.54 | 0.18 | 0.22 | 37 | 0.22 | 0.18 | 0.82 | 5.38 | 13.00 | |
| 23 | B5 | 2.2 | 1.1 | 2 | 310 | 13.9 | 1.34 | 1.4 | 1.88 | 4.62 | 0.18 | 0.22 | 37 | 0.22 | 0.18 | 0.82 | 5.38 | 13.25 | |
| 24 | | | | | | | | | | | | | | | | | | | |
| 25 | B5 | 2.2 | 0.13 | 1.5 | 0 | 0 | 1.01 | 1.05 | 1.06 | 0.00 | 0.14 | 0.17 | 37 | 0.17 | 0.14 | 0.62 | 6 | 0.00 | Flpd opening |
| 26 | B5 | 2.2 | 0.5 | 1.5 | 180 | 17.7 | 1.01 | 1.05 | 1.06 | 2.59 | 0.14 | 0.17 | 37 | 0.17 | 0.14 | 0.62 | 6 | 14.75 | |
| 27 | B5 | 2.2 | 0.88 | 1.5 | 220 | 12.3 | 1.01 | 1.05 | 1.06 | 2.57 | 0.14 | 0.17 | 37 | 0.17 | 0.14 | 0.62 | 6 | 14.63 | |
| 28 | B5 | 2.2 | 1.1 | 1.5 | 390 | 17.4 | 1.01 | 1.05 | 1.06 | 2.59 | 0.14 | 0.17 | 37 | 0.17 | 0.14 | 0.62 | 6 | 14.75 | |
| 29 | | | | | | | | | | | | | | | | | | | |
| 30 | B5 | 2.2 | 0.13 | 1 | 0 | 0 | 0.67 | 0.7 | 0.47 | 0.00 | 0.09 | 0.11 | 37 | 0.11 | 0.09 | 0.41 | 4 | 0.00 | Flpd opening |
| 31 | B5 | 2.2 | 0.5 | 1 | 190 | 18.7 | 0.67 | 0.7 | 0.47 | 1.16 | 0.09 | 0.11 | 37 | 0.11 | 0.09 | 0.41 | 4 | 9.88 | |
| 32 | B5 | 2.2 | 0.88 | 1 | 210 | 11.7 | 0.67 | 0.7 | 0.47 | 1.14 | 0.09 | 0.11 | 37 | 0.11 | 0.09 | 0.41 | 4 | 9.75 | |
| 33 | B5 | 2.2 | 1 | 1 | 200 | 9.8 | 0.67 | 0.7 | 0.47 | 1.11 | 0.09 | 0.11 | 37 | 0.11 | 0.09 | 0.41 | 4 | 8.00 | |
| 34 | B5 | 2.2 | 1.1 | 1 | 450 | 20.1 | 0.67 | 0.7 | 0.47 | 1.16 | 0.09 | 0.11 | 37 | 0.11 | 0.09 | 0.41 | 4 | 9.88 | 2pcs lamin |
| 35 | | | | | | | | | | | | | | | | | | | |

TABLE 17-continued

| Row No. | Sample Identity | Density (lb/ft³) | Sheet Thickness (in) | Scale | Force-to-Close (grams) | Pressure-to-Close (g/cm³) | Repeat Finger-to-Finger (in) | rep. st. wall-to-st. wall-closed (in) | Cell Area (closed) (in²) | Cell Area (open) (in²) | Hinge distance (in) | Hinge Separation (in) | Hinge Angle | Arm Width (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 36 | B5 | 2.2 | 0.13 | .75 | 0 | 0 | 0.50 | 0.53 | 0.26 | 0.00 | 0.07 | 0.08 | 37 | 0.08 | 0.07 | 0.31 | 3 | 0.00 | Flpd opening |
| 37 | B5 | 2.2 | 0.5 | .75 | 170 | 16.7 | 0.50 | 0.53 | 0.26 | 0.65 | 0.07 | 0.08 | 37 | 0.08 | 0.07 | 0.31 | 3 | 7.38 | |
| 38 | B5 | 2.2 | 0.88 | .75 | 190 | 10.6 | 0.50 | 0.53 | 0.26 | 0.64 | 0.07 | 0.08 | 37 | 0.08 | 0.07 | 0.31 | 3 | 7.25 | |
| 39 | B5 | 2.2 | 1.1 | .75 | 400 | 17.9 | 0.50 | 0.53 | 0.26 | 0.64 | 0.07 | 0.08 | 37 | 0.08 | 0.07 | 0.31 | 3 | 7.25 | |

| Row No. | Sample Identity | Density (lb/ft³) | Sheet Thickness (in) | Scale | Force-to-Close (grams) | Pressure-to-Close (g/cm³) | Repeat Finger-to-Finger (in) | rep. st. wall-to-st. wall-closed (in) | Cell Area (closed) (in²) | Cell Area (open) (in²) | Hinge distance (in) | Hinge Separation (in) | Hinge Angle | Arm Width (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 40 | B5 | 2.2 | 0.13 | 0.5 | 10 | 1.0 | 0.34 | 0.35 | 0.12 | 0.26 | 0.05 | 0.06 | 37 | 0.06 | 0.05 | 0.21 | 2 | 4.50 | Very lacy |
| 41 | B5 | 2.2 | 0.5 | 0.5 | 110 | 10.8 | 0.34 | 0.35 | 0.12 | 0.29 | 0.05 | 0.06 | 37 | 0.06 | 0.05 | 0.21 | 2 | 4.88 | |
| 42 | B5 | 2.2 | 0.88 | 0.5 | 240 | 13.4 | 0.34 | 0.35 | 0.12 | 0.25 | 0.05 | 0.06 | 37 | 0.06 | 0.05 | 0.21 | 2 | 4.25 | |
| 43 | B5 | 2.2 | 1.1 | 0.5 | 200 | 8.9 | 0.34 | 0.35 | 0.12 | 0.28 | 0.05 | 0.06 | 37 | 0.06 | 0.05 | 0.21 | 2 | 4.75 | |
| 44 | | | | | | | | | | | | | | | | | | | |
| 45 | B5 | 1.7 | 0.13 | 4 | 0 | 0 | 2.68 | 2.8 | 7.5 | 0.00 | 0.36 | 0.44 | 37 | .44 | 0.36 | 1.64 | 8 | 0.00 | |
| 46 | B5 | 1.7 | 0.25 | 4 | 0 | 0 | 2.68 | 2.8 | 7.5 | 0.00 | 0.36 | 0.44 | 37 | .44 | 0.36 | 1.64 | 8 | 0.00 | |
| 47 | B5 | 1.7 | 0.33 | 4 | 0 | 0 | 2.68 | 2.8 | 7.5 | 0.00 | 0.36 | 0.44 | 37 | .44 | 0.36 | 1.64 | 8 | 0.00 | |
| 48 | B5 | 1.7 | 0.5 | 4 | 140 | 13.8 | 2.68 | 2.8 | 7.5 | 17.8 | 0.36 | 0.44 | 37 | .44 | 0.36 | 1.64 | 8 | 19.00 | Unstable in Z |
| 49 | B5 | 1.7 | 0.75 | 4 | 90 | 5.9 | 2.68 | 2.8 | 7.5 | 17.4 | 0.36 | 0.44 | 37 | .44 | 0.36 | 1.64 | 8 | 18.50 | Pat over edge |
| 50 | | | | | | | | | | | | | | | | | | | |
| 51 | B5 | 1.7 | 0.13 | 2 | 0 | 0 | 1.34 | 1.4 | 1.88 | 0.00 | 0.18 | 0.22 | 37 | 0.22 | 0.18 | 0.82 | 5.38 | 0.00 | |
| 52 | B5 | 1.7 | 0.25 | 2 | 10 | 2.0 | 1.34 | 1.4 | 1.88 | 4.54 | 0.18 | 0.22 | 37 | 0.22 | 0.18 | 0.82 | 5.38 | 13.00 | Hold stop flip |
| 53 | B5 | 1.7 | 0.33 | 2 | 50 | 7.5 | 1.34 | 1.4 | 1.88 | 4.71 | 0.18 | 0.22 | 37 | 0.22 | 0.18 | 0.82 | 5.38 | 13.50 | |
| 54 | B5 | 1.7 | 0.5 | 2 | 70 | 6.9 | 1.34 | 1.4 | 1.88 | 4.54 | 0.18 | 0.22 | 37 | 0.22 | 0.18 | 0.82 | 5.38 | 13.00 | |
| 55 | B5 | 1.7 | 0.75 | 2 | 120 | 7.9 | 1.34 | 1.4 | 1.88 | 4.49 | 0.18 | 0.22 | 37 | 0.22 | 0.18 | 0.82 | 5.38 | 12.88 | |
| 56 | | | | | | | | | | | | | | | | | | | |
| 57 | B5 | 1.7 | 0.13 | 1.5 | 0 | 0 | 1.01 | 1.05 | 1.06 | 0.00 | 0.14 | 0.17 | 37 | 0.17 | 0.14 | 0.62 | 6 | 0.00 | |
| 58 | B5 | 1.7 | 0.25 | 1.5 | 25 | 4.9 | 1.01 | 1.05 | 1.06 | 2.53 | 0.14 | 0.17 | 37 | 0.17 | 0.14 | 0.62 | 6 | 14.38 | Some flipping |
| 59 | B5 | 1.7 | 0.33 | 1.5 | 60 | 9.72 | 1.01 | 1.05 | 1.06 | 2.55 | 0.14 | 0.17 | 37 | 0.17 | 0.14 | 0.62 | 6 | 14.50 | |
| 60 | B5 | 1.7 | 0.5 | 1.5 | 110 | 10.8 | 1.01 | 1.05 | 1.06 | 2.55 | 0.14 | 0.17 | 37 | 0.17 | 0.14 | 0.62 | 6 | 14.50 | |
| 61 | B5 | 1.7 | 0.75 | 1.5 | 140 | 9.2 | 1.01 | 1.05 | 1.06 | 2.55 | 0.14 | 0.17 | 37 | 0.17 | 0.14 | 0.62 | 6 | 14.50 | |

| Row No. | Sample Identity | Density (lb/ft³) | Sheet Thickness (in) | Scale | Force-to-Close (grams) | Pressure-to-Close (g/cm³) | Repeat Finger-to-Finger (in) | Rep st. wall-to-stab. wall closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 62 | B5 | 1.7 | 0.13 | 1 | 0 | 0 | 0.67 | 0.7 | 0.47 | 0.00 | 0.09 | 0.11 | 37 | 0.11 | 0.09 | 0.41 | 4 | 0.00 | Flaccid |
| 63 | B5 | 1.7 | 0.25 | 1 | 50 | 9.8 | 0.67 | 0.7 | 0.47 | 1.13 | 0.09 | 0.11 | 37 | 0.11 | 0.09 | 0.41 | 4 | 9.63 | |
| 64 | B5 | 1.7 | 0.33 | 1 | 120 | 17.9 | 0.67 | 0.7 | 0.47 | 1.13 | 0.09 | 0.11 | 37 | 0.11 | 0.09 | 0.41 | 4 | 9.63 | |
| 65 | B5 | 1.7 | 0.5 | 1 | 120 | 11.8 | 0.67 | 0.7 | 0.47 | 1.14 | 0.09 | 0.11 | 37 | 0.11 | 0.09 | 0.41 | 4 | 9.75 | |
| 66 | B5 | 1.7 | 0.75 | 1 | 150 | 9.8 | 0.67 | 0.7 | 0.47 | 1.13 | 0.09 | 0.11 | 37 | 0.11 | 0.09 | 0.41 | 4 | 9.63 | |
| 67 | | | | | | | | | | | | | | | | | | | |
| 68 | B5 | 1.7 | 0.13 | .75 | 5 | 1.8 | 0.50 | 0.53 | 0.26 | 0.62 | 0.07 | 0.08 | 37 | 0.08 | 0.07 | 0.31 | 3 | 7.00 | |
| 69 | B5 | 1.7 | 0.25 | .75 | 40 | 7.9 | 0.50 | 0.53 | 0.26 | 0.64 | 0.07 | 0.08 | 37 | 0.08 | 0.07 | 0.31 | 3 | 7.25 | Some flipping |
| 70 | B5 | 1.7 | 0.33 | .75 | 60 | 8.9 | 0.50 | 0.53 | 0.26 | 0.64 | 0.07 | 0.08 | 37 | 0.08 | 0.07 | 0.31 | 3 | 7.25 | |
| 71 | B5 | 1.7 | 0.5 | .75 | 70 | 6.9 | 0.50 | 0.53 | 0.26 | 0.63 | 0.07 | 0.08 | 37 | 0.08 | 0.07 | 0.31 | 3 | 7.13 | |
| 72 | B5 | 1.7 | 0.75 | .75 | 110 | 7.2 | 0.50 | 0.53 | 0.26 | 0.64 | 0.07 | 0.08 | 37 | 0.08 | 0.07 | 0.31 | 3 | 7.25 | |
| 73 | | | | | | | | | | | | | | | | | | | |

TABLE 17-continued

| Row No. | Sample Identity | Density (lb/ft³) | Sheet Thickness (in) | Scale | Force-to-Close (gms) | Pressure-to-Close (g/cm²) | Repeat Finger-to-Finger (in) | Rep. s. wall-to-st. wall-closed (in) | cell area-closed (in²) | Cell Area-open (in²) | Hinge distance (in) | Hinge Separation (in) | Hinge Angle (deg) | Arm thickness (in) | stab. wall thick. (in) | Neck Height (in) | Start Length (in) | Expanded Length (in) | Comment |
|---|---|---|---|---|---|---|---|---|---|---|---|---|---|---|---|---|---|---|---|
| 74 | B5 | 1.7 | 0.13 | .5 | 10 | 3.8 | 0.34 | 0.35 | 0.12 | 0.26 | 0.05 | 0.06 | 37 | 0.06 | 0.05 | 0.21 | 2 | 4.50 | Some flipping |
| 75 | B5 | 1.7 | 0.25 | .5 | 20 | 3.9 | 0.34 | 0.35 | 0.12 | 0.26 | 0.05 | 0.06 | 37 | 0.06 | 0.05 | 0.21 | 2 | 4.50 | |
| 76 | B5 | 1.7 | 0.33 | .5 | 30 | 3.0 | 0.34 | 0.35 | 0.12 | 0.26 | 0.05 | 0.06 | 37 | 0.06 | 0.05 | 0.21 | 2 | 4.50 | |
| 77 | B5 | 1.7 | 0.5 | .5 | 0 | 0 | 0.34 | 0.35 | 0.12 | 0.00 | 0.05 | 0.06 | 37 | 0.06 | 0.05 | 0.21 | 2 | 0.00 | Tore opening |
| 78 | B5 | 1.7 | 0.75 | .5 | 110 | 7.2 | 0.34 | 0.35 | 0.12 | 0.23 | 0.05 | 0.06 | 37 | 0.06 | 0.05 | 0.21 | 2 | 3.88 | Some cut thru |
| 79 | | | | | | | | | | | | | | | | | | | |
| 80 | B5 | 1.2 | 0.5 | 4 | 60 | 5.9 | 2.68 | 2.8 | 7.5 | 15.95 | 0.36 | 0.44 | 37 | .44 | 0.36 | 1.64 | 8 | 17.00 | Tore opening |
| 81 | B5 | 1.2 | .75 | 4 | 40 | 2.6 | 2.68 | 2.8 | 7.5 | 16.18 | 0.36 | 0.44 | 37 | .44 | 0.36 | 1.64 | 8 | 17.25 | |

| Row No. | Sample Identity | Density (lb/ft³) | Sheet Thickness (in) | Scale | Force-to-Close (gms) | Pressure-to-Close (g/cm²) | Repeat Finger-to-Finger (in) | Rep. s. wall-to-st. wall-closed (in) | Cell Area-closed (in²) | Cell Area-open (in²) | Hinge distance (in) | Hinge Separation (in) | Hinge Angle (deg) | Arm thickness (in) | stab. wall thick. (in) | Neck Height (in) | Start Length (in) | Expanded Length (in) | Comment |
|---|---|---|---|---|---|---|---|---|---|---|---|---|---|---|---|---|---|---|---|
| 82 | B5 | 1.2 | 0.5 | 2 | 40 | 3.9 | 1.34 | 1.4 | 1.88 | 4.45 | 0.18 | 0.22 | 37 | 0.22 | 0.18 | 0.82 | 5.38 | 12.75 | |
| 83 | B5 | 1.2 | .75 | 2 | 100 | 6.56 | 1.34 | 1.4 | 1.88 | 4.54 | 0.18 | 0.22 | 37 | 0.22 | 0.18 | 0.82 | 5.38 | 13.00 | |
| 84 | | | | | | | | | | | | | | | | | | | |
| 85 | B5 | 1.2 | 0.5 | 1.5 | 70 | 6.9 | 1.01 | 1.05 | 1.06 | 2.55 | 0.14 | 0.17 | 37 | 0.17 | 0.14 | 0.62 | 6 | 14.50 | |
| 86 | B5 | 1.2 | .75 | 1.5 | 140 | 9.2 | 1.01 | 1.05 | 1.06 | 2.55 | 0.14 | 0.17 | 37 | 0.17 | 0.14 | 0.62 | 6 | 14.50 | |
| 87 | | | | | | | | | | | | | | | | | | | |
| 88 | B5 | 1.2 | 0.5 | 1 | 60 | 5.9 | 0.67 | 0.7 | 0.47 | 1.13 | 0.09 | 0.11 | 37 | 0.11 | 0.09 | 0.41 | 4 | 9.63 | |
| 89 | B5 | 1.2 | .75 | 1 | 140 | 9.2 | 0.67 | 0.7 | 0.47 | 1.13 | 0.09 | 0.11 | 37 | 0.11 | 0.09 | 0.41 | 4 | 9.63 | |
| 90 | | | | | | | | | | | | | | | | | | | |
| 91 | B5 | 1.2 | 0.5 | .75 | 40 | 3.9 | 0.50 | 0.53 | 0.26 | 0.63 | 0.07 | 0.08 | 37 | 0.08 | 0.07 | 0.31 | 3 | 7.13 | |
| 92 | B5 | 1.2 | .75 | .75 | 90 | 5.9 | 0.50 | 0.53 | 0.26 | 0.64 | 0.07 | 0.08 | 37 | 0.08 | 0.07 | 0.31 | 3 | 7.25 | |
| 93 | | | | | | | | | | | | | | | | | | | |
| 94 | B5 | 1.2 | 0.5 | 0.5 | 20 | 2.0 | 0.34 | 0.35 | 0.12 | 0.21 | 0.05 | 0.06 | 37 | 0.06 | 0.05 | 0.21 | 2 | 3.63 | Flaky cut, tore |
| 95 | B5 | 1.2 | .75 | 0.5 | 90 | 5.9 | 0.50 | 0.53 | 0.26 | 0.23 | 0.07 | 0.08 | 37 | 0.08 | 0.07 | 0.31 | 3 | 4.00 | Cut thru some |
| 96 | | | | | | | | | | | | | | | | | | | |
| 97 | B1 | 6 | 0.28 | 4 | 0 | 0 | 2.68 | 2.8 | 7.50 | 0.00 | 0.32 | 0.6 | 44 | 0.6 | 0.4 | 2.68 | 8 | 0.00 | |
| 98 | B1 | 6 | 0.28 | 2 | 300 | 53.7 | 1.34 | 1.4 | 1.88 | 4.32 | 0.16 | 0.3 | 44 | 0.3 | 0.2 | 1.34 | 5.38 | 12.38 | |
| 99 | B1 | 6 | 0.28 | 1.5 | 200 | 35.1 | 1.01 | 1.05 | 1.06 | 2.44 | 0.12 | .23 | 44 | .23 | 0.15 | 1.01 | 6 | 13.88 | |
| 100 | B1 | 6 | 0.28 | 1 | 140 | 24.6 | 0.67 | 0.7 | 0.47 | 0.00 | .08 | .15 | 44 | .15 | 0.1 | 0.67 | 4 | 0.00 | |
| 101 | B1 | 6 | 0.28 | .75 | 300 | 52.7 | 0.50 | 0.53 | 0.26 | 0.58 | .06 | .11 | 44 | .11 | 0.08 | 0.50 | 3 | 6.63 | |
| 102 | B1 | 6 | 0.28 | 0.5 | 550 | 96.7 | 0.34 | 0.35 | 0.12 | 0.26 | .04 | .08 | 44 | .08 | 0.05 | 0.34 | 2 | 4.38 | |

| Row No. | Sample Identity | Density (lb/ft³) | Sheet Thickness (in) | Scale | Force-to-Close (gms) | Pressure-to-Close (g/cm²) | Repeat Finger-to-Finger (in) | Rpt. S. Wall-to-S. Wall-closed (in) | Cell Area-closed (in²) | Cell Area-open (in²) | Hinge distance (in) | Hinge Separation (in) | Hinge Angle (deg) | Arm Thickness (in) | Stab. wall Thickness (in) | Neck Height (in) | Start Length (in) | Expanded Length (in) | Comment |
|---|---|---|---|---|---|---|---|---|---|---|---|---|---|---|---|---|---|---|---|
| 103 | B1 | 4 | 1.1 | 4 | 0 | 0 | 2.68 | 2.8 | 7.50 | 0.00 | .32 | 0.6 | 44 | 0.6 | 0.4 | 2.68 | 8 | 0.00 | Pattern over edge |
| 104 | B1 | 4 | 1.1 | 2 | 600 | 26.8 | 1.34 | 1.4 | 1.88 | 4.28 | .16 | 0.3 | 44 | 0.3 | 0.2 | 1.34 | 5.4 | 12.2 | Tore opening |
| 105 | B1 | 4 | 1.1 | 1.5 | 900 | 40.3 | 1.01 | 1.05 | 1.06 | 2.37 | .12 | .23 | 44 | .23 | 0.15 | 1.01 | 6 | 13.50 | |
| 106 | B1 | 4 | 1.1 | 1 | 950 | 42.5 | 0.67 | 0.7 | 0.47 | 1.06 | .08 | .15 | 44 | .15 | 0.1 | 0.67 | 4 | 9.00 | Diff. to open |
| 107 | B1 | 4 | 1.1 | 1 | 0 | 0 | 0.67 | 0.7 | 0.47 | 0.00 | .08 | .15 | 44 | .15 | 0.1 | 0.67 | 4 | 0.00 | Tore opening |
| 108 | B1 | 4 | 1.1 | .75 | 1050 | 47.0 | 0.50 | 0.53 | 0.26 | 0.59 | .06 | .11 | 44 | .11 | 0.08 | 0.50 | 3 | 6.75 | |
| 109 | B1 | 4 | 1.1 | 0.5 | 750 | 33.6 | 0.34 | 0.35 | 0.12 | 0.25 | .04 | .08 | 44 | .08 | 0.05 | 0.34 | 2 | 4.25 | |
| 110 | | | | | | | | | | | | | | | | | | | |

TABLE 17-continued

| Row No. | Sample Identity | Density (lb/ft³) | Sheet Thickness (in) | Scale | Force-to-Close (grams) | Pressure-to-Close (g/cm²) | Repeat Finger-to-Finger (in) | Repeat Stationary Wall-to-Stationary | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 111 | B1 | 2.2 | 0.13 | 4 | 0 | 0 | 2.68 | 2.8 | 7.50 | 0.00 | .32 | 0.6 | 44 | 0.6 | 0.4 | 2.68 | 8 | 0.00 | Flips opening |
| 112 | B1 | 2.2 | 0.5 | 4 | 160 | 15.7 | 2.68 | 2.8 | 7.50 | 15.71 | .32 | 0.6 | 44 | 0.6 | 0.4 | 2.68 | 8 | 16.8 | Dbl; hld to expd. |
| 113 | B1 | 2.2 | 0.88 | 4 | 550 | 30.7 | 2.68 | 2.8 | 7.50 | 16.18 | .32 | 0.6 | 44 | 0.6 | 0.4 | 2.68 | 8 | 17.2 | |
| 114 | B1 | 2.2 | 1.1 | 4 | 680 | 30.4 | 2.68 | 2.8 | 7.50 | 16.42 | .32 | 0.6 | 44 | 0.6 | 0.4 | 2.68 | 8 | 17.5 | |
| 115 | | | | | | | | | | | | | | | | | | | |
| 116 | B1 | 2.2 | 0.13 | 2 | 0 | 0 | 1.34 | 1.4 | 1.88 | 0.00 | .16 | 0.3 | 44 | 0.3 | 0.2 | 1.34 | 5.38 | 0.00 | Flips opening |
| 117 | B1 | 2.2 | 0.5 | 2 | 80 | 7.9 | 1.34 | 1.4 | 1.88 | 4.01 | .16 | 0.3 | 44 | 0.3 | 0.2 | 1.34 | 5.38 | 11.5 | |
| 118 | B1 | 2.2 | 0.88 | 2 | 390 | 21.8 | 1.34 | 1.4 | 1.88 | 4.06 | .16 | 0.3 | 44 | 0.3 | 0.2 | 1.34 | 5.38 | 11.6 | |
| 119 | B1 | 2.2 | 1.1 | 2 | 460 | 20.6 | 1.34 | 1.4 | 1.88 | 4.14 | .16 | 0.3 | 44 | 0.3 | 0.2 | 1.34 | 5.38 | 11.9 | |
| 120 | | | | | | | | | | | | | | | | | | | |
| 121 | B1 | 2.2 | 0.13 | 1.5 | 0 | 0 | 1.01 | 1.05 | 1.06 | 0.00 | .12 | .23 | 44 | 0.23 | 0.15 | 1.01 | 6 | 0.00 | Flips opening |
| 122 | B1 | 2.2 | 0.5 | 1.5 | 170 | 16.7 | 1.01 | 1.05 | 1.06 | 2.33 | .12 | .23 | 44 | 0.23 | 0.15 | 1.01 | 6 | 13.2 | |
| 123 | B1 | 2.2 | 0.88 | 1.5 | 450 | 25.1 | 1.01 | 1.05 | 1.06 | 2.33 | .12 | .23 | 44 | 0.23 | 0.15 | 1.01 | 6 | 13.2 | |
| 124 | B1 | 2.2 | 1.1 | 1.5 | 550 | 24.6 | 1.01 | 1.05 | 1.06 | 2.29 | .12 | .23 | 44 | 0.23 | 0.15 | 1.01 | 6 | 13.0 | |

| Row No. | Sample Identity | Density (lb/ft³) | Sheet Thickness (in) | Scale | Force-to-Close (grams) | Pressure-to-Close (g/cm²) | Repeat Finger-to-Finger (in) | Repeat Stationary Wall-to-Stationary | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 125 | B1 | 2.2 | 0.13 | 1 | 0 | 0 | 0.67 | 0.7 | 0.47 | 0.00 | 0.08 | 0.15 | 44 | 0.15 | 0.1 | 0.67 | 4 | 0.00 | Flips opening |
| 126 | B1 | 2.2 | 0.5 | 1 | 210 | 20.7 | 0.67 | 0.7 | 0.47 | 1.04 | 0.08 | 0.15 | 44 | 0.15 | 0.1 | 0.67 | 4 | 8.88 | |
| 127 | B1 | 2.2 | 0.88 | 1 | 490 | 27.4 | 0.67 | 0.7 | 0.47 | 1.03 | 0.08 | 0.15 | 44 | 0.15 | 0.1 | 0.67 | 4 | 8.75 | 2-pc laminate |
| 128 | B1 | 2.2 | 1 | 1 | 300 | 14.8 | 0.67 | 0.7 | 0.47 | 1.00 | 0.08 | 0.15 | 44 | 0.15 | 0.1 | 0.67 | 4 | 8.50 | |
| 129 | B1 | 2.2 | 1.1 | 1 | 360 | 16.1 | 0.67 | 0.7 | 0.47 | 1.03 | 0.08 | 0.15 | 44 | 0.15 | 0.1 | 0.67 | 4 | 8.75 | |
| 130 | | | | | | | | | | | | | | | | | | | |
| 131 | B1 | 2.2 | 0.13 | .75 | 0 | 0 | 0.50 | 0.53 | 0.26 | 0.00 | 0.06 | 0.11 | 44 | 0.11 | 0.08 | 0.50 | 3 | 0.00 | Flips opening |
| 132 | B1 | 2.2 | 0.5 | .75 | 220 | 21.7 | 0.50 | 0.53 | 0.26 | 0.56 | 0.06 | 0.11 | 44 | 0.11 | 0.08 | 0.50 | 3 | 6.38 | |
| 133 | B1 | 2.2 | 0.88 | .75 | 380 | 21.2 | 0.50 | 0.53 | 0.26 | 0.56 | 0.06 | 0.11 | 44 | 0.11 | 0.08 | 0.50 | 3 | 6.38 | |
| 134 | B1 | 2.2 | 1.1 | .75 | 500 | 22.4 | 0.50 | 0.53 | 0.26 | 0.55 | 0.06 | 0.11 | 44 | 0.11 | 0.08 | 0.50 | 3 | 6.25 | |
| 135 | | | | | | | | | | | | | | | | | | | |
| 136 | B1 | 2.2 | 0.13 | 0.5 | 0 | 0 | 0.34 | 0.35 | 0.12 | 0.21 | 0.04 | 0.08 | 44 | 0.08 | 0.05 | 0.34 | 2 | 3.50 | Flips opening |
| 137 | B1 | 2.2 | 0.5 | 0.5 | 130 | 12.8 | 0.34 | 0.35 | 0.12 | 0.24 | 0.04 | 0.08 | 44 | 0.08 | 0.05 | 0.34 | 2 | 4.13 | |
| 138 | B1 | 2.2 | 0.88 | 0.5 | 280 | 15.6 | 0.34 | 0.35 | 0.12 | 0.23 | 0.04 | 0.08 | 44 | 0.08 | 0.05 | 0.34 | 2 | 4.00 | |
| 139 | B1 | 2.2 | 1.1 | 0.5 | 380 | 17.0 | 0.34 | 0.35 | 0.12 | 0.23 | 0.04 | 0.08 | 44 | 0.08 | 0.05 | 0.34 | 2 | 4.00 | |
| 140 | | | | | | | | | | | | | | | | | | | |
| 141 | B1 | 1.7 | 0.13 | 4 | 0 | 0 | 2.68 | 2.8 | 7.50 | 0.00 | 0.32 | 0.6 | 44 | 0.6 | 0.4 | 2.68 | 8 | 0.00 | Flips & closes |
| 142 | B1 | 1.7 | 0.25 | 4 | 0 | 0 | 2.68 | 2.8 | 7.50 | 0.00 | 0.32 | 0.6 | 44 | 0.6 | 0.4 | 2.68 | 8 | 0.00 | |
| 143 | B1 | 1.7 | 0.33 | 4 | 30 | 4.5 | 2.68 | 2.8 | 7.50 | 4.23 | 0.32 | 0.6 | 44 | 0.6 | 0.4 | 2.68 | 8 | 0.00 | |
| 144 | B1 | 1.7 | 0.5 | 4 | 140 | 13.8 | 2.68 | 2.8 | 7.50 | 4.01 | 0.32 | 0.6 | 44 | 0.6 | 0.4 | 2.68 | 8 | 16.50 | |
| 145 | B1 | 1.7 | 0.75 | 4 | 90 | 6.7 | 2.68 | 2.8 | 7.50 | 15.48 | 0.32 | 0.6 | 44 | 0.6 | 0.4 | 2.68 | 8 | 0.00 | Prtm over edge |

| Row No. | Sample Identity | Density (lb/ft³) | Sheet Thickness (in) | Scale | Force-to-Close (grams) | Pressure-to-Close (g/cm²) | Repeat Finger-to-Finger (in) | Rep. st. wall-to-st. wall-closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 146 | B1 | 1.7 | 0.13 | 2 | 0 | 0 | 1.34 | 1.4 | 1.88 | 0.00 | 0.16 | 0.3 | 44 | 0.3 | 0.2 | 1.34 | 5.38 | 0.00 | Flips and closes |
| 147 | B1 | 1.7 | 0.25 | 2 | 0 | 0 | 1.34 | 1.4 | 1.88 | 0.00 | 0.16 | 0.3 | 44 | 0.3 | 0.2 | 1.34 | 5.38 | 0.00 | |
| 148 | B1 | 1.7 | 0.33 | 2 | 100 | 14.9 | 1.34 | 1.4 | 1.88 | 4.23 | 0.16 | 0.3 | 44 | 0.3 | 0.2 | 1.34 | 5.38 | 12.1 | |
| 149 | B1 | 1.7 | 0.5 | 2 | 40 | 3.9 | 1.34 | 1.4 | 1.88 | 4.01 | 0.16 | 0.3 | 44 | 0.3 | 0.2 | 1.34 | 5.38 | 11.5 | |
| 150 | B1 | 1.7 | 0.75 | 2 | 190 | 12.5 | 1.34 | 1.4 | 1.88 | 4.01 | 0.16 | 0.3 | 44 | 0.3 | 0.2 | 1.34 | 5.38 | 11.5 | |
| 151 | | | | | | | | | | | | | | | | | | | |

TABLE 17-continued

| Row No. | Sample Identity | Density (lb/ft³) | Sheet Thickness (in) | Scale | Force-to-Close (grams) | Pressure-to-Close (g/cm²) | Repeat Fngr-to-Fngr (in) | Rep. s. wall-to-s. wall-closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 152 | B1 | 1.7 | 0.13 | 1.5 | 0 | 0 | 1.01 | 1.05 | 1.06 | 0.00 | 0.12 | 0.23 | 44 | 0.23 | 0.15 | 1.01 | 6 | 0.00 | Flips and closes |
| 153 | B1 | 1.7 | 0.25 | 1.5 | 0 | 0 | 1.01 | 1.05 | 1.06 | 0.00 | 0.12 | 0.23 | 44 | 0.23 | 0.15 | 1.01 | 6 | 0.00 | |
| 154 | B1 | 1.7 | 0.33 | 1.5 | 50 | 7.45 | 1.01 | 1.05 | 1.06 | 2.33 | 0.12 | 0.23 | 44 | 0.23 | 0.15 | 1.01 | 6 | 13.2 | |
| 155 | B1 | 1.7 | 0.5 | 1.5 | 110 | 10.8 | 1.01 | 1.05 | 1.06 | 2.26 | 0.12 | 0.23 | 44 | 0.23 | 0.15 | 1.01 | 6 | 12.9 | |
| 156 | B1 | 1.7 | 0.75 | 1.5 | 180 | 11.8 | 1.01 | 1.05 | 1.06 | 2.24 | 0.12 | 0.23 | 44 | 0.23 | 0.15 | 1.01 | 6 | 12.8 | |
| 157 | | | | | | | | | | | | | | | | | | | |
| 158 | B1 | 1.7 | 0.13 | 1 | 0 | 0 | 0.67 | 0.7 | 0.47 | 0.00 | 0.08 | 0.15 | 44 | 0.15 | 0.1 | 0.67 | 4 | 0.0 | |
| 159 | B1 | 1.7 | 0.25 | 1 | 10 | 2.0 | 0.67 | 0.7 | 0.47 | 0.98 | 0.08 | 0.15 | 44 | 0.15 | 0.1 | 0.67 | 4 | 8.38 | |
| 160 | B1 | 1.7 | 0.33 | 1 | 50 | 7.5 | 0.67 | 0.7 | 0.47 | 1.00 | 0.08 | 0.15 | 44 | 0.15 | 0.1 | 0.67 | 4 | 8.50 | |
| 161 | B1 | 1.7 | 0.5 | 1 | 130 | 12.8 | 0.67 | 0.7 | 0.47 | 1.03 | 0.08 | 0.15 | 44 | 0.15 | 0.1 | 0.67 | 4 | 8.75 | |
| 162 | B1 | 1.7 | 0.75 | 1 | 140 | 9.2 | 0.67 | 0.7 | 0.47 | 1.00 | 0.08 | 0.15 | 44 | 0.15 | 0.1 | 0.67 | 4 | 8.50 | |

| Row No. | Sample Identity | Density (lb/ft³) | Sheet Thickness (in) | Scale | Force-to-Close (grams) | Pressure-to-Close (g/cm²) | Repeat Fngr-to-Fngr (in) | Rep. s. wall-to-s. wall-closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 163 | B1 | 1.7 | 0.13 | .75 | 0 | 0 | 0.50 | 0.53 | 0.26 | 0.00 | 0.06 | 0.11 | 44 | 0.11 | 0.08 | 0.50 | 3 | 0.00 | |
| 164 | B1 | 1.7 | 0.25 | .75 | 50 | 9.8 | 0.50 | 0.53 | 0.26 | 0.54 | 0.06 | 0.11 | 44 | 0.11 | 0.08 | 0.50 | 3 | 6.13 | |
| 165 | B1 | 1.7 | 0.33 | .75 | 80 | 11.9 | 0.50 | 0.53 | 0.26 | 0.55 | 0.06 | 0.11 | 44 | 0.11 | 0.08 | 0.50 | 3 | 6.25 | |
| 166 | B1 | 1.7 | 0.5 | .75 | 120 | 11.8 | 0.50 | 0.53 | 0.26 | 0.56 | 0.06 | 0.11 | 44 | 0.11 | 0.08 | 0.50 | 3 | 6.38 | |
| 167 | B1 | 1.7 | 0.75 | .75 | 140 | 9.2 | 0.50 | 0.53 | 0.26 | 0.54 | 0.06 | 0.11 | 44 | 0.11 | 0.08 | 0.50 | 3 | 6.13 | |
| 168 | | | | | | | | | | | | | | | | | | | |
| 169 | B1 | 1.7 | 0.13 | .5 | 5 | 1.8 | 0.34 | 0.35 | 0.12 | 0.23 | 0.04 | 0.08 | 44 | 0.08 | 0.05 | 0.34 | 2 | 3.88 | |
| 170 | B1 | 1.7 | 0.25 | .5 | 25 | 4.9 | 0.34 | 0.35 | 0.12 | 0.23 | 0.04 | 0.08 | 44 | 0.08 | 0.05 | 0.34 | 2 | 4.00 | |
| 171 | B1 | 1.7 | 0.33 | .5 | 40 | 6.0 | 0.34 | 0.35 | 0.12 | 0.23 | 0.04 | 0.08 | 44 | 0.08 | 0.05 | 0.34 | 2 | 4.00 | |
| 172 | B1 | 1.7 | 0.5 | .5 | 70 | 6.9 | 0.34 | 0.35 | 0.12 | 0.22 | 0.04 | 0.08 | 44 | 0.08 | 0.05 | 0.34 | 2 | 3.75 | |
| 173 | B1 | 1.7 | 0.75 | .5 | 80 | 5.2 | 0.34 | 0.35 | 0.12 | 0.23 | 0.04 | 0.08 | 44 | 0.08 | 0.05 | 0.34 | 2 | 3.88 | |
| 174 | | | | | | | | | | | | | | | | | | | |
| 175 | B1 | 1.2 | 0.5 | 4 | 70 | 6.9 | 2.68 | 2.8 | 7.50 | 15.48 | 0.32 | 0.6 | 44 | 0.6 | 0.4 | 2.68 | 8 | 16.50 | Dbl; hld to expd. |
| 176 | B1 | 1.2 | .75 | 4 | 0 | 0 | 2.68 | 2.8 | 7.50 | 0.00 | 0.32 | 0.6 | 44 | 0.6 | 0.4 | 2.68 | 8 | | Ptrn. Over edge |
| 177 | | | | | | | | | | | | | | | | | | | |
| 178 | B1 | 1.2 | 0.5 | 2 | 85 | 8.4 | 1.34 | 1.4 | 1.88 | 4.06 | 0.16 | 0.3 | 44 | 0.3 | 0.2 | 1.34 | 5.38 | 11.63 | |
| 179 | B1 | 1.2 | .75 | 2 | 170 | 11.1 | 1.34 | 1.4 | 1.88 | 3.93 | 0.16 | 0.3 | 44 | 0.3 | 0.2 | 1.34 | 5.38 | 11.25 | |
| 180 | | | | | | | | | | | | | | | | | | | |
| 181 | B1 | 1.2 | 0.5 | 1.5 | 80 | 7.9 | 1.01 | 1.05 | 1.06 | 2.24 | 0.12 | 0.23 | 44 | 0.23 | 0.15 | 1.01 | 6 | 12.75 | |
| 182 | B1 | 1.2 | .75 | 1.5 | 170 | 11.1 | 1.01 | 1.05 | 1.06 | 2.18 | 0.12 | 0.23 | 44 | 0.23 | 0.15 | 1.01 | 6 | 12.38 | |

| Row No. | Sample Identity | Density (lb/ft³) | Sheet Thickness (in) | Scale | Force-to-Close (grams) | Pressure-to-Close (g/cm²) | Repeat Fngr-to-Fngr (in) | Repeat Stationary Wall-to-Stationary Wall (closed) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 183 | B1 | 1.2 | 0.5 | 1 | 70 | 6.9 | 0.67 | 0.7 | 0.47 | 1.03 | 0.08 | 0.15 | 44 | 0.15 | 0.1 | 0.67 | 4 | 8.75 | |
| 184 | B1 | 1.2 | .75 | 1 | 150 | 9.8 | 0.67 | 0.7 | 0.47 | 0.98 | 0.08 | 0.15 | 44 | 0.15 | 0.1 | 0.67 | 4 | 8.38 | |
| 185 | | | | | | | | | | | | | | | | | | | |
| 186 | B1 | 1.2 | 0.5 | .75 | 60 | 5.9 | 0.50 | 0.53 | 0.26 | 0.54 | 0.06 | 0.11 | 44 | 0.11 | 0.08 | 0.50 | 3 | 6.13 | |
| 187 | B1 | 1.2 | .75 | .75 | 140 | 9.2 | 0.50 | 0.53 | 0.26 | 0.53 | 0.06 | 0.11 | 44 | 0.11 | 0.08 | 0.50 | 3 | 6.00 | |
| 188 | | | | | | | | | | | | | | | | | | | |

TABLE 17-continued

| Row No. | Sample Identity | Density (lb/ft³) | Sheet Thickness (in) | Scale | Force-to-Close (grams) | Pressure-to-Close (g/cm²) | Repeat Finger-to-Finger (in) | Repeat Stationary Wall-to-Stationary Wall (closed) | Cell Area (closed) (in²) | Cell Area (open) (in²) | Hinge distance (in) | Hinge Separation (in) | Hinge Angle (deg) | Arm thickness (in) | Stab.n Wall Thickness (in) | Neck Height (in) | Start Length (in) | Expanded Length (in) | Comment |
|---|---|---|---|---|---|---|---|---|---|---|---|---|---|---|---|---|---|---|---|
| 189 | B1 | 1.2 | 0.5 | 0.5 | 30 | 3.0 | 0.34 | 0.35 | 0.12 | 0.23 | 0.04 | 0.08 | 44 | 0.08 | 0.05 | 0.34 | 2 | 3.88 | |
| 190 | B1 | 1.2 | .75 | 0.5 | 60 | 3.9 | 0.34 | 0.35 | 0.12 | 0.21 | 0.04 | 0.08 | 44 | 0.08 | 0.05 | 0.34 | 2 | 3.63 | |
| 191 | | | | | | | | | | | | | | | | | | | |
| 192 | Cmp#1 | 6 | 0.25 | .81 | 180 | 35.4 | 0.34 | 0.35 | 0.12 | 0.26 | 0.06 | 0.07 | 11.5 | 0.16 | 0.01 | 0.18 | 0.16 | 0.36 | |
| 193 | Cmp#1 | 1.2 | 0.25 | .81 | 0 | 0 | 4.33 | 2.16 | 9.35 | 0.00 | 0.38 | 0.47 | 11.5 | 1.01 | 0.73 | 1.18 | 13.0 | 0.00 | |
| 194 | Cmp#1 | 1.2 | 1 | .81 | 1 | 0.1 | 4.33 | 2.16 | 9.35 | 16.9 | 0.38 | 0.47 | 11.5 | 1.01 | 0.73 | 1.18 | 13.0 | 23.5 | |
| 195 | Cmp#1 | 1.2 | 0.5 | 6.5 | 10 | 0.5 | 4.33 | 2.16 | 9.35 | 18.2 | 0.38 | 0.47 | 11.5 | 1.01 | 0.73 | 1.18 | 13.0 | 25.2 | |
| 196 | Cmp#1 | 1.2 | 0.25 | 0.4 | 1 | 0.2 | 0.27 | 1.08 | 2.34 | 4.33 | 0.19 | 0.24 | 11.5 | 0.51 | 0.37 | 0.59 | 6.75 | 12.5 | |
| 197 | Cmp#1 | 1.2 | 0.5 | 0.4 | 5 | 0.5 | 0.27 | 1.08 | 2.34 | 4.55 | 0.19 | 0.24 | 11.5 | 0.51 | 0.37 | 0.59 | 6.75 | 13.1 | |
| 198 | Cmp#1 | 1.2 | 1 | 0.4 | 20 | 1.0 | 1.08 | 2.16 | 2.34 | 4.55 | 0.19 | 0.24 | 11.5 | 0.51 | 0.37 | 0.59 | 6.75 | 13.1 | |
| 199 | Cmp#1 | 1.2 | 0.25 | 1.62 | 10 | 3.0 | 0.54 | 1.08 | 0.58 | 1.26 | 0.09 | 0.12 | 11.5 | 0.25 | 0.18 | 0.30 | 3.25 | 7.00 | |
| 200 | Cmp#1 | 1.2 | 0.5 | 0.81 | 15 | 2.0 | 0.54 | 1.08 | 0.58 | 1.26 | 0.09 | 0.12 | 11.5 | 0.25 | 0.18 | 0.30 | 3.25 | 7.00 | |
| 201 | Cmp#1 | 1.2 | 1 | 1.6 | 60 | 3.0 | 0.54 | 1.08 | 0.58 | 1.26 | 0.09 | 0.12 | 11.5 | 0.25 | 0.18 | 0.30 | 3.25 | 7.00 | |

| Row No. | Sample Identity | Density (lb/ft³) | Sheet Thickness (in) | Scale | Force-to-Close (grams) | Pressure-to-Close (g/cm²) | Repeat Finger-to-Finger (in) | Repeat Stationary Wall-to-Stationary Wall (closed) | Cell Area (closed) (in²) | Cell Area (open) (in²) | Hinge distance (in) | Hinge Separation (in) | Hinge Angle (deg) | Arm thickness (in) | Stab.n Wall Thickness (in) | Neck Height (in) | Start Length (in) | Expanded Length (in) | Comment |
|---|---|---|---|---|---|---|---|---|---|---|---|---|---|---|---|---|---|---|---|
| 202 | Cmp#1 | 1.2 | 0.25 | .81 | 5 | 1.0 | 0.54 | 0.27 | 0.15 | 0.29 | 0.05 | 0.06 | 11.5 | 0.13 | 0.09 | 0.15 | 1.75 | 3.50 | |
| 203 | Cmp#1 | 1.2 | 0.5 | .81 | 5 | 0.5 | 0.54 | 0.27 | 0.15 | 0.28 | 0.05 | 0.06 | 11.5 | 0.13 | 0.09 | 0.15 | 1.75 | 3.38 | |
| 204 | Cmp#1 | 1.2 | 1 | .81 | 10 | 1.0 | 0.54 | 0.27 | 0.15 | 0.28 | 0.05 | 0.06 | 11.5 | 0.13 | 0.09 | 0.15 | 1.75 | 3.38 | |
| 205 | Cmp#1 | 1.2 | 0.25 | 0.4 | 0 | 0 | 0.27 | 0.14 | 0.04 | 0.00 | 0.02 | 0.03 | 11.5 | 0.06 | 0.05 | 0.07 | 0.75 | 0.00 | |
| 206 | Cmp#1 | 1.2 | 0.5 | 0.4 | 0 | 0 | 0.27 | 0.14 | 0.04 | 0.00 | 0.02 | 0.03 | 11.5 | 0.06 | 0.05 | 0.07 | 0.75 | 0.00 | |
| 207 | Cmp#1 | 1.2 | 1 | 0.4 | 0 | 0 | 0.27 | 0.14 | 0.04 | 0.00 | 0.02 | 0.03 | 11.5 | 0.06 | 0.05 | 0.07 | 0.75 | 0.00 | |
| 208 | Cmp#1 | 1.7 | 0.5 | 1.62 | 20 | 2.0 | 1.08 | 0.54 | 0.58 | 1.30 | 0.09 | 0.12 | 11.5 | 0.25 | 0.18 | 0.30 | 3.25 | 7.25 | |
| 209 | Cmp#1 | 1.7 | 0.5 | 0.81 | 10 | 1.0 | 0.54 | 0.27 | 0.15 | 0.29 | 0.05 | 0.06 | 11.5 | 0.13 | 0.09 | 0.15 | 1.75 | 3.5 | |
| 210 | Cmp#1 | 1.7 | 0.5 | 0.40 | 0 | 0 | 0.27 | 0.14 | 0.04 | 0 | 0.02 | 0.03 | 11.5 | 0.06 | 0.05 | 0.07 | 0.75 | 0 | |
| 211 | Cmp#1 | 2.2 | 0.5 | 1.62 | 45 | 4.4 | 1.08 | 0.54 | 0.58 | 1.28 | 0.09 | 0.12 | 11.5 | 0.25 | 0.18 | 0.30 | 3.25 | 7.13 | |
| 212 | Cmp#1 | 2.2 | 0.5 | 0.81 | 40 | 3.9 | 0.54 | 0.27 | 0.15 | 0.29 | 0.05 | 0.06 | 11.5 | 0.13 | 0.09 | 0.15 | 1.75 | 3.50 | |
| 213 | Cmp#1 | 2.2 | 0.5 | 0.40 | 0 | 0 | 0.27 | 0.14 | 0.04 | 0 | 0.02 | 0.03 | 11.5 | 0.06 | 0.05 | 0.07 | 0.75 | 0 | |
| 214 | | | | | | | | | | | | | | | | | | | |

| Row No. | Sample Identity | Density (lb/ft³) | Sheet Thickness (in) | | Force-to-Close (grams) | Pressure-to-Close (g/cm²) | repeat fngr-to-fingr (in) | Repeat Stab. wall-to-Stab. wall-closed (in) | Cell Area (closed) (in²) | Cell Area (open) (in²) | Hinge distance (in) | Hinge Separation (in) | Hinge Angle (deg) | Arm thickness (in) | Stab. Wall Thickness (in) | Neck Height (in) | Start Length (in) | Expanded Length (in) | Comment |
|---|---|---|---|---|---|---|---|---|---|---|---|---|---|---|---|---|---|---|---|
| 215 | CP#2A | 1.2 | 0.5 | — | 1.7 | 0.2 | 3.4 | 0.7 | 2.38 | 4.84 | 0.15 | 0.39 | 0 | 0.39 | 0.26 | 0.45 | 3.75 | 7.63 | |
| 216 | CP#2B | 1.2 | 0.5 | — | 3.3 | 0.3 | 4.78 | 1.16 | 5.54 | 13.6 | 0.22 | 0.59 | 0 | 0.59 | 0.39 | 1.02 | 6.25 | 15.4 | |
| 217 | CP#2C | 1.2 | 0.5 | — | 0 | 0 | 5.7 | 1.86 | 10.6 | 23.9 | 0.33 | 0.79 | 0 | 0.79 | 0.52 | 1.74 | 9.75 | 22 | |
| 218 | CP#2A | 1.7 | 0.5 | — | 3.3 | 0.3 | 3.4 | 0.7 | 2.38 | 5.24 | 0.15 | 0.39 | 0 | 0.39 | 0.26 | 0.45 | 3.75 | 8.25 | |
| 219 | CP#2B | 1.7 | 0.5 | — | 5.0 | 0.5 | 4.78 | 1.16 | 5.54 | 13.8 | 0.22 | 0.59 | 0 | 0.59 | 0.39 | 1.02 | 6.25 | 15.5 | |
| 220 | CP#2C | 1.7 | 0.5 | — | 5.0 | 0.5 | 5.7 | 1.86 | 10.6 | 27.2 | 0.33 | 0.79 | 0 | 0.79 | 0.52 | 1.74 | 9.75 | 25 | |

| Row No. | Sample Identity | Density (lb/ft³) | Sheet Thickness (in) | | Force-to-Close (grams) | Pressure-to-Close (g/cm²) | repeat fngr-to-fingr (in) | Repeat Stab. wall-to-Stab. wall-closed (in) | Cell Area (closed) (in²) | Cell Area (open) (in²) | Hinge distance (in) | Hinge Separation (in) | Hinge Angle (deg) | Arm thickness (in) | Stab. Wall Thickness (in) | Neck Height (in) | Start Length (in) | Expanded Length (in) | Comment |
|---|---|---|---|---|---|---|---|---|---|---|---|---|---|---|---|---|---|---|---|
| 221 | CP#2A | 2.2 | 0.5 | — | 5.0 | 0.5 | 3.4 | 0.7 | 2.38 | 5.08 | 0.15 | 0.39 | 0 | 0.39 | 0.26 | 0.45 | 3.75 | 8 | |
| 222 | CP#2B | 2.2 | 0.5 | — | 8.3 | 0.8 | 4.78 | 1.16 | 5.54 | 14.2 | 0.22 | 0.59 | 0 | 0.59 | 0.39 | 1.02 | 6.25 | 16 | |
| 223 | CP#2C | 2.2 | 0.5 | — | 0 | 0 | 5.7 | 1.86 | 10.6 | 0 | 0.33 | 0.79 | 0 | 0.79 | 0.52 | 1.74 | 9.75 | 0 | |
| 224 | CP#2A | 1.7 | 0.75 | — | 8.3 | 0.5 | 3.4 | 0.7 | 2.38 | 5.24 | 0.15 | 0.39 | 0 | 0.39 | 0.26 | 0.45 | 3.75 | 8.25 | |
| 225 | CP#2B | 1.7 | 0.75 | — | 11.7 | 0.8 | 4.78 | 1.16 | 5.54 | 14.1 | 0.22 | 0.59 | 0 | 0.59 | 0.39 | 1.02 | 6.25 | 15.9 | |
| 226 | CP#2C | 1.7 | 0.75 | — | 15.0 | 1.0 | 5.7 | 1.86 | 10.6 | 29.1 | 0.33 | 0.79 | 0 | 0.79 | 0.52 | 1.74 | 9.75 | 26.8 | |

TABLE 17-continued

| Row No. | Sample Identity | Density (lb/ft³) | Sheet Thickness (in) | Scale | Force-to-Close (grams) | Pressure-to-Close (g/cm²) | Repeat Finger-to-Finger (in) | rep. stab. wall-to-s. wall-closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 227 | 0-Str | 6 | 0.28 | 4 | 0 | 0 | 2.68 | 2.80 | 7.50 | 0.00 | 0.62 | 0.48 | 0.0 | 0.84 | 0.60 | 0.92 | 10.0 | 0.00 | Springy |
| 228 | 0-Str | 6 | 0.28 | 2 | 0 | 0 | 1.34 | 1.40 | 1.88 | 0.00 | 0.31 | 0.24 | 0.0 | 0.42 | 0.30 | 0.46 | 4.88 | 0.00 | Flipped |
| 229 | 0-Str | 6 | 0.28 | 1.5 | 0 | 0 | 1.01 | 1.05 | 1.06 | 0.00 | 0.23 | 0.18 | 0.0 | 0.32 | 0.23 | 0.35 | 3.50 | 0.00 | Tore opening |
| 230 | 0-Str | 6 | 0.28 | 1 | 190 | 33.4 | 0.67 | 0.70 | 0.47 | 1.11 | 0.16 | 0.12 | 0.0 | 0.21 | 0.15 | 0.23 | 2.38 | 5.63 | Flipped |
| 231 | 0-Str | 6 | 0.28 | 0.75 | 0 | 0 | 0.50 | 0.53 | 0.26 | 0.55 | 0.12 | 0.09 | 0.0 | 0.16 | 0.11 | 0.17 | 1.88 | 3.88 | Flipped |
| 232 | 0-Str | 6 | 0.28 | 0.5 | 200 | 35.1 | 0.34 | 0.35 | 0.12 | 0.23 | 0.08 | 0.06 | 0.0 | 0.11 | 0.08 | 0.12 | 1.25 | 2.50 | Flipped |
| 233 | | | | | | | | | | | | | | | | | | | |
| 234 | 0-Str | 4 | 1.1 | 4 | 0 | 0 | 2.68 | 2.80 | 7.50 | 0.00 | 0.62 | 0.48 | 0.0 | 0.84 | 0.60 | 0.92 | 10.0 | 0.00 | Tore opening |
| 235 | 0-Str | 4 | 1.1 | 2 | 400 | 17.9 | 1.34 | 1.40 | 1.88 | 4.23 | 0.31 | 0.24 | 0.0 | 0.42 | 0.30 | 0.46 | 4.88 | 11.0 | |
| 236 | 0-Str | 4 | 1.1 | 1.5 | 550 | 24.6 | 1.01 | 1.05 | 1.06 | 2.34 | 0.23 | 0.18 | 0.0 | 0.32 | 0.23 | 0.35 | 3.50 | 7.75 | |
| 237 | 0-Str | 4 | 1 | 1 | 700 | 31.3 | 0.67 | 0.70 | 0.47 | 0.98 | 0.16 | 0.12 | 0.0 | 0.21 | 0.15 | 0.23 | 2.50 | 5.25 | Diff to open |
| 238 | 0-Str | 4 | 1.1 | 1 | 0 | 0 | 0.67 | 0.70 | 0.47 | 0.00 | 0.16 | 0.12 | 0.0 | 0.21 | 0.15 | 0.23 | 2.38 | 0.00 | Tore opening |
| 239 | | | | | | | | | | | | | | | | | | | |

| Row No. | Sample Identity | Density (lb/ft³) | Sheet Thickness (in) | Scale | Force-to-Close (grams) | Pressure-to-Close (g/cm²) | Repeat Finger-to-Finger (in) | rep. stab. wall-to-s. wall-closed (in) | Cell Area (closed) (in²) | Cell Area (open) (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 240 | 0-Str | 4 | 1.1 | 0.75 | 0 | 0 | 0.50 | 0.53 | 0.26 | 0.00 | 0.12 | 0.09 | 0.0 | 0.16 | 0.11 | 0.17 | 1.88 | 0.00 | Tore opening |
| 241 | 0-Str | 4 | 1.1 | 0.5 | 120 | 5.4 | 0.34 | 0.35 | 0.12 | 0.19 | 0.08 | 0.06 | 0.0 | 0.11 | 0.08 | 0.12 | 1.25 | 2.00 | Tore opening |
| 242 | | | | | | | | | | | | | | | | | | | |
| 243 | 0-Str | 2.2 | 0.13 | 4 | 0 | 0 | 2.68 | 2.80 | 7.50 | 0.00 | 0.62 | 0.48 | 0.0 | 0.84 | 0.60 | 0.92 | 10.00 | 0.00 | Flips opening |
| 244 | 0-Str | 2.2 | 0.5 | 4 | 0 | 0 | 2.68 | 2.80 | 7.50 | 0.00 | 0.62 | 0.48 | 0.0 | 0.84 | 0.60 | 0.92 | 10.00 | 0.00 | |
| 245 | 0-Str | 2.2 | 0.88 | 4 | 0 | 0 | 2.68 | 2.80 | 7.50 | 0.00 | 0.62 | 0.48 | 0.0 | 0.84 | 0.60 | 0.92 | 10.00 | 0.00 | Dbld |
| 246 | 0-Str | 2.2 | 1.1 | 4 | 0 | 0 | 2.68 | 2.80 | 7.50 | 0.00 | 0.62 | 0.48 | 0.0 | 0.84 | 0.60 | 0.92 | 10.00 | 0.00 | |
| 247 | | | | | | | | | | | | | | | | | | | |
| 248 | 0-Str | 2.2 | 0.13 | 2 | 0 | 0 | 1.34 | 1.40 | 1.88 | 0.00 | 0.31 | 0.24 | 0.0 | 0.42 | 0.30 | 0.46 | 4.88 | 0.00 | Flips opening |
| 249 | 0-Str | 2.2 | 0.5 | 2 | 0 | 0 | 1.34 | 1.40 | 1.88 | 2.26 | 0.31 | 0.24 | 0.0 | 0.42 | 0.30 | 0.46 | 4.88 | 0.00 | |
| 250 | 0-Str | 2.2 | 0.88 | 2 | 0 | 0 | 1.34 | 1.40 | 1.88 | 2.19 | 0.31 | 0.24 | 0.0 | 0.42 | 0.30 | 0.46 | 4.88 | 0.00 | |
| 251 | 0-Str | 2.2 | 1.1 | 2 | 80 | 3.57 | 1.34 | 1.40 | 1.88 | 4.14 | 0.31 | 0.24 | 0.0 | 0.42 | 0.30 | 0.46 | 4.88 | 10.75 | |
| 252 | | | | | | | | | | | | | | | | | | | |
| 253 | 0-Str | 2.2 | 0.13 | 1.5 | 0 | 0 | 1.01 | 1.05 | 1.06 | 0.00 | 0.23 | 0.18 | 0.0 | 0.32 | 0.23 | 0.35 | 3.50 | 0.00 | Flips opening |
| 254 | 0-Str | 2.2 | 0.5 | 1.5 | 40 | 3.9 | 1.01 | 1.05 | 1.06 | 2.26 | 0.23 | 0.18 | 0.0 | 0.32 | 0.23 | 0.35 | 3.50 | 7.50 | |
| 255 | 0-Str | 2.2 | 0.88 | 1.5 | 20 | 1.1 | 1.01 | 1.05 | 1.06 | 2.19 | 0.23 | 0.18 | 0.0 | 0.32 | 0.23 | 0.35 | 3.50 | 7.25 | |
| 256 | 0-Str | 2.2 | 1.1 | 1.5 | 250 | 11.2 | 1.01 | 1.05 | 1.06 | 2.30 | 0.23 | 0.18 | 0.0 | 0.32 | 0.23 | 0.35 | 3.50 | 7.63 | |
| 257 | | | | | | | | | | | | | | | | | | | |
| 258 | 0-Str | 2.2 | 0.13 | 1 | 0 | 0 | 0.67 | 0.70 | 0.47 | 0.00 | 0.16 | 0.12 | 0.0 | 0.21 | 0.15 | 0.23 | 2.38 | 0.00 | Flips opening |
| 259 | 0-Str | 2.2 | 0.5 | 1 | 140 | 13.8 | 0.67 | 0.70 | 0.47 | 0.99 | 0.16 | 0.12 | 0.0 | 0.21 | 0.15 | 0.23 | 2.38 | 5.00 | |
| 260 | 0-Str | 2.2 | 0.88 | 1 | 240 | 13.4 | 0.67 | 0.70 | 0.47 | 0.96 | 0.16 | 0.12 | 0.0 | 0.21 | 0.15 | 0.23 | 2.38 | 4.88 | |
| 261 | 0-Str | 2.2 | 1 | 1 | 180 | 8.9 | 0.67 | 0.70 | 0.47 | 0.94 | 0.16 | 0.12 | 0.0 | 0.21 | 0.15 | 0.23 | 2.50 | 5.00 | |
| 262 | 0-Str | 2.2 | 1.1 | 1 | 400 | 17.9 | 0.67 | 0.70 | 0.47 | 0.99 | 0.16 | 0.12 | 0.0 | 0.21 | 0.15 | 0.23 | 2.38 | 5.00 | 2pc laminated |

| Row No. | Sample Identity | Density (lb/ft³) | Sheet Thickness (in) | Scale | Force-to-Close (grams) | Pressure-to-Close (g/cm²) | Rpt. Fngr-to-Fngr (in) | Rpt. s. wall-to-s. wall-closed (in) | Cell Area (closed) (in²) | Cell Area (open) (in²) | Hinge distance (in) | Hinge Separation (in) | Hinge Angle (deg) | Arm thickness (in) | Stab. wall Thckns (in) | Neck Height (in) | Start Length (in) | Expanded Length (in) | Comment |
|---|---|---|---|---|---|---|---|---|---|---|---|---|---|---|---|---|---|---|---|
| 263 | 0-Str | 2.2 | 0.13 | 0.75 | 0 | 0 | 0.50 | 0.53 | 0.26 | 0.00 | 0.12 | 0.09 | 0.0 | 0.16 | 0.11 | 0.17 | 1.88 | 0.00 | Cut apart |
| 264 | 0-Str | 2.2 | 0.5 | 0.75 | 170 | 16.7 | 0.50 | 0.53 | 0.26 | 0.51 | 0.12 | 0.09 | 0.0 | 0.16 | 0.11 | 0.17 | 1.88 | 3.63 | |
| 265 | 0-Str | 2.2 | 0.75 | 0.75 | 140 | 7.8 | 0.50 | 0.53 | 0.26 | 0.49 | 0.12 | 0.09 | 0.0 | 0.16 | 0.11 | 0.17 | 1.88 | 3.50 | |
| 266 | 0-Str | 2.2 | 1.1 | 0.75 | 390 | 17.4 | 0.50 | 0.53 | 0.26 | 0.51 | 0.12 | 0.09 | 0.0 | 0.16 | 0.11 | 0.17 | 1.88 | 3.63 | |
| 267 | | | | | | | | | | | | | | | | | | | |

TABLE 17-continued

| Row No. | Sample Identity | Density (lb/ft³) | Sheet Thickness (in) | Scale | Force-to-Close (gms) | Pressure-to-Close (g/cm²) | Repeat Fngr-to-Fngr (in) | repeat St. wall to St. wall-closed (in) | Cell Area-closed (in²) | Cell Area-open (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 268 | 0-Str | 2.2 | 0.13 | 0.5 | 0 | 0 | 0.34 | 0.35 | 0.12 | 0.00 | 0.08 | 0.06 | 0.0 | 0.11 | 0.08 | 0.12 | 1.25 | 0.00 | Cut apart |
| 269 | 0-Str | 2.2 | 0.5 | 0.5 | 110 | 10.8 | 0.34 | 0.35 | 0.12 | 0.22 | 0.08 | 0.06 | 0.0 | 0.11 | 0.08 | 0.12 | 1.25 | 2.38 | |
| 270 | 0-Str | 2.2 | 0.88 | 0.5 | 100 | 5.6 | 0.34 | 0.35 | 0.12 | 0.21 | 0.08 | 0.06 | 0.0 | 0.11 | 0.08 | 0.12 | 1.25 | 2.25 | |
| 271 | 0-Str | 2.2 | 1.1 | 0.5 | 190 | 8.5 | 0.34 | 0.35 | 0.12 | 0.21 | 0.08 | 0.06 | 0.0 | 0.11 | 0.08 | 0.12 | 1.25 | 2.25 | |
| 272 | | | | | | | | | | | | | | | | | | | |
| 273 | 0-Str | 1.7 | 0.13 | 4 | 0 | 0 | 2.68 | 2.80 | 7.50 | 0.00 | 0.62 | 0.48 | 0.0 | 0.84 | 0.60 | 0.92 | 10.00 | 0.00 | Flips; closes |
| 274 | 0-Str | 1.7 | 0.25 | 4 | 0 | 0 | 2.68 | 2.80 | 7.50 | 0.00 | 0.62 | 0.48 | 0.0 | 0.84 | 0.60 | 0.92 | 10.00 | 0.00 | |
| 275 | 0-Str | 1.7 | 0.33 | 4 | 0 | 0 | 2.68 | 2.80 | 7.50 | 2.34 | 0.62 | 0.48 | 0.0 | 0.84 | 0.60 | 0.92 | 10.00 | 0.00 | |
| 276 | 0-Str | 1.7 | 0.5 | 4 | 0 | 0 | 2.68 | 2.80 | 7.50 | 2.19 | 0.62 | 0.48 | 0.0 | 0.84 | 0.60 | 0.92 | 10.00 | 0.00 | |
| 277 | 0-Str | 1.7 | 0.75 | 4 | 0 | 0 | 2.68 | 2.80 | 7.50 | 2.11 | 0.62 | 0.48 | 0.0 | 0.84 | 0.60 | 0.92 | 10.00 | 0.00 | |
| 278 | | | | | | | | | | | | | | | | | | | |
| 279 | 0-Str | 1.7 | 0.13 | 2 | 0 | 0 | 1.34 | 1.40 | 1.88 | 0.00 | 0.31 | 0.24 | 0.0 | 0.42 | 0.30 | 0.46 | 4.88 | 0.00 | Flips; closes |
| 280 | 0-Str | 1.7 | 0.25 | 2 | 0 | 0 | 1.34 | 1.40 | 1.88 | 0.00 | 0.31 | 0.24 | 0.0 | 0.42 | 0.30 | 0.46 | 4.88 | 0.00 | |
| 281 | 0-Str | 1.7 | 0.33 | 2 | 20 | 3.0 | 1.34 | 1.40 | 1.88 | 3.99 | 0.31 | 0.24 | 0.0 | 0.42 | 0.30 | 0.46 | 4.88 | 10.38 | |
| 282 | 0-Str | 1.7 | 0.5 | 2 | 0 | 0 | 1.34 | 1.40 | 1.88 | 0.00 | 0.31 | 0.24 | 0.0 | 0.42 | 0.30 | 0.46 | 4.88 | 0.00 | |
| 283 | 0-Str | 1.7 | 0.75 | 2 | 0 | 0 | 1.34 | 1.40 | 1.88 | 0.00 | 0.31 | 0.24 | 0.0 | 0.42 | 0.30 | 0.46 | 4.88 | 0.00 | |

| Row No. | Sample Identity | Density (lb/ft³) | Sheet Thickness (in) | Scale | Force-to-Close (gms) | Pressure-to-Close (g/cm²) | Repeat Fngr-to-Fngr (in) | repeat St. wall to St. wall-closed (in) | Cell Area-closed (in²) | Cell Area-open (in²) | Hinge distance (in) | Hinge Separation (in) | Hinge Angle (deg) | Arm thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 284 | 0-Str | 1.7 | 0.13 | 1.5 | 0 | 0 | 1.01 | 1.05 | 1.06 | 0.00 | 0.23 | 0.18 | 0.0 | 0.32 | 0.23 | 0.35 | 3.50 | 0.00 | Flips; closes |
| 285 | 0-Str | 1.7 | 0.25 | 1.5 | 0 | 0 | 1.01 | 1.05 | 1.06 | 0.00 | 0.23 | 0.18 | 0.0 | 0.32 | 0.23 | 0.35 | 3.50 | 0.00 | |
| 286 | 0-Str | 1.7 | 0.33 | 1.5 | 30 | 4.5 | 1.01 | 1.05 | 1.06 | 2.34 | 0.23 | 0.18 | 0.0 | 0.32 | 0.23 | 0.35 | 3.50 | 7.75 | |
| 287 | 0-Str | 1.7 | 0.5 | 1.5 | 30 | 3.0 | 1.01 | 1.05 | 1.06 | 2.19 | 0.23 | 0.18 | 0.0 | 0.32 | 0.23 | 0.35 | 3.50 | 7.25 | |
| 288 | 0-Str | 1.7 | 0.75 | 1.5 | 0 | 0 | 1.01 | 1.05 | 1.06 | 2.11 | 0.23 | 0.18 | 0.0 | 0.32 | 0.23 | 0.35 | 3.50 | 7.00 | |
| 289 | | | | | | | | | | | | | | | | | | | |
| 290 | 0-Str | 1.7 | 0.13 | 1 | 0 | 0 | 0.67 | 0.70 | 0.47 | 0.00 | 0.16 | 0.12 | 0.0 | 0.21 | 0.15 | 0.23 | 2.38 | 0.00 | Flips; closes |
| 291 | 0-Str | 1.7 | 0.25 | 1 | 0 | 0 | 0.67 | 0.70 | 0.47 | 0.00 | 0.16 | 0.12 | 0.0 | 0.21 | 0.15 | 0.23 | 2.38 | 0.00 | |
| 292 | 0-Str | 1.7 | 0.33 | 1 | 35 | 5.2 | 0.67 | 0.70 | 0.47 | 0.94 | 0.16 | 0.12 | 0.0 | 0.21 | 0.15 | 0.23 | 2.38 | 4.75 | |
| 293 | 0-Str | 1.7 | 0.5 | 1 | 65 | 6.4 | 0.67 | 0.70 | 0.47 | 0.94 | 0.16 | 0.12 | 0.0 | 0.21 | 0.15 | 0.23 | 2.38 | 4.75 | |
| 294 | 0-Str | 1.7 | 0.75 | 1 | 60 | 3.9 | 0.67 | 0.70 | 0.47 | 0.96 | 0.16 | 0.12 | 0.0 | 0.21 | 0.15 | 0.23 | 2.38 | 4.88 | |
| 295 | | | | | | | | | | | | | | | | | | | |
| 296 | 0-Str | 1.7 | 0.13 | 0.75 | 0 | 0 | 0.50 | 0.53 | 0.26 | 0.00 | 0.12 | 0.09 | 0.0 | 0.16 | 0.11 | 0.17 | 1.88 | 0.00 | |
| 297 | 0-Str | 1.7 | 0.25 | 0.75 | 0 | 1 | 0.50 | 0.53 | 0.26 | 0.46 | 0.12 | 0.09 | 0.0 | 0.16 | 0.11 | 0.17 | 1.88 | 3.25 | |
| 298 | 0-Str | 1.7 | 0.33 | 0.75 | 30 | 5.2 | 0.50 | 0.53 | 0.26 | 0.49 | 0.12 | 0.09 | 0.0 | 0.16 | 0.11 | 0.17 | 1.88 | 3.50 | |
| 299 | 0-Str | 1.7 | 0.5 | 0.75 | 50 | 6.4 | 0.50 | 0.53 | 0.26 | 0.51 | 0.12 | 0.09 | 0.0 | 0.16 | 0.11 | 0.17 | 1.88 | 3.63 | |
| 300 | 0-Str | 1.7 | 0.75 | 0.75 | 100 | 3.9 | 0.50 | 0.53 | 0.26 | 0.47 | 0.12 | 0.09 | 0.0 | 0.16 | 0.11 | 0.17 | 1.88 | 3.38 | |

| Row No. | Sample Identity | Density (lb/ft³) | Sheet Thickness (in) | Scale | Force-to-Close (grams) | Pressure-to-Close (g/cm²) | Repeat Finger-to-Finger (in) | Rep. s. wall-to-s. Wall closed (in) | Cell Area (closed) (in²) | Cell Area (open) (in²) | Hinge distance (in) | Hinge Separation (in) | Hinge Angle | Arm Thickness (in) | Stabilization Wall Thickness (in) | Neck Height (in) | Start Length (in) | Expanded Length (in) | Comment |
|---|---|---|---|---|---|---|---|---|---|---|---|---|---|---|---|---|---|---|---|
| 301 | 0-Str | 1.7 | 0.13 | 0.5 | 0 | 0 | 0.34 | 0.35 | 0.12 | 0.00 | 0.08 | 0.06 | 0.0 | 0.11 | 0.08 | 0.12 | 1.25 | 0.00 | |
| 302 | 0-Str | 1.7 | 0.25 | 0.5 | 10 | 1.9 | 0.34 | 0.35 | 0.12 | 0.20 | 0.08 | 0.06 | 0.0 | 0.11 | 0.08 | 0.12 | 1.25 | 2.13 | |
| 303 | 0-Str | 1.7 | 0.33 | 0.5 | 30 | 4.5 | 0.34 | 0.35 | 0.12 | 0.22 | 0.08 | 0.06 | 0.0 | 0.11 | 0.08 | 0.12 | 1.25 | 2.38 | |
| 304 | 0-Str | 1.7 | 0.5 | 0.5 | 30 | 3.0 | 0.34 | 0.35 | 0.12 | 0.21 | 0.08 | 0.06 | 0.0 | 0.11 | 0.08 | 0.12 | 1.25 | 2.25 | |
| 305 | 0-Str | 1.7 | 0.75 | 0.5 | 20 | 1.3 | 0.34 | 0.35 | 0.12 | 0.15 | 0.08 | 0.06 | 0.0 | 0.11 | 0.08 | 0.12 | 1.25 | 1.63 | |
| 306 | | | | | | | | | | | | | | | | | | | |

TABLE 17-continued

| # | Type | | | | | | | | | | | | | | | | | | Notes |
|---|---|---|---|---|---|---|---|---|---|---|---|---|---|---|---|---|---|---|---|
| 307 | 0-Str | 1.7 | 0.5 | 4 | 0 | 0 | 2.68 | 2.80 | 7.50 | 0.00 | 0.62 | 0.48 | 0.0 | 0.84 | 0.60 | 0.92 | 10.00 | 0.00 | |
| 308 | 0-Str | 1.7 | 0.75 | 4 | 0 | 0 | 2.68 | 2.80 | 7.50 | 0.00 | 0.62 | 0.48 | 0.0 | 0.84 | 0.60 | 0.92 | 10.00 | 0.00 | |
| 309 | | | | | | | | | | | | | | | | | | | |
| 310 | 0-Str | 1.7 | 0.5 | 2 | 0 | 0 | 1.34 | 1.40 | 1.88 | 3.85 | 0.31 | 0.24 | 0.0 | 0.42 | 0.30 | 0.46 | 4.88 | 10.00 | Patrn ovr edge |
| 311 | 0-Str | 1.7 | 0.75 | 2 | 0 | 0 | 1.34 | 1.40 | 1.88 | 3.17 | 0.31 | 0.24 | 0.0 | 0.42 | 0.30 | 0.46 | 4.88 | 8.25 | |
| 312 | | | | | | | | | | | | | | | | | | | |
| 313 | 0-Str | 1.7 | 0.5 | 1.5 | 20 | 2.0 | 1.01 | 1.05 | 1.06 | 2.26 | 0.23 | 0.18 | 0.0 | 0.32 | 0.23 | 0.35 | 3.50 | 7.50 | Closes itself |
| 314 | 0-Str | 1.7 | 0.75 | 1.5 | 10 | 0.7 | 1.01 | 1.05 | 1.06 | 2.04 | 0.23 | 0.18 | 0.0 | 0.32 | 0.23 | 0.35 | 3.50 | 6.75 | |
| 315 | | | | | | | | | | | | | | | | | | | |
| 316 | 0-Str | 1.7 | 0.5 | 1 | 35 | 3.4 | 0.67 | 0.70 | 0.47 | 0.94 | 0.16 | 0.12 | 0.0 | 0.21 | 0.15 | 0.23 | 2.38 | 4.75 | |
| 317 | 0-Str | 1.7 | 0.75 | 1 | 100 | 6.6 | 0.67 | 0.70 | 0.47 | 0.94 | 0.16 | 0.12 | 0.0 | 0.21 | 0.15 | 0.23 | 2.38 | 4.75 | |
| 318 | | | | | | | | | | | | | | | | | | | |
| 319 | 0-Str | 1.7 | 0.5 | 0.75 | 45 | 4.4 | 0.50 | 0.53 | 0.26 | 0.53 | 0.12 | 0.09 | 0.0 | 0.16 | 0.11 | 0.17 | 1.88 | 3.75 | |
| 320 | 0-Str | 1.7 | 0.75 | 0.75 | 80 | 5.2 | 0.50 | 0.53 | 0.26 | 0.49 | 0.12 | 0.09 | 0.0 | 0.16 | 0.11 | 0.17 | 1.88 | 3.50 | |
| 321 | | | | | | | | | | | | | | | | | | | |
| 322 | 0-Str | 1.7 | 0.5 | 0.5 | 20 | 2.0 | 0.34 | 0.35 | 0.12 | 0.23 | 0.08 | 0.06 | 0.0 | 0.11 | 0.08 | 0.12 | 1.25 | 2.50 | |
| 323 | 0-Str | 1.7 | 0.75 | 0.5 | 30 | 2.0 | 0.34 | 0.35 | 0.12 | 0.21 | 0.08 | 0.06 | 0.0 | 0.11 | 0.08 | 0.12 | 1.25 | 2.25 | |

The width-to-depth ratios of the 0-Straight slits, the B1 slits, and the B5 slits, are lower than, for example, the width-to-depth ratios of the cavity wells of Comparative No. 1, as well as being lower than the width-to-depth ratios of the cavity wells of Comparatives 2A, 2B, and 2C. See Table 18, below. As a result, it is preferred that the slits provide a cavity well with a width-to-depth ratio of from 0.5 to 2, or from 0.7 to 1.5, or from 0.8 to 1.3, or from 0.9 to 1.2.

The axis of the expansion-and-locking arms of the 0-Straight, B1, and B5 embodiments of the invention pivot through more degrees than, for example, the degrees of pivoting of the axis of the expansion arms of Comparative No. 1, as well as through more degrees than the axis of expansion arms of Comparatives 2A, 2B, and 2C. See Table 18, below. As a result, it is preferred that the cut pattern be of a shape and arrangement so that the axis of the expansion-and-locking arms pivots from 85 to 130 degrees, or from 90-125 degrees, or from 91-120 degrees, or from 92-115 degrees, or from 93-112 degrees, or from 94-110 degrees.

TABLE 18

| Sample Identity | Width-to-Depth Ratio | Arm pivot angle (deg) | Ratio of: (2x arm length) + hinge separation to slit width |
|---|---|---|---|
| 0-Straight (FIG. 1A) | 1.375 | 94 | 1.35 |
| B1 (FIG. 2A) | 1.12 | 110 | 1.75 |
| B5 (FIG. 3A) | 1.09 | 100 | 1.87 |
| Comparative No. 1 | 2.37 | 71 | 1.20 |
| Comparative #2A | 5.1 | 39 | 1.06 |
| Comparative #2B | 3.4 | 52 | 1.13 |
| Comparative #2C | 2.4 | 80 | 1.25 |

The ratio of (i) the sum of the length of both expansion-and-locking arms in a given cavity well, plus the distance between the hinges, to (ii) the width of the cavity well, provides a numerical basis for the amount of excess foam that must "squeeze through" the cavity well during expansion, i.e., squeeze through the fingers on either side of the cavity well. Any ratio greater than 1.0 requires some foam compression in order for the expansion-and-locking arms to squeeze through the width of the cavity well during expansion. However, as is apparent from the pressure-to-close results in Table 17 considered in combination with the ratios provided in Table 18 below, a foam sheet having a density of from 14 g/liter to 48 g/liter benefits from having a ratio higher than 1.25 in order to produce a locking force of at least 5 g/cm$^2$. The ratio can be at least 1.30, or from 1.3 to 4, or from 1.3 to 3, or from 1.3 to 2, or from 1.3 to 2, or from 1.35 to 1.9, or from 1.35 to 1.87.

The change in the kind of slit between the comparative examples and 0-Straight, B1, and B5 provides a lower width-to-depth ratio, a greater arm pivot angle, and a higher ratio of arm length (plus hinge separation) to slit width ratio, in order that so much foam must squeeze through the width of the cavity well that the activation energy is high enough that the greater arm pivot angle allows the relatively low density foam to achieve relatively high pressure-to-close.

While the results provided in Table 17 demonstrate the relationship between pressure-to-close and foam density for several preferred embodiments of the invention, including B5, B1, 0-Straight, as well as the lesser pressure-to-close results for Comparatives 1, 2A, 2B, and 2C, the parameters set forth in Table 18, above, summarize parameters that are important in achieving relatively high pressure-to-close in a relatively low density foam sheet. The differences in the width-to-depth ratios, the arm pivot angles, and the ratio of arm length to slit width are apparent for the various slit patters of the invention versus the slit patterns of the comparative examples.

A study of the large amount of data in Table 17 reveals further insights into the important parameters for making locking foam sheet. For example, in studying the B1 and B5 patterns it has been found that the ratio of the bubble size divided by the product of the material thickness times the square root of the scale provides a means of determining which trials will work when made of foam materials with different densities and thickness. Specifically, the ratio can be used to compare two samples with a relative size scale between each other. We have found that for the B1 and B5 patterns, when this ratio has a value greater than 0.15, particularly a value greater 0.2, the sample does not provide the closing force necessary to be a strong sample, particularly for the examples having serpentine expansion-and-locking arm, i.e., B1 and B5.

Expandable foam sheet of the invention has a wide variety of uses, including cushioning for packaging applications, flooring systems, as carpet underlayment, thermal insulation sheet for garments, pipes, conduits, and walls, as a self-inflating mattress, as a concrete blanket, as concrete underlayment, as a concrete filler panel or concrete forming panel, as a structural construction panel, as a sound insulation and/or sound absorption article, and as construction fencing.

Figure 79:
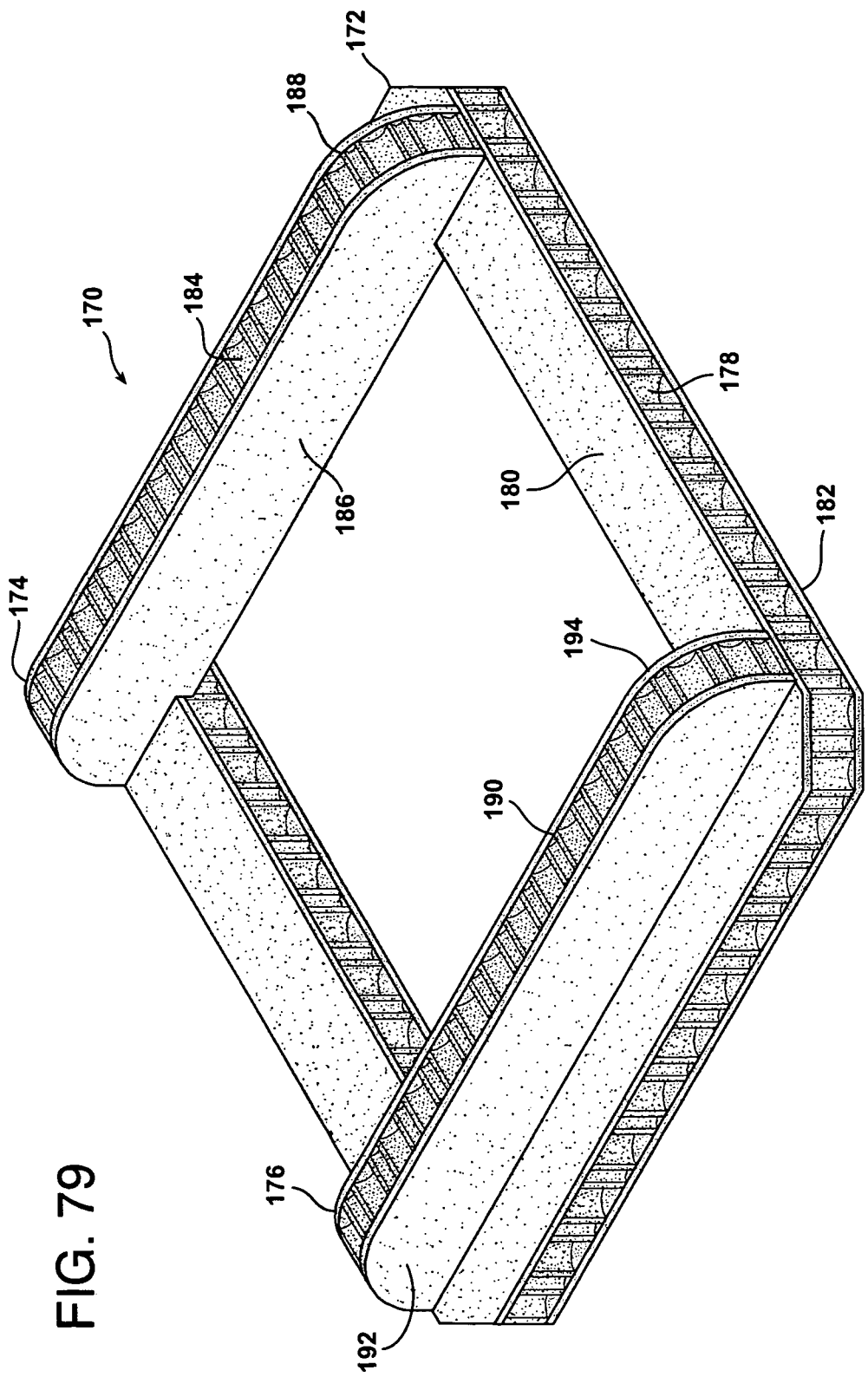
FIG. 79 is a perspective view of a rail pack cushioning article.

FIG. 79 illustrates cushioning article 170 designed for packaging end-use. Cushioning article 170 can be sized for the interior of a box. Cushioning article 170 is designed to have a product placed on support plate 172, with the product being further held in place and cushioned by cushioning blocks 174 and 176. Support plate 172 can be provided with a center opening, as illustrated in FIG. 79. However, support plate 79 can also be provided as a continuous member, i.e., without a center opening. Cushioning blocks 174 and 176 may optionally be parallel to one another, and may optionally be perpendicular to support plate 172, depending upon the article being packaged and other components of the package.

As illustrated in FIG. 79, support plate 172 comprises expanded foam sheet 178 laminated to non-expandable upper foam sheet 180 and non-expandable lower foam sheet 182, resulting in a torsion-box type of construction. Likewise, cushioning block 174 is illustrated as a laminate of expanded foam sheet 184 to non-expandable foam sheets 186 and 188, and cushioning block 176 is a laminate of expanded foam sheet 190 to non-expandable foam sheets 192 and 194.

Alternatively, cushioning article 170 could be made with just one non-expandable foam sheet laminated to expanded foam sheet 178, and/or just one non-expandable foam sheet laminated to expanded foam sheet 184, and/or just one non-expandable foam sheet laminated to expanded foam sheet 190. Furthermore, cushioning article 170 could be made from the union of expanded foam sheets 178, 184, and 190, without the lamination of any non-expandable foam sheet to any of these members. However, as the support plate is adhered to the cushioning blocks 174 and 176 with an adhesive, a better bond is produced by laminating a non-expandable foam to sheet 180 to the expanded foam 178 of support plate 172.

A film can be substituted for the non-expandable foam sheet. Moreover, while the expandable foam sheet may be a locking expandable foam sheet in accordance with the first and/or second and/or third aspects of the invention as set forth above. The expandable foam sheet may be a non-locking foam sheet or an expandable foam sheet with a locking force less than 5 g/cm$^2$.

Figure 80A:
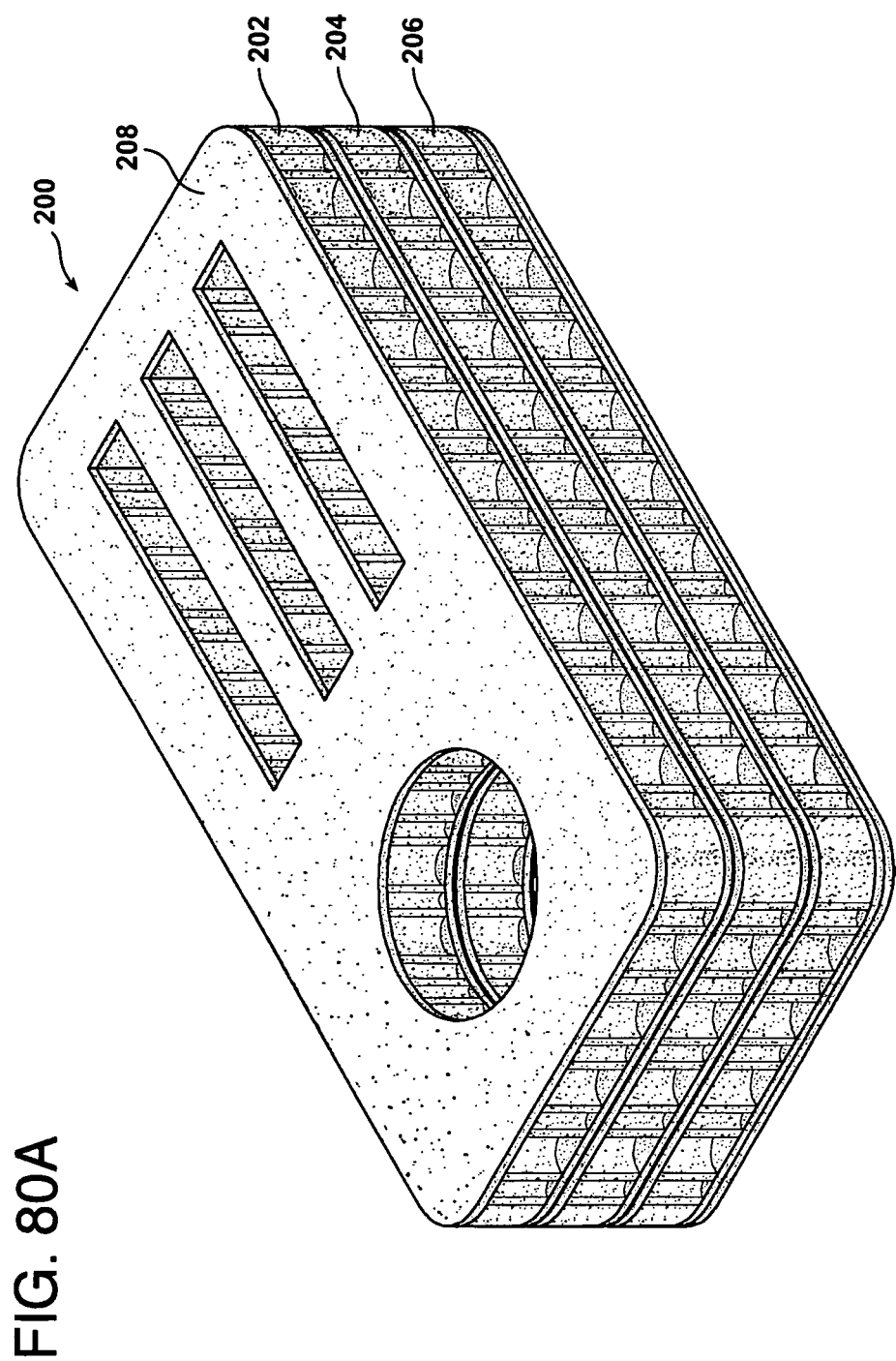
FIG. 80A is a perspective view of a cavity pack cushioning article.
Figure 80B:
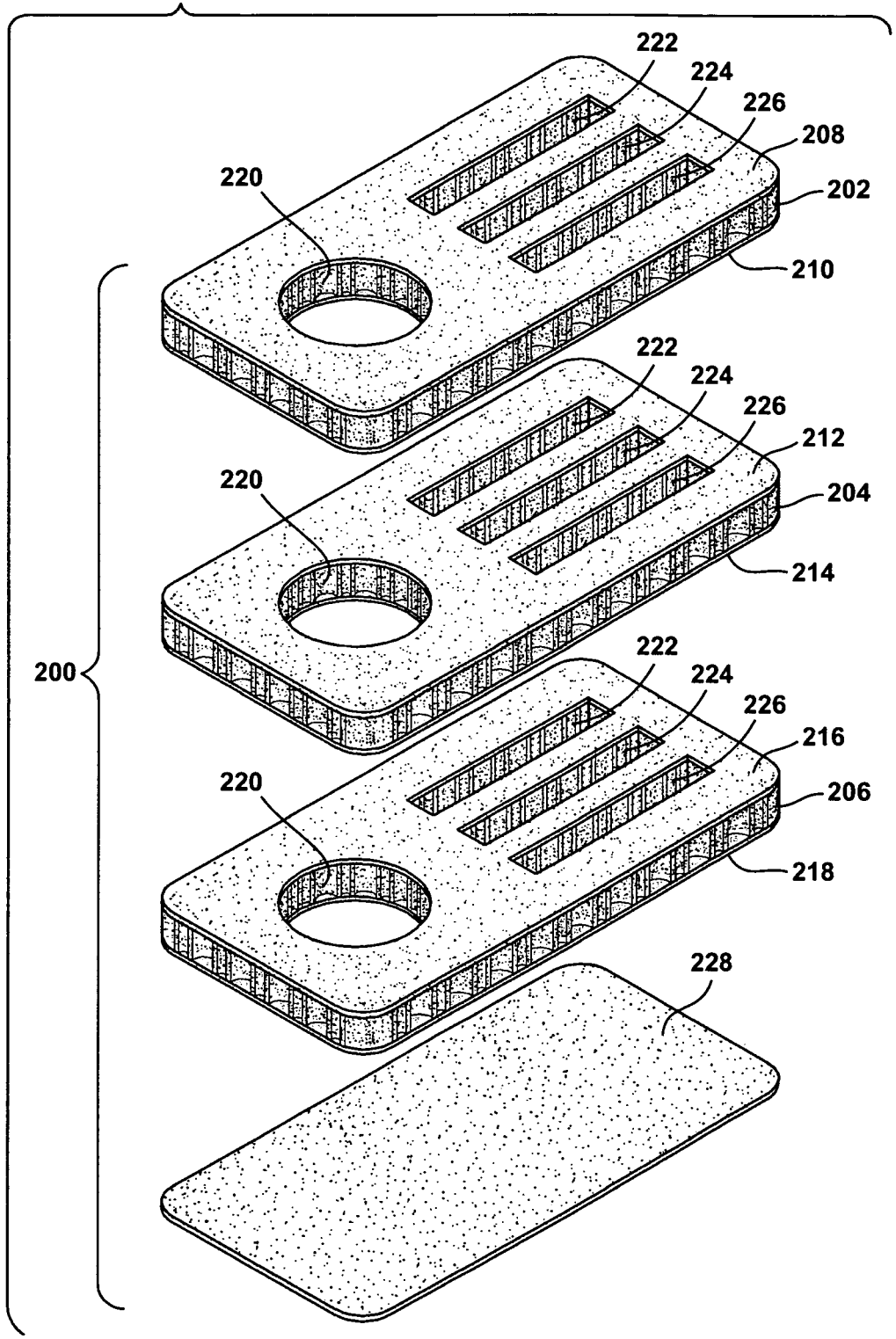
FIG. 80B is an exploded view of the cavity pack cushioning article of FIG. 80A.

FIG. 80A and FIG. 80B illustrate cushioning article 200 comprising a plurality of expanded foam sheets 202, 204, and 206, each of which is laminated to two non-expandable foam sheets. Upper expanded foam sheet 202 is laminated to upper non-expandable foam sheet 208 and lower non-expandable foam sheet 210. Middle expanded foam sheet 204 is laminated to upper non-expandable foam sheet 212 and lower non-expandable foam sheet 214. Lower expanded foam sheet 206 is laminated to upper non-expandable foam sheet 216 and lower non-expandable foam sheet 218. Lower non-expandable foam sheet 210 is laminated to upper non-expandable foam sheet 212, and lower non-expandable foam sheet 214 is laminated to upper non-expandable foam sheet 216.

As illustrated in FIG. 80B, each of the upper, middle, and lower assemblies has holes 220, 222, 224, and 226 therein. These holes can be cut separately before lamination, or altogether after lamination, using a water knife. Non-expandable (or expandable) bottom foam sheet 228 is adhered to lower non-expandable foam sheet 218.

Cushioning article 200 serves as a "cavity pack" in that it has cavities therein for holding objects to be packaged. Cushioning article 200 can be designed to fit inside a box, to provide cushioning for products place in cavities 220, 222, 224, 226, and 228. The use of expanded foam layers 202, 204, and 206 provides very low density, very soft cushioning for articles being packaged.

In cushioning article 220, a film can be substituted for the non-expandable foam sheet. Moreover, while the expandable foam sheet may be a locking expandable foam sheet in accordance with the first and/or second and/or third aspects of the invention as set forth above. The expanded foam sheet may be a non-locking foam sheet or an expandable foam sheet with a locking force less than 5 g/cm².

Alternatively, cushioning article 200 could be made with just one non-expandable foam sheet laminated to expanded foam sheet 202, and/or just one non-expandable foam sheet laminated to expanded foam sheet 204, and/or just one non-expandable foam sheet laminated to expanded foam sheet 206. Furthermore, cushioning article 200 could be made from the union of expanded foam sheets 202, 204, and 206, without the lamination of any non-expandable foam sheet between any of these members. Likewise, a non-expandable bottom foam sheet 228 is optional. However, the presence of the non-expanded foam sheets provides a stronger lamination of the various layers of the cushioning article.

FIG. 81 is a plot of peak acceleration versus static load for various cushioning articles. Low peak acceleration corresponds with greater cushioning. The two lowest curves in the domain of from 0.2 to 0.5 psi static load are 1.2 lb/cu.ft. polyethylene foam expanded 2.5 times and laminated to either film or a sheet of non-expanded ⅛" polyethylene foam. Other curves are for polyethylene foam expanded 250% without film, a 1.2 lb/cu.ft urethane foam, two different 1.8 lb/cu.ft. urethane foams, and unexpanded 1.2 lb/cu.ft. polyethylene and unexpanded 1.7 lb/cu.ft. polyethylene.

The expanded polyethylene foam laminated to film or unexpanded foam sheet was surprisingly found to outperform soft polyurethane foam of the same density as the polyethylene foam before expansion. It is believed that the combination of the expanded polyethylene foam and the film or unexpanded foam sheet decreases acceleration through tension in the film or unexpanded foam, as well as by forcing air through the expanded foam, similar to a baffle.

Unless otherwise indicated herein, the expanded foam sheet, i.e., to which the film or unexpandable foam sheet is laminated, can be made from foam sheet having a density of from 0.9 to 3 lb/cu.ft, or from 1 to 2.7 lb/cu.ft., or from 1.2 to 2.2 lb/cu.ft. The foam sheet can be expanded from 50% to 300% or from 100 to 250%. The foam sheet is a locking foam sheet in accordance with the first or second aspects of the invention.

What is claimed is:

1. An expandable foam sheet comprising a plurality of discrete slits therein, the foam sheet being mechanically expandable from an unexpanded foam sheet configuration to an expanded foam sheet configuration, the expandable foam sheet having a density of from 14 g/liter to 48 g/liter in the unexpanded configuration and a thickness of from 6 mm to 50 mm, the slits being of a size and shape and arrangement so that the expanded foam sheet locks into the expanded configuration by exhibiting a pressure-to-close of at least 5 gm/cm², with each of the slits providing only a single free volume in the expanded foam sheet.

2. The expandable foam sheet according to claim 1, wherein:
(A) the unexpanded foam sheet configuration comprises a plurality of transverse stabilization walls X, each stabilization wall comprising a plurality of cavity wells along a first side thereof, and a plurality of cavity wells along a second side thereof, with the cavity wells being bounded on a first side by a first finger extending from and integral with the stabilization wall and being bounded on a second side by a second finger extending from and integral with the stabilization wall, the fingers extending between adjacent cavity wells on the same side of the stabilization wall, the cavity wells containing at least a portion of a finger from an adjacent stabilization wall extending thereinto, with the finger within the cavity well being hingedly attached to an associated pair of expansion-and-locking arms, including being hingedly attached to a first end of a first expansion-and-locking arm within said cavity well and hingedly attached to a first end of a second expansion-and-locking arm also within said cavity well, with the first expansion-and-locking arm having a second end that is hingedly attached to the first finger bounding the first side of the cavity well, and the second expansion-and-locking arm having a second end that is hingedly attached to the second finger bounding the second side of the cavity well; and
(B) the expanded foam sheet configuration comprises the plurality of transverse stabilization walls X and a plurality of transverse locking arm walls Y, with the plurality of transverse stabilization walls X and the plurality of transverse locking arm walls Y alternating in X-Y-X-Y arrangement, with a single transverse stabilization wall being connected to a single transverse locking arm wall by a plurality of the fingers extending from and integral with the transverse stabilization wall, and with the locking arm walls comprising a plurality of pairs of first and second expansion-and-locking arms in inverted position, with said first and second expansion-and-locking arms in inverted position having emerged from the cavity well of the unexpanded foam sheet during expansion of the foam sheet so that said first and second expansion-and-locking arms are locked in the inverted position, with the plurality of cavity wells and the plurality of associated pairs of expansion-and-locking arms locked in inverted position surrounding a corresponding number of discrete free volumes within the expanded foam sheet.

3. The expandable foam sheet according to claim 2, wherein the unexpanded foam sheet has a density of from 16 g/liter to 36 g/liter.

4. The expandable foam sheet according to claim 2, wherein the expansion-and-locking arms are of non-uniform width and are wider in a middle region than at end regions at which the expansion-and-locking arms are hingedly attached to the fingers.

5. The expandable foam sheet according to claim 2, wherein each of the expansion-and-locking arms are of a substantially uniform width.

6. The expandable foam sheet according to claim 2, wherein each cavity well has a centrally-positioned finger therein.

7. The expandable foam sheet according to claim 2, wherein the foam sheet comprises at least one member selected from polyolefin, polyurethane, rubber, silicone resin, ethylene/methyl acrylate copolymer, ethylene/butyl acrylate copolymer, ethylene/acrylic acid copolymer, ethylene/methacrylic acid copolymer, ionomer resin, styrene/butadiene copolymer, styrene/butadiene/styrene random and block copolymer, styrene/isoprene/styrene random and block copolymer, and styrene/ethylene/butylene copolymer.

8. The expandable foam sheet according to claim 7, wherein the foam sheet comprises at least one member selected from ethylene homopolymer, ethylene/alpha-olefin copolymer, propylene homopolymer, propylene/alpha-olefin copolymer, and polyurethane.

9. The expandable foam sheet according to claim 2, wherein the unexpanded foam sheet has a thickness of from 6 millimeters to 38 millimeters.

10. The expandable foam sheet according to claim 2, wherein the expanded foam sheet exhibits a percent free volume of from 40 percent to 70 percent.

11. The expandable foam sheet according to claim 2, wherein the pressure-to-close of the expanded foam sheet is from 5 to 40 g/cm$^2$.

12. The expandable foam sheet according to claim 2, wherein the expansion-and-locking arms have an axis that pivots at least 85 degrees between the unexpanded foam sheet configuration and the expanded foam sheet configuration.

13. The expandable foam sheet according to claim 2, wherein the pair of expansion-and-locking arms are symmetrical in shape and orientation in the unexpanded foam sheet.

14. The expandable foam sheet according to claim 2, wherein each of the first and second expansion-and-locking arms has at least one serpentine edge.

15. The expandable foam sheet according to claim 14, wherein the finger has an enlarged region at its tip that is wider than at least a portion of the remainder of the finger.

16. The expandable foam sheet according to claim 14, wherein the expansion-and-locking arms each have a total serpentine angle of from 20 to 250 degrees.

17. The expandable foam sheet according to claim 2, wherein in the unexpanded foam sheet, the hinged connection of the expansion and locking arms to the fingers has a hinge width of from 0.06 inch to 0.16 inch.

18. The expandable foam sheet according to claim 2, wherein at the ends of the fingers in the unexpanded foam sheet, the hinged connection of the first expansion-and-locking arm to the finger in the cavity well is separated from the hinged connection of the second expansion-and-locking arm to the finger in the cavity well by a hinge separation of from 0.06 inch to 0.16 inch.

19. The expandable foam sheet according to claim 2, wherein the unexpanded foam sheet comprises a plurality of rows of slits A and a plurality of rows of slits B, with each row of slits A having a plurality of A slits therein, and each row of slits B having a plurality of B slits therein, with each row of slits A alternating with each row of slits B in -A&B-A&B-A&B- arrangement, with each row of slits A being coupled with one adjacent row of slits B on a first side of said row of slits A, and each row of slits B being coupled with the adjacent row of slits A on a first side of said row of slits B, with each row of slits A comprising A slits with a concavity facing coupled row of slits B and each row of slits B comprising B slits with a concavity facing coupled row of slits A, with the A slits in each row A interlocking with two B slits in each row of slits B in that in each coupled row of slits A and B, the A slits have ends extending into the cavity wells of coupled B slits, and the B slits have ends extending into the cavity wells of coupled slits A, with the expansion-and-locking arms being formed by foam between the row of slits A and the coupled row of slits B, with the stabilization walls and fingers extending therefrom being formed by foam between adjacent but uncoupled rows of slits A and rows of slits B.

20. The expandable foam sheet according to claim 19, wherein each A slit in each row of slits A has a concavity facing B slits in the coupled row of slits B, with each slit in the row of slits A having a width-to-depth ratio of from 0.5 to 1.5, and each slit in the row of slits B having a width-to-depth ratio of from 0.5 to 1.5.

21. The expandable foam sheet according to claim 20, wherein each slit in the row of slits A has a depth of from 6 mm to 25 mm, and each slit in the row of slits B has a depth of from 6 mm to 25 mm.

22. The expandable foam sheet according to claim 20, wherein the A slits and the B slits have a width-to-depth ratio of from 0.8 to 1.3, with the coupled A and B slits being at least 60% interlocked with respect to each other, the A slits and the B slits having a convex region at a bottom of the concavity, the convex region in the A slits protruding toward the coupled B slits, and the convex region in the B slits protruding towards the coupled A slits, with the convex region at the bottom of the concavity being formed by a slit line having a centrally-positioned point that is the intersection of two linear slit lines intersecting at an angle of from 60 to 140 degrees, with the convex region extending across at least 40 to 80 percent of the width of the slit, the first expansion-and-locking arm having two serpentine edges and the second expansion-and-locking arm having two serpentine edges, the first and second expansion- and locking arms each having a total serpentine angle of from 35 to 50 degrees, the first and second expansion-and-locking arms each having a substantially uniform width of from 0.06 inch to 0.75 inch, the first and second expansion-and-locking arms pivoting through an angle of from 100 to 120 degrees as the expandable foam sheet is expanded from its unexpanded configuration to its expanded configuration with the expansion-and-locking arms in their inverted and locked position, with the first and second expansion-and-locking arms being hingedly connected to the fingers with hinges having a length of from 0.03 to 0.35 inch, the expandable foam sheet having a slit pattern with a repeat finger-to-finger distance of from 0.25 inch to 3 inches and a repeat stabilization wall-to-stabilization wall distance of from 0.25 inch to 3 inches in the unexpanded configuration.

23. The expandable foam sheet according to claim 20, wherein the A slits and the B slits have a width-to-depth ratio of from 0.9 to 1.4, with the coupled A and B slits being at least 70% interlocked with respect to each other, the first expansion-and-locking arm having two serpentine edges and the second expansion-and-locking arm having two serpentine edges, the first and second expansion- and locking arms each having a total serpentine angle of from 40 to 150 degrees, the first and second expansion-and-locking arms having a substantially uniform width of from 0.05 to 0.5 inches, the first and second expansion-and-locking arms pivoting through an angle of from 90 to 110 degrees as the expandable foam sheet is expanded from its unexpanded configuration to its expanded configuration with the expansion-and-locking arms in their inverted and locked position, with the first and second expansion-and-locking arms being hingedly connected to the fingers with hinges having a length of from 0.03 to 0.35 inch, the expandable foam sheet having a slit pattern with a repeat finger-to-finger distance of from 0.25 inch to 3 inches and a repeat stabilization wall-to-stabilization wall distance of from 0.25 inch to 3 inches in the unexpanded configuration.

24. The expandable foam sheet according to claim 19, wherein the A slits and the B slits each have an arcuate central portion without an inflection point and a linear end portion on each side of the arcuate central portion, the A slits and the B slits having a width-to-depth ratio of from 1 to 1.8, with the coupled A and B slits being at least 45% interlocked with respect to each other, the first expansion-and-locking arm having two arcuate edges without an inflection point and the second expansion-and-locking arm two arcuate edges without an inflection point, with the first and second expansion-and-locking arms being wider in their central region than at their end regions, the first and second expansion-and-locking arms pivoting through an angle of from 90 to 105 degrees as the expandable foam sheet is expanded from its unexpanded configuration to its expanded configuration, with the first and second expansion-and-locking arms being hingedly connected to the fingers with hinges having a length of from 0.07 to 0.25 inch, the expandable foam sheet having a slit pattern with a repeat finger-to-finger distance of from 0.3 inch to 1.4 inches and a repeat stabilization wall-to-stabilization wall distance of from 0.3 inch to 1.4 inches in the unexpanded configuration.

25. An expandable foam sheet comprising a plurality of discrete slits therein, the foam sheet being mechanically expandable from an unexpanded foam sheet configuration to an expanded foam sheet configuration, wherein:
(A) the unexpanded foam sheet configuration comprises a plurality of stabilization walls X, each stabilization wall comprising a plurality of cavity wells along a first side thereof, and a plurality of cavity wells along a second side thereof, with the cavity wells being bounded on a first side by a first finger extending from and integral with the stabilization wall and being bounded on a second side by a second finger extending from and integral with the stabilization wall, the fingers extending between adjacent cavity wells on the same side of the stabilization wall, the cavity wells containing at least a portion of a finger from an adjacent stabilization wall extending thereinto, with the finger within the cavity well being hingedly attached to an associated pair of expansion-and-locking arms, including being hingedly attached to a first end of a first expansion-and-locking arm within said cavity well and hingedly attached to a first end of a second expansion-and-locking arm also within said cavity well, with the first expansion-and-locking arm having a second end that is hingedly attached to the first finger bounding the first side of the cavity well, and the second expansion-and-locking arm having a second end that is hingedly attached to the second finger bounding the second side of the cavity well, with the first expansion-and-locking arm having at least one serpentine edge and the second expansion-and-locking arm having at least one serpentine edge; and
(B) the expanded foam sheet configuration comprises the plurality of stabilization walls X and a plurality of locking arm walls Y, with the plurality of stabilization walls X and the plurality of locking arm walls Y alternating in X-Y-X-Y arrangement, with a single stabilization wall being connected to a single locking arm wall by a plurality of the fingers extending from and integral with the stabilization wall, with the locking arm walls comprising a plurality of pairs of first and second expansion-and-locking arms in inverted position, with said first and second expansion-and-locking arms in inverted position having emerged from the cavity well of the unexpanded foam sheet during expansion of the foam sheet so that said first and second expansion-and-locking arms are locked in the inverted position, with the plurality of cavity wells together with the plurality of associated pairs of expansion-and-locking arms locked in inverted position surrounding a corresponding number of discrete free volumes within the expanded foam sheet; and
the expandable foam sheet having a density of from 14 g/liter to 100 g/liter in the unexpanded configuration and a thickness of from 6 mm to 160 mm, the slits being of a size and shape and arrangement so that the expanded foam sheet locks into the expanded configuration by exhibiting a pressure-to-close of at least 5 gm/cm$^2$, with each of the slits providing only a single free volume in the expanded foam sheet.

26. The expandable foam sheet according to claim 25, wherein the first expansion-and-locking arm has two serpentine edges and the second expansion-and-locking arm has two serpentine edges, and the first and second expansion-and-locking arms have a total serpentine angle of from 20 to 250 degrees.

27. The expandable foam sheet according to claim 26, wherein a region at a tip portion of the fingers is wider than at least a portion of the remainder of the fingers.

28. A cushioning article, comprising an expandable foam sheet in expanded configuration, the foam sheet having a non-expandable foam sheet or film adhered thereto, the expandable foam sheet having a density of from 14 to 100 grams per liter in its unexpanded configuration and a thickness of from 3 mm to 100 mm, the expanded foam sheet having been made from an expandable foam sheet comprising a plurality of discrete slits therein, the foam sheet being mechanically expandable from an unexpanded foam sheet configuration to an expanded foam sheet configuration, the slits being of a size and shape and arrangement so that the expanded foam sheet locks into the expanded configuration by exhibiting a pressure-to-close of at least 5 gm/cm$^2$, with each of the slits providing only a single free volume in the expanded foam sheet.

29. The cushioning article according to claim 28, wherein the expandable foam sheet has a density of from 14 g/liter to 48 g/liter in the unexpanded configuration and a thickness of from 6 mm to 50 mm.

30. The expandable foam sheet according to claim 2, wherein the expandable foam sheet has a finger-to-finger distance of from 0.25 to 3 inches.

31. The expandable foam sheet according to claim 2, wherein the expandable foam sheet has a finger-to-finger distance of from 0.3 to 1.5 inches.

32. The expandable foam sheet according to claim 2, wherein the expandable foam sheet has a finger-to-finger distance of from 0.35 to 1.35 inches.

33. The expandable foam sheet according to claim 2, wherein the expandable foam sheet has a finger-to-finger distance of from 0.5 to 1.1 inches.

* * * * *